US009985953B2

(12) United States Patent
Koushik et al.

(10) Patent No.: US 9,985,953 B2
(45) Date of Patent: May 29, 2018

(54) DESKTOP APPLICATION FULFILLMENT PLATFORM WITH MULTIPLE AUTHENTICATION MECHANISMS

(71) Applicant: Amazon Technologies, Inc., Reno, NV (US)

(72) Inventors: Sheshadri Supreeth Koushik, Redmond, WA (US); Jaimin Paresh Shah, Seattle, WA (US); Yang Lin, Seattle, WA (US); Abhinav Shrivastava, Seattle, WA (US); Vikram Vijay Sahijwani, Seattle, WA (US); Hao Peng, Seattle, WA (US); David Pessis, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 0 days. days.

(21) Appl. No.: 14/537,789

(22) Filed: Nov. 10, 2014

(65) Prior Publication Data
US 2016/0134616 A1 May 12, 2016

(51) Int. Cl.
*H04L 29/06* (2006.01)
*G06F 9/445* (2018.01)
*G06F 21/33* (2013.01)

(52) U.S. Cl.
CPC ............ *H04L 63/0807* (2013.01); *G06F 8/60* (2013.01); *G06F 21/335* (2013.01);
(Continued)

(58) Field of Classification Search
USPC .......................................................... 726/9
See application file for complete search history.

(56) References Cited

U.S. PATENT DOCUMENTS 6,915,338 B1 * 7/2005 Hunt ..................... G06F 9/5066
   370/352
7,085,840 B2 * 8/2006 de Jong .............. H04L 63/0407
   380/255

(Continued)

FOREIGN PATENT DOCUMENTS

WO          02/44892          6/2002

OTHER PUBLICATIONS

U.S. Appl. No. 14/516,233, filed Oct. 16, 2014, Sheshadri Supreeth Koushik.

(Continued)

*Primary Examiner* — Amare F Tabor
(74) *Attorney, Agent, or Firm* — Robert C. Kowert; Meyertons, Hood, Kivlin, Kowert & Goetzel, P.C.

(57) ABSTRACT

A service provider system may include an application fulfillment platform that delivers desktop applications to desktops on physical computing devices or virtual desktop instances. A computing resource instance may be registered with the platform, which generates a unique identifier and a security token for the computing resource instance using multiple authentication mechanisms. An end user of a customer organization may be registered with the platform, which generates a unique identifier and a security token for the end user using multiple authentication mechanisms. An application delivery agent may submit service requests to the platform on behalf of itself or the given user. The identity and security credentials included in the requests may be dependent on the request type and the entities on whose behalf they are submitted. A proxy service on the platform may receive the requests and validate the credentials, then dispatch the requests to other services on the platform.

20 Claims, 15 Drawing Sheets

(52) U.S. Cl.
CPC .......... *H04L 63/0428* (2013.01); *H04L 63/08* (2013.01); *H04L 63/0853* (2013.01); *H04L 63/10* (2013.01)

(56) References Cited

U.S. PATENT DOCUMENTS

| | | | |
|---|---|---|---|
| 7,249,176 B1* | 7/2007 | Salas .................... | G06F 21/105 709/225 |
| 2002/0032763 A1 | 3/2002 | Cox et al. | |
| 2002/0178360 A1* | 11/2002 | Wenocur .............. | G06Q 10/107 713/170 |
| 2004/0133793 A1* | 7/2004 | Ginter ................ | H04N 21/8358 713/193 |
| 2005/0102538 A1* | 5/2005 | Hunt .................... | H04L 41/069 726/4 |
| 2007/0256073 A1 | 11/2007 | Troung et al. | |
| 2009/0198805 A1 | 8/2009 | Ben-Shaul et al. | |
| 2011/0295998 A1 | 12/2011 | Ferris et al. | |
| 2012/0054841 A1 | 3/2012 | Schultz et al. | |
| 2012/0278439 A1 | 11/2012 | Ahiska et al. | |
| 2013/0042309 A1 | 2/2013 | Ozzie et al. | |
| 2013/0104118 A1 | 4/2013 | Somani et al. | |
| 2013/0117804 A1 | 5/2013 | Chawla et al. | |
| 2014/0041015 A1* | 2/2014 | Leber .................... | G06Q 30/02 726/16 |
| 2014/0258155 A1 | 9/2014 | Suryanarayanan et al. | |
| 2014/0280961 A1 | 9/2014 | Martinez et al. | |
| 2015/0019858 A1* | 1/2015 | Roth .................... | H04L 63/0471 713/150 |
| 2015/0033305 A1* | 1/2015 | Shear .................... | G06F 21/45 726/6 |
| 2015/0047031 A1* | 2/2015 | Huntwork ........... | H04L 63/1408 726/22 |
| 2015/0128293 A1* | 5/2015 | Hitomi ................. | H04L 65/60 726/29 |
| 2015/0143470 A1* | 5/2015 | Stiekes ................. | G06F 9/468 726/4 |
| 2015/0229638 A1* | 8/2015 | Loo ...................... | G06Q 10/10 726/9 |

OTHER PUBLICATIONS

Invitation to Pay Additional Fees from PCT/US2015/056045, dated Jan. 13, 2016, Amazon Technologies, Inc., pp. 1-7.
U.S. Appl. No. 15/012,049, filed Feb. 2, 2016, Kypros Constantinides.

* cited by examiner

DESKTOP APPLICATION FULFILLMENT PLATFORM WITH MULTIPLE AUTHENTICATION MECHANISMS

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers or clients. Some public data center operators provide network access, power, and secure installation facilities for hardware owned by various clients, while other public data center operators provide "full service" facilities that also include hardware resources made available for use by their clients. However, as the scale and scope of typical data centers has increased, the tasks of provisioning, administering, and managing the physical computing resources have become increasingly complicated.

The advent of virtualization technologies for commodity hardware has provided benefits with respect to managing large-scale computing resources for many clients with diverse needs, allowing various computing resources to be efficiently and securely shared by multiple clients. For example, virtualization technologies may allow a single physical computing machine to be shared among multiple users by providing each user with one or more virtual machines hosted by the single physical computing machine, with each such virtual machine being a software simulation acting as a distinct logical computing system that provides users with the illusion that they are the sole operators and administrators of a given hardware computing resource, while also providing application isolation and security among the various virtual machines. Furthermore, some virtualization technologies are capable of providing virtual resources that span two or more physical resources, such as a single virtual machine with multiple virtual processors that spans multiple distinct physical computing systems. With virtualization, the single physical computing device can create, maintain or delete virtual machines in a dynamic manner. In turn, users can request computer resources from a data center and be provided with varying numbers of virtual machine resources on an "as needed" basis or at least on an "as requested" basis.

Many large companies are attempting to move data center resources to cloud computing environments. These companies may use large amounts of desktop computing software that must be procured, kept up-to-date, and distributed across many desktop computers in multiple locations. Traditionally, in order to execute an application, an end user within a company would log into a physical machine, navigate to a vendor site, download an application, physically install the application on their own computer (which may include choosing an option for automatically installing updates to the application or an option for receiving notifications of available updates), and execute the application locally (on their own computer). Subsequently, when and if the end user is finished using the application, the end user might uninstall the application.

For a large enterprise, it can be difficult to keep all of the applications they may wish to use up to date using the traditional approach of physically installing applications on each machine. For example, deploying and managing applications at scale is difficult, complex and requires expensive on premise infrastructure. In addition, updates and patches are complex to deploy without affecting user productivity, and legacy applications typically only run on older operation system versions. It can be difficult for a large enterprise to deploy applications on-demand and their own line-of-business applications. In many cases, there is a lack of transparency into cost controls, spending and usage related to desktop applications. Therefore, large enterprises can miss opportunities for license synergies across the organization.

Figure 1:
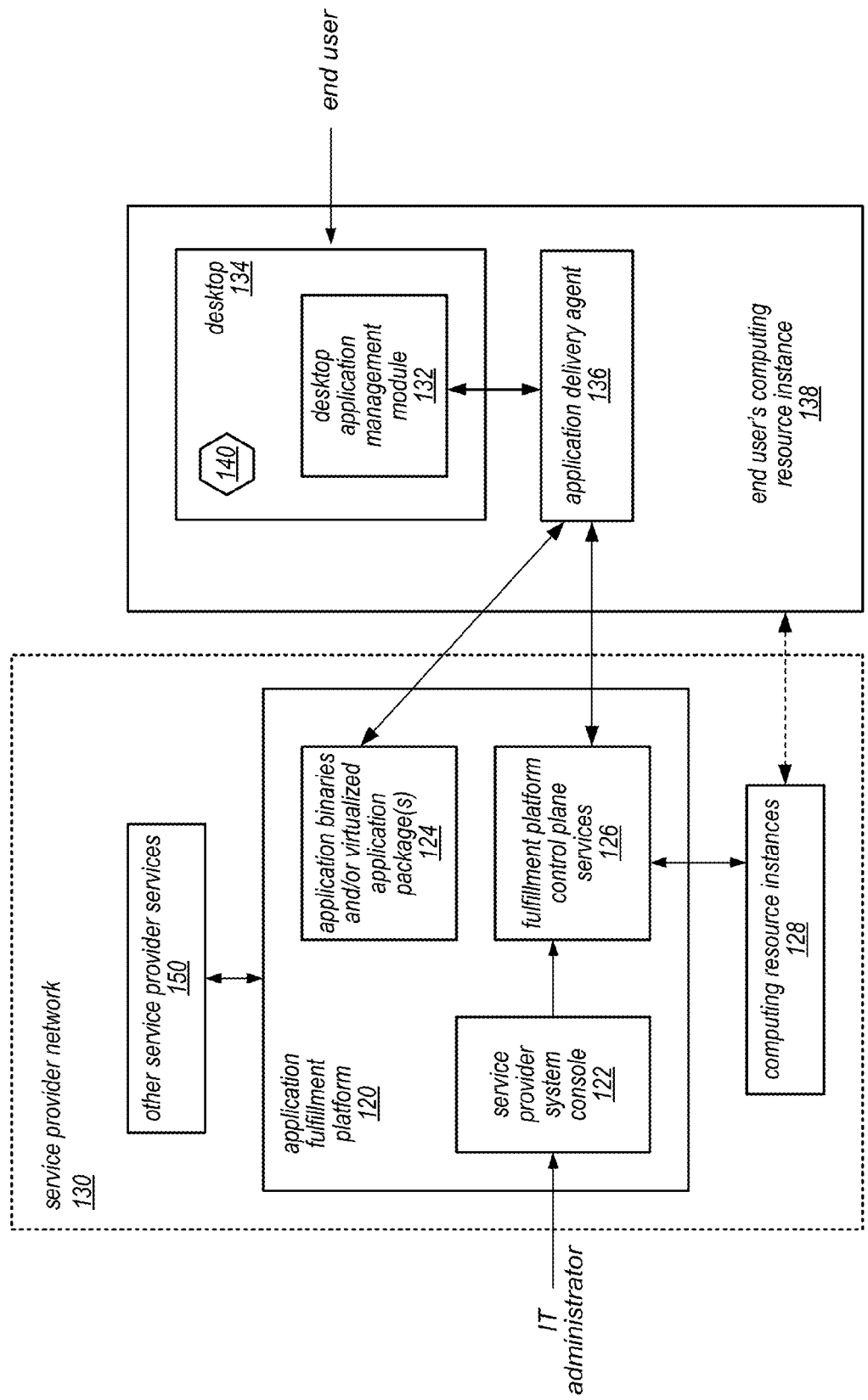
FIG. 1 is a block diagram illustrating one embodiment of a service provider system that is configured to provide on-demand delivery of applications to computing resource instances of its customers' end users.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

Various embodiments of systems and methods for providing applications (e.g., desktop applications) through an application fulfillment platform in a service provider system that provides virtualized computing resources to clients are described herein. The systems and methods described herein may provide on-demand delivery and installation of desktop applications to virtual desktop instances in a cloud computing environment for the benefit of end users (e.g., employees or members of a business, enterprise, or other organization that is a customer of the service provider). In some embodiments, the application fulfillment platform may employ a variety of services to manage collections of applications (e.g., catalogs or portfolios of applications) and to deliver virtualized application packages to end user machines or virtual desktop instances. In some embodiments, the systems described herein for providing on-demand delivery and installation of desktop applications to virtual desktop instances may implement multiple authentication mechanisms (e.g., two or more authentication mechanisms with which end users may be registered and their identities authenticated and/or with which their computing resources instances may be separately registered and authenticated).

In some embodiments, customers of a service provider (e.g., buyers or IT administrators within an enterprise) may be able to discover and subscribe to third party applications (or applications that have been purchased or licensed from a third party by the service provider) on-demand and make them available to their end users on virtual desktop instances. In addition, an IT administrator of a customer may be able to publish and manage the customer's own line-of-business applications, which may be accessible only for their end users.

The systems described herein may provide customers the flexibility to build and curate a selection of applications (including those discovered and/or sourced through a desktop application management module) while maintaining secure, scalable and streamlined delivery of applications to their end users. In some embodiments, customers may benefit from on-demand access to applications (e.g., desktop applications) through flexibility, convenience and the use of a pay-as-you-go feature. In addition, customers may be able to manage their diverse application portfolios without making expensive up-front investments. The application fulfillment and management services provided by the systems described herein may be suitable for virtual computing instance customers (e.g., virtual desktop customers) in a variety of industries and sectors, including retailers, financial services providers, technology companies, and customers in the transportation sector.

In various embodiments, the application fulfillment platforms described herein may provide IT administrators full control over their virtual desktop instances with dynamic application management tools. For example, IT administrators in customer organizations may be able to build application catalogs or portfolios for their end users that are composed of applications from sourced through the platform and/or their own private applications, where a portfolio is a collection of applications and corresponding policies (including maintenance schedules and license types), which can be assigned to end users or groups of users. In some embodiments, at least some applications (e.g., required applications) may be pre-installed on the virtual desktop instances that are provisioned for a customer's end users. In some embodiments, customers may allow their end users to install applications on-demand. IT administrators may interact with the application fulfillment platforms through a management console (sometimes referred to herein as a service provider system console or an administrator console) that offers IT administrators access to the tools for managing catalogs or portfolios, application updates, policies, application licenses and/or their own private applications. These tools may include a dashboard that enables IT administrators to easily ingest, package and deliver private applications to their end users. In some embodiments, IT administrators may be able to fully control application updates, which may be installed in the background, and may be non-disruptive to users even if they are using an application that is being updated. The systems described herein may allow customers to efficiently manage their software application spending with detailed usage reports and monthly subscriptions. Because the service provider may be able to negotiate bulk and/or wholesale prices from application vendors, the service provider may be able to offer them to customer (e.g., individually or in bundles containing groups of popular applications) with competitive pricing.

As described in more detail below, the application fulfillment platforms described herein may provide a self-service model to end users through an application (e.g., a desktop application management module) on their virtual desktop instances. For example, through this application, end users can discover and manage an application portfolio that best fits their needs, with the ability to install applications marked as optional by their IT administrators. IT administrators may also have the option to authorize their users to be able to request access to additional applications and/or to receive notifications of new applications or application updates as they become available. In some embodiments, the application fulfillment platforms described herein may preserve application state by automatically backing up applications and application data, which may enable subsequent restoration (e.g., in the case of a machine failure), provide the ability to roll back the application state to a specific point in time, and/or provide the flexibility to work across multiple virtual desktop instance and/or computing devices.

In the context of the application fulfillment platforms described herein, the terms "customer" and "buyer" may refer to an enterprise, a business, or another organization that receives application management and/or fulfillment services on behalf of their end users from a service provider through such a platform. In this context, the term "sellers" may refer to software vendors that provide their applications for use within the application fulfillment platforms described herein, and the terms "users" and "end users" may refer to employees or members of the enterprise, business, or other organization that receives application management and/or fulfillment services on their behalf from a service provider through such a platform. Users may access applications that are fulfilled through these platforms on their own computing resources instances (e.g., on end user machines and/or virtual desktop instances).

In some embodiments, applications (e.g., desktop applications) may be delivered to various end users' virtual desktop instances using an application virtualization technology that encapsulates and isolates applications in dedicated containers. For example, a packaging service implemented on the application fulfillment platform may be configured to transform applications into virtualized application packages and to deliver them to virtual desktop instances or physical desktops running over an operating system on an end user's machine. The virtualized application packages, when executed, may perform and behave as if they are natively installed, without the need for actual installation. In some embodiments, this approach may simplify application patch management because patches do not need to be pushed to individual desktops. In some embodiments, the packaging service may be invoked by IT administrators or other IT professionals to convert and validate traditional desktop applications into virtual applications that are compatible with the application fulfillment platforms (and services thereof) that are described herein.

As described in detail herein, an application fulfillment platform may offer customers (or more specifically, IT administrators of those customers) the ability to provision applications on-demand at scale while maintaining centralized control, security and compliance. For example, in some embodiments, these platforms (and corresponding services thereof) may be integrated with a management console through which the IT administrators may discover and subscribe to a broad selection of applications from a variety of sources, build a catalog of applications from a variety of sources and having a variety of subscription/licensing models, control access to applications with granular access policy enforcement on a per user basis, manage application updates, access detailed usage reports for their enterprise, application portfolios and end users, and/or monitor real-time installs as well as license activation on a per application basis.

In some embodiments, the application fulfillment platforms described herein may be integrated with or may be configured to operate in conjunction with a service provider enterprise catalog, e.g., a service that enables administrators to create private catalogs of products and resources from a variety of suppliers, and to share them with a specific set of users. These products may include not only desktop applications to be delivered to virtual desktop instances as virtualized application packages, but may also include server applications (e.g., applications to be executed on a server on behalf of a customer or end user) and/or applications to be delivered as executable files (e.g., application binaries) to be installed on an end user's computing device or virtual desktop instance. If the service provider enterprise catalog is used to create a catalog or portfolio of desktop applications, these applications may be installed as virtualized application packages on an end user's computing resource instance at a later time (e.g., on-demand), as described herein. In some embodiments, the service provider enterprise catalog may enable administrators to offer a standard set of products that meet organizational requirements, and may offer users an opportunity to discover products via a familiar on-line-shopping-type experience, provision service provider resources for their own use, and/or manage service provider resources through a service provider system console. In some embodiments, organizations may benefit from the use of the service provider enterprise catalog through increased standardization, enforced compliance with policies, and improved agility.

As described in more detail herein, in some embodiments, an application fulfillment platform may receive input specifying an intended state of the platform for a given end user and may invoke various services and workflows to translate that intent into reality. This may include provisioning one or more applications on the end user's desktop (e.g., physically installing them on the user's machine, or installing them in a cloud computing environment through a virtual desktop instance). When the end user begins to use one of the applications, the application fulfillment platform (or a component thereof) may manage its subscription, which may trigger metering and billing messages (e.g., emails) and may involve managing third party software licenses for the application, in some cases.

As described herein, a whole enterprise (e.g., a service provider customer) may be represented in the service provider system (and/or in an application fulfillment platform of the service provider system) by an IT administrator who interacts with the system through service provider system console. After logging into the console, the IT administrator may be able to perform a variety of different actions, many of which fall into one of three broad categories. The first category involves action related to building their own catalog, which is a collection of applications that may include their own line-of-business (e.g., custom) applications, applications for which the enterprise has purchased licenses (which may be included in the catalog under a "bring your own license" model), and/or applications purchased from the service provider itself.

In a second category of actions, the IT administrator may (e.g., through the service provider system console) perform actions related to assigning particular applications to specific end users (and/or user groups). For example, an IT administrator may be able to select one or more end users and/or user groups in its active directory and may be able to assign applications (e.g., one or more desktop applications) to the selected end users and/or user groups. For example, the IT administrator may be able to assign an office productivity suite, a data analysis application and/or a browser application to the selected end user(s) and/or user group(s).

In a third category of actions, the IT administrator may (e.g., through the service provider system console) perform actions related to generating, obtaining, and/or viewing reports indicating the usage of the applications that are provided through the service to their end users. The information in these reports may be used by the IT administrator to determine which of several available licensing models may be most suitable for the software being used by their organization.

One embodiment of a service provider system that is configured to provide on-demand delivery of applications (e.g., desktop applications) to computing resource instances of its customers' end users is illustrated by the block diagram in FIG. 1. As illustrated in this example, the system, implemented on service provider network 130, may include an application fulfillment platform (shown as application fulfillment platform 120). The application fulfillment platform may include an interface mechanism (shown as service provider system console 122) through which an IT administrator of a service provider customer (e.g., a business, enterprise, or organization that receives computing services, storage services, and/or access to second or third party applications from the service provider) can manage the fulfillment of various applications to their end users (e.g., employees or members of the same business, enterprise, or organization). For example, the IT administrator may log into application fulfillment platform 120 (e.g., through a browser or a dedicated client-side application) to access service provider system console 122. The IT administrator may then provide input (e.g., requests for service entered in a graphical user interface of service provider system console 122) in order to create a catalog of applications to be provisioned for the use of their end users, to assign applications to particular end users or user groups, or to generate, obtain, or view usage reports for the applications in the catalog by their end users.

As illustrated in this example, application fulfillment platform 120 may include multiple fulfillment platform control plane services 126, various ones of which may be invoked in response to the inputs received from the IT administrator. For example, in response to inputs specifying the addition of an application to a catalog and the assigning of the application to one or more users, a "create fulfillment" workflow may be initiated, which may include operations performed by a fulfillment service, an entitlement service, a delivery service, a packaging service, a device identity service, and/or a proxy service. These services, and other components of an application fulfillment platform such as application fulfillment platform 120, are described in more detail below, according to at least some embodiments. As illustrated at 124, in this example, applications may be delivered to end users as application binaries (e.g., desktop applications that have been prepared for physical installation on an end user's computing resource instance) and/or as virtualized application packages. For example, in some embodiments, the service provider may (e.g., when ingesting desktop applications for the benefit of its customers and their end users) transform desktop applications into virtualized application packages to be delivered to end users' computing resource instances, and those virtualized application packages may be executed on those computing resource instances without the end user having to install the desktop applications themselves on those computing resource instances.

In some embodiments, an application delivery agent (such as application delivery agent 136) and a desktop application management module (such as desktop application management module 132) may be installed on the end user's computing resources instance 138. In various embodiments, computing resource instance 138 may be a physical computing device (e.g., a desktop or laptop computer, a tablet computing device, or a smart phone) or may be a virtualized computing resource instance (e.g., one that implements a virtual desktop instance). Application delivery agent 136 (which may be a client component of application fulfillment platform 120) may be configured to communicate with various fulfillment platform control plane services 126 in order to fulfill requests to subscribe to, install, and/or execute applications selected through desktop application management module 132 or through another user interface mechanism (e.g., application icon 140 on desktop 134 or a start menu item). In other words, desktop application management module 132 is an application that may be installed on the end user's computing resource instance 138 to allow the end user to interact with application fulfillment platform 120 through application delivery agent 136. In some embodiments, application delivery agent 136 may include a runtime engine component that is configured to execute the instructions of a virtualized application package 124 that is delivered (e.g., using demand paging) for a selected application. The functionality of an application delivery agent is described in more detail below, according to at least some embodiments.

As illustrated in FIG. 1, the service provider network may include physical and/or virtualized computing resource instances (e.g., computation resource instances and/or storage resource instances) that may be provisioned on behalf of the business, enterprise, or organization (and its end users). In some embodiments, these computing resources instances (shown as computing resource instances 128 on service provider network 130) may be configured to implement a remote computing application that allows end users to access applications executing on computing resource instances 128 as if they were installed and executing locally on their machine. For example, in some embodiments, one or more of these computing resources instances 128 may be configured to implement a virtual desktop instance (which may serve as the end user's computing resource instance 138) on which an application delivery agent 136 and a desktop application management module 132 are installed. In such embodiments, desktop 134 in FIG. 1 may represent a view presented by the virtual desktop instance and may appear to the end user as if it were a desktop on the end user's local (physical) computing device. In some embodiments, other services may be implemented on service provider network 130, some of which may call or be called by various ones of the services implemented by application fulfillment platform 130. These are illustrated in FIG. 1 as other service provider services 150. For example, in some embodiments, service provider network 130 may also include storage resources outside of application fulfillment platform 120 (which may be managed by a storage service implemented within service provider network 130 as part of other service provider services 150) that are configured to store data utilized by application fulfillment platform 120 (not shown). In various embodiments, application binaries, virtualized application packages, various tables that store information about applications and collections thereof, application state data, or other information used to provide on-demand delivery of desktop applications to end users may be stored outside of application fulfillment platform 120 instead of, or in addition to, within application fulfillment platform 120. In another example, other service provider services 150 may include one or more other authentication services, identity services, or security services, which may be used in authenticating and/or identifying an end user or an end user's computing resource instance instead of or in combination with various ones of the fulfillment control plane services 126 described herein.

As illustrated in this example, desktop application management module 132 (through which the end user may select applications for installation or execution) may execute on the end user's computing resource instance 138, and a graphical user interface of desktop application management module 132 may be displayed on desktop 134. For example, this interface may present a list of applications for selection by the end user (e.g., in order to subscribe to, install, and/or execute an application). In addition, a shortcut or icon for an application (shown as element 140 in FIG. 1) may be displayed on desktop 134 and may be selected in order to launch the corresponding application (e.g., desktop application management module 132, or one of the applications delivered for execution on computing resource instance 138 in response to its selection, by the end user, within desktop application management module 132).

Figure 14:
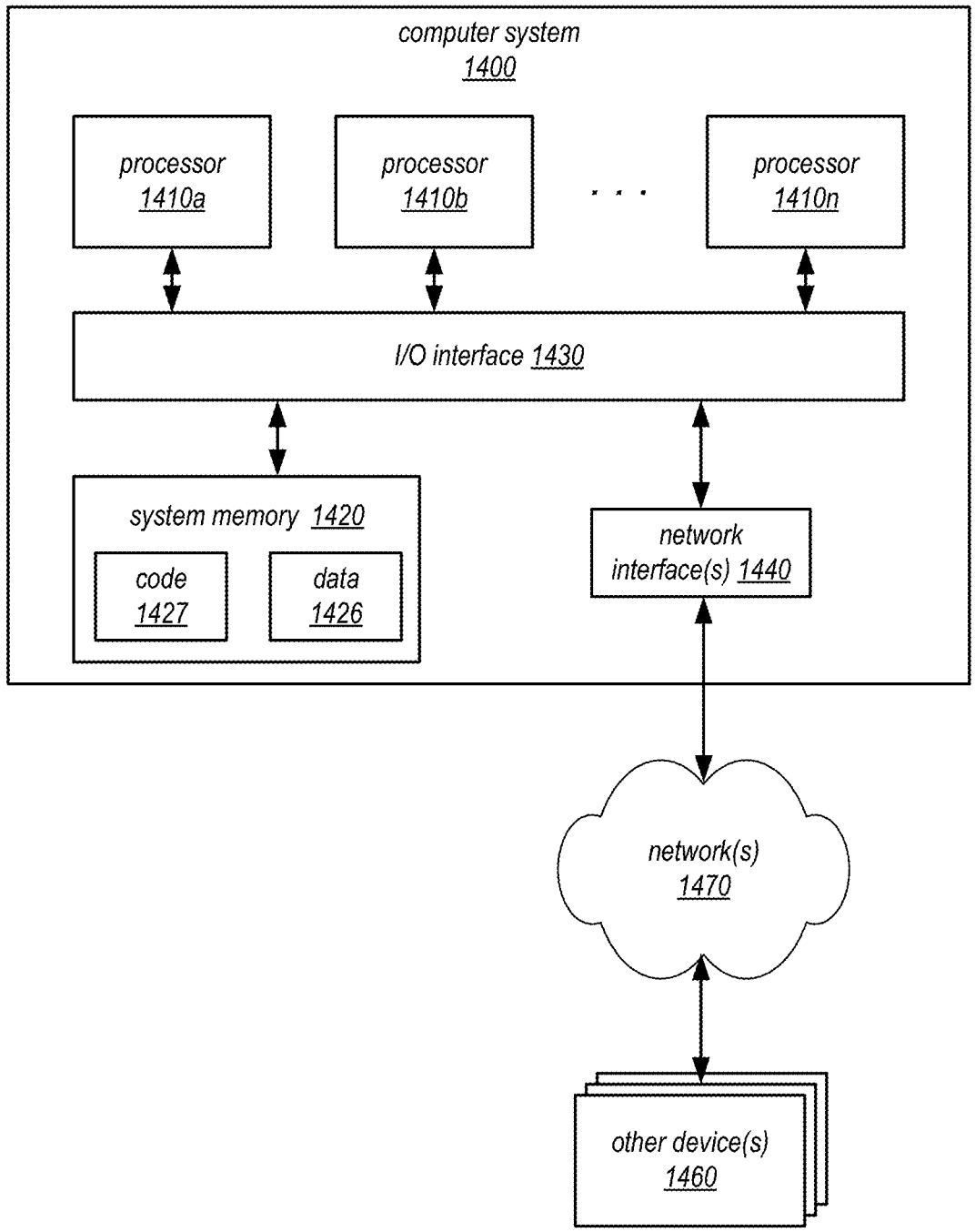
FIG. 14 is a block diagram illustrating an example computer system that implements some or all of the techniques described herein, according to different embodiments.

The systems and methods described herein may be implemented on or by one or more computing systems within a network environment, in different embodiments. An example computer system on which embodiments of the techniques for providing on-demand delivery of desktop applications to desktops on physical computing devices and/or virtual desktops in a cloud computing environment described herein may be implemented is illustrated in FIG. 14. Embodiments of various systems and methods for implementing these techniques are generally described herein in the context of a service provider that provides to clients, via an intermediate network such as the Internet, virtualized resources (e.g., virtualized computing and storage resources) implemented on a provider network of the service provider. FIGS. 2-6 and 14 (and the corresponding descriptions thereof) illustrate and describe example environments in which embodiments of the systems and methods described herein may be implemented, and are not intended to be limiting. In at least some embodiments, at least some of the resources provided to clients of the service provider via the provider network may be virtualized computing resources implemented on multi-tenant hardware that is shared with other client(s) and/or on hardware dedicated to the particular client. Each virtualized computing resource may be referred to as a resource instance. Resource instances may, for example, be rented or leased to clients of the service provider. For example, clients of the service provider may access one or more services of the provider network via application programming interfaces (APIs) to the services to obtain and configure resource instances and to establish and manage virtual network configurations that include the resource instances, for example virtualized private networks.

Figure 5:
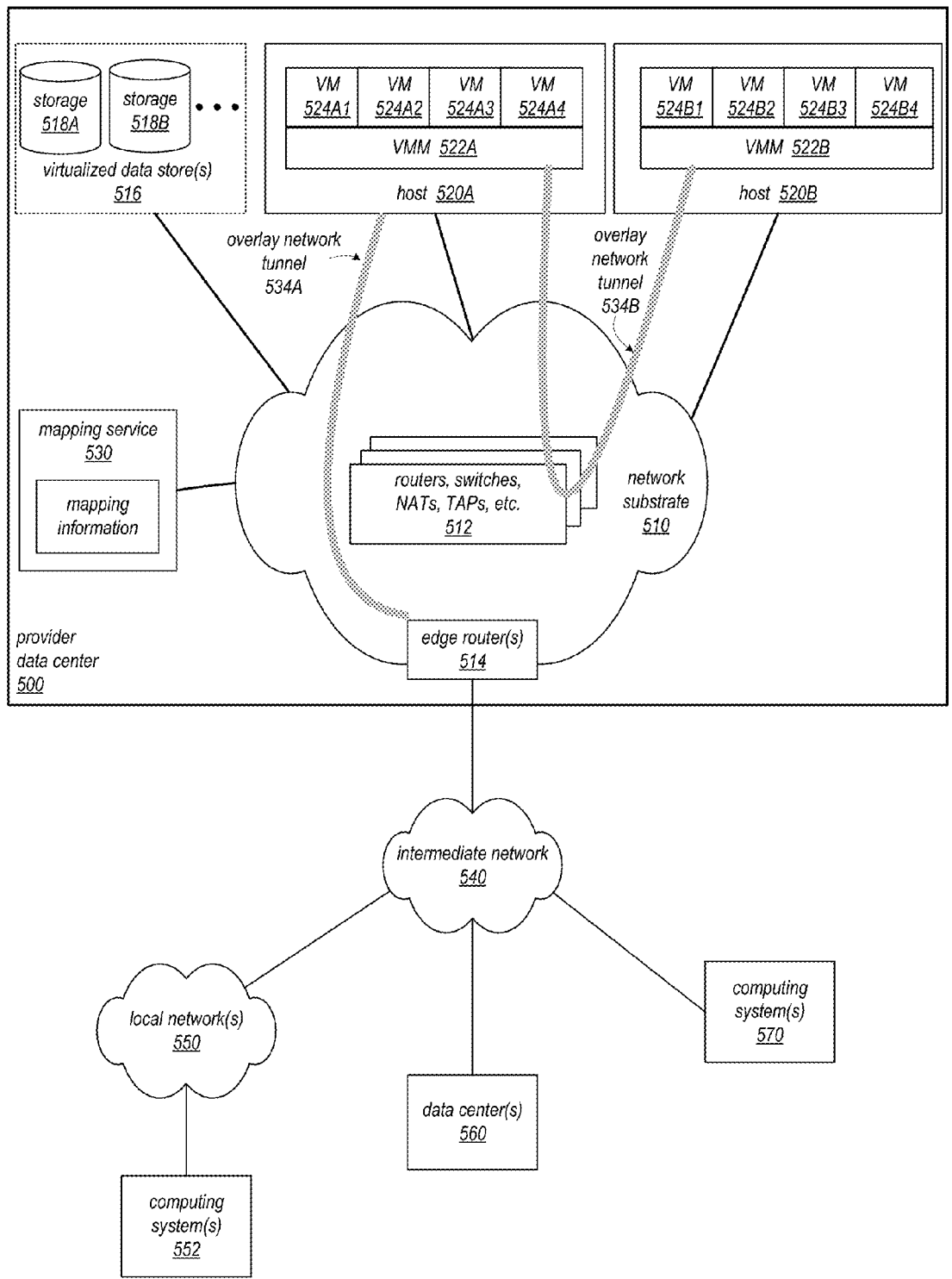
FIG. 5 is a block diagram illustrating an example service provider data center, according to at least some embodiments.

In some embodiments, the resource instances may, for example, be implemented according to hardware virtualization technology that enables multiple operating systems to run concurrently on a host computer, i.e. as virtual machines (VMs) on the hosts. A hypervisor, or virtual machine monitor (VMM), on a host may present the VMs on the host with a virtual platform and monitors the execution of the VMs. Each VM may be provided with one or more private IP addresses; the VMM on a host may be aware of the private IP addresses of the VMs on the host. An example of a system that employs such a hardware virtualization technology is illustrated in FIG. 5 and described in detail below.

Example Provider Network Environments

This section describes example provider network environments in which embodiments of the methods described herein may be implemented. However, these example provider network environments are not intended to be limiting. In various embodiments, in these provider network environments, a service provider may host virtualized resource instances on behalf of a customer that can be accessed by end users. For example, end users who are associated with the customer on whose behalf the virtualized resources instances are hosted (e.g., members of the same organization or enterprise) may be able to access the virtualized resources instances using client applications on client devices. In some embodiments, the virtualized resources instances may be configured to implement virtual desktop instances.

Figure 2:
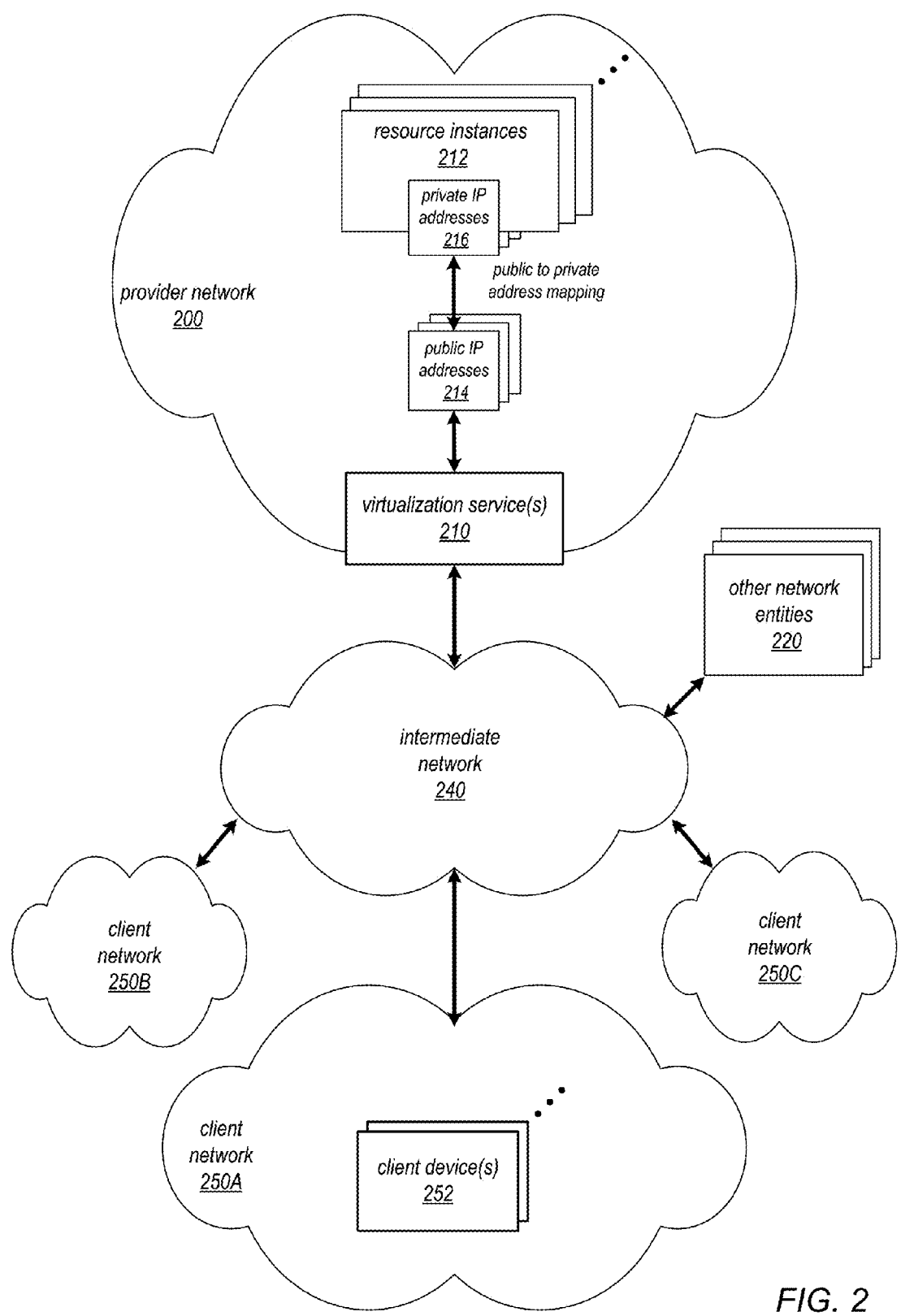
FIG. 2 is a block diagram illustrating an example provider network environment, according to at least some embodiments.

FIG. 2 illustrates an example provider network environment, according to at least some embodiments. A provider network 200 may provide resource virtualization to clients via one or more virtualization services 210 that allow clients to purchase, rent, or otherwise obtain instances 212 of virtualized resources, including but not limited to computation and storage resources, implemented on devices within the provider network or networks in one or more data centers. As described in more detail below, in some embodiments, provider network 200 may also provide application virtualization for the benefit of its customers and their end users (e.g., through a packaging service), and may provide on-demand delivery of desktop applications to desktops on physical computing devices and/or virtual desktops through an application fulfillment platform implemented using various resources of service provider network 200. Private IP addresses 216 may be associated with the resource instances 212; the private IP addresses are the internal network addresses of the resource instances 212 on the provider network 200. In some embodiments, the provider network 200 may also provide public IP addresses 214 and/or public IP address ranges (e.g., Internet Protocol version 4 (IPv4) or Internet Protocol version 6 (IPv6) addresses) that clients may obtain from the provider 200.

Conventionally, the provider network 200, via the virtualization services 210, may allow a client of the service provider (e.g., a client that operates client network 250A, 250B, or 250C, each of which may include one or more client devices 252) to dynamically associate at least some public IP addresses 214 assigned or allocated to the client with particular resource instances 212 assigned to the client. The provider network 200 may also allow the client to remap a public IP address 214, previously mapped to one virtualized computing resource instance 212 allocated to the client, to another virtualized computing resource instance 212 that is also allocated to the client. For example, using the virtualized computing resource instances 212 and public IP addresses 214 provided by the service provider, a client of the service provider such as the operator of client network 250A may implement client-specific applications and present the client's applications on an intermediate network 240, such as the Internet. Other network entities 220 on the intermediate network 240 may then generate traffic to a destination public IP address 214 published by the client network 250A; the traffic is routed to the service provider data center, and at the data center is routed, via a network substrate, to the private IP address 216 of the virtualized computing resource instance 212 currently mapped to the destination public IP address 214. Similarly, response traffic from the virtualized computing resource instance 212 may be routed via the network substrate back onto the intermediate network 240 to the source entity 220.

Private IP addresses, as used herein, refer to the internal network addresses of resource instances in a provider network. Private IP addresses are only routable within the provider network. Network traffic originating outside the provider network is not directly routed to private IP addresses; instead, the traffic uses public IP addresses that are mapped to the resource instances. The provider network may include network devices or appliances that provide network address translation (NAT) or similar functionality to perform the mapping from public IP addresses to private IP addresses and vice versa.

Public IP addresses, as used herein, are Internet routable network addresses that are assigned to resource instances, either by the service provider or by the client. Traffic routed to a public IP address is translated, for example via 1:1 network address translation (NAT), and forwarded to the respective private IP address of a resource instance.

Some public IP addresses may be assigned by the provider network infrastructure to particular resource instances; these public IP addresses may be referred to as standard public IP addresses, or simply standard IP addresses. In at least some embodiments, the mapping of a standard IP address to a private IP address of a resource instance is the default launch configuration for all a resource instance types.

At least some public IP addresses may be allocated to or obtained by clients of the provider network 200; a client may then assign their allocated public IP addresses to particular resource instances allocated to the client. These public IP addresses may be referred to as client public IP addresses, or simply client IP addresses. Instead of being assigned by the provider network 200 to resource instances as in the case of standard IP addresses, client IP addresses may be assigned to resource instances by the clients, for example via an API provided by the service provider. Unlike standard IP addresses, client IP addresses may be allocated to client accounts and remapped to other resource instances by the respective clients as necessary or desired. In some embodiments, a client IP address is associated with a client's account, not a particular resource instance, and the client controls that IP address until the client chooses to release it. Unlike conventional static IP addresses, client IP addresses may allow the client to mask resource instance or availability zone failures by remapping the client's public IP addresses to any resource instance associated with the client's account. The client IP addresses, for example, may enable a client to engineer around problems with the client's resource instances or software by remapping client IP addresses to replacement resource instances.

Note also that in some embodiments, the resource instances 212 that are made available to clients (e.g., client devices 252) via virtualization service(s) 210 may include multiple network interfaces. For example, some of them may include one network interface for communicating with various components of a client network 250 and another network interface for communicating with resources or other network entities on another network that is external to provider network 200 (not shown).

Figure 3:
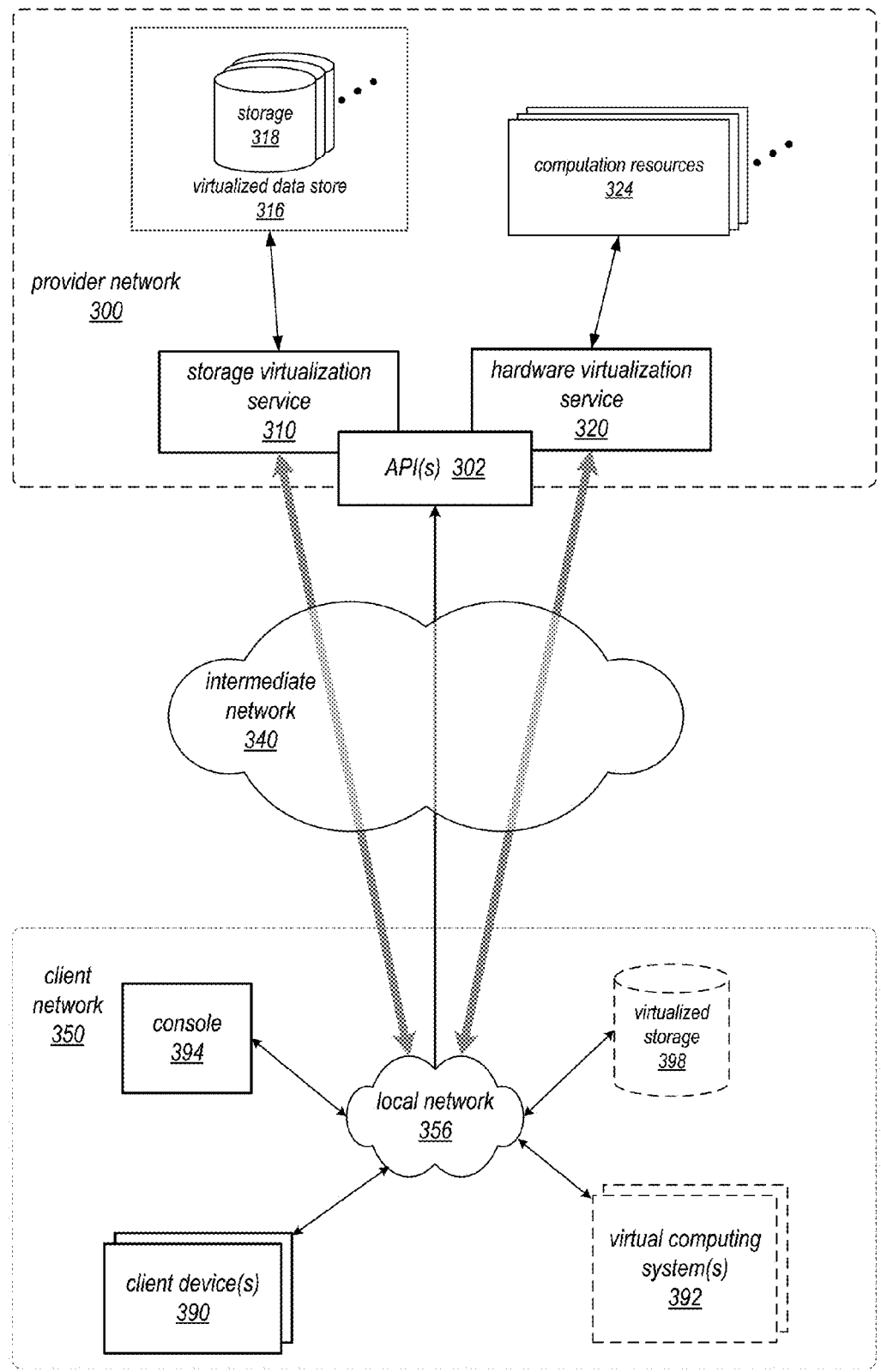
FIG. 3 is a block diagram illustrating an example provider network that provides a storage virtualization service and a hardware virtualization service to clients, according to at least some embodiments.

FIG. 3 is a block diagram of another example provider network environment, one that provides a storage virtualization service and a hardware virtualization service to clients, according to at least some embodiments. In this example, hardware virtualization service 320 provides multiple computation resources 324 (e.g., VMs) to clients. The computation resources 324 may, for example, be rented or leased to clients of the provider network 300 (e.g., to a client that implements client network 350). As noted in the previous example, in some embodiments, provider network 300 may also provide application virtualization for the benefit of its customers and their end users (e.g., through a packaging service), and may provide on-demand delivery of desktop applications to desktops on physical computing devices and/or virtual desktops through an application fulfillment platform implemented using various resources of service provider network 300. In this example, each computation resource 324 may be provided with one or more private IP addresses. Provider network 300 may be configured to route packets from the private IP addresses of the computation resources 324 to public Internet destinations, and from public Internet sources to the computation resources 324.

Provider network 300 may provide a client network 350, for example coupled to intermediate network 340 via local network 356, the ability to implement virtual computing systems 392 via hardware virtualization service 320 coupled to intermediate network 340 and to provider network 300. In some embodiments, hardware virtualization service 320 may provide one or more APIs 302, for example a web services interface, via which a client network 350 may access functionality provided by the hardware virtualization service 320, for example via a console 394. In at least some embodiments, at the provider network 300, each virtual computing system 392 at client network 350 may correspond to a computation resource 324 that is leased, rented, or otherwise provided to client network 350.

From an instance of a virtual computing system 392 and/or another client device 390 or console 394, the client may access the functionality of storage virtualization service 310, for example via one or more APIs 302, to access data from and store data to a virtual data store 316 provided by the provider network 300. In some embodiments, a virtualized data store gateway (not shown) may be provided at the client network 350 that may locally cache at least some data, for example frequently accessed or critical data, and that may communicate with virtualized data store service 310 via one or more communications channels to upload new or modified data from a local cache so that the primary store of data (virtualized data store 316) is maintained. In at least some embodiments, a user, via a virtual computing system 392 and/or on another client device 390, may mount and access one or more storage volumes 318 of virtual data store 316, each of which appears to the user as local virtualized storage 398.

While not shown in FIG. 3, the virtualization service(s) may also be accessed from resource instances within the provider network 300 via API(s) 302. For example, a client, appliance service provider, or other entity may access a virtualization service from within a respective private network on the provider network 300 via an API 302 to request allocation of one or more resource instances within the private network or within another private network. Note that in some embodiments, the hardware virtualization service 320 may be configured to provide computation resources 324 that have been configured to implement a virtual desktop instance, which may appear to the user as a local desktop (implemented by a virtual computing system 392). Note also that in some embodiments, the computation resources 324 that are made available to the client via hardware virtualization service 320 may include multiple network interfaces. For example, some of them may include one network interface for communicating with various components of client network 350 and another network interface for communicating with computation resources or other network entities on another network that is external to provider network 200 (not shown).

In some embodiments, various components of a service provider network may be configured for the generation and management of remote computing sessions between client computing devices and virtual desktop instances hosted by one or more remote data center computers of a Program Execution Service (PES) platform. A number of data centers may be organized as part of a single PES platform that can facilitate the utilization of resources of the data centers by customers of the PES. In some embodiments, the PES may include several hundreds or thousands of data center computers. For example, in some embodiments, client computing devices may access the virtual desktop instances during one or more remote computing sessions, and a virtual desktop instance may provide a user with all of the capabilities of a client desktop environment but with centralized provisioning of the services accessed by the client.

In some embodiments, a user, via a client computing device, may transmit a request to load an application such as a remote computing application. Subsequent to the receipt of the request, the client computing device may communicate with a PES platform to start a remote computing session. In one embodiment, the communication between the client computing device and the PES platform may include login information. In other embodiments, the communication may also include information identifying resource usage information, processing requirements, or rules regarding the duration or conditions of the remote computing session for the user of the client computing device. The client computing device may further communicate various information relating to the device state, including, but not limited to, a current or future availability of device resources (e.g., processing power, memory, storage, network usage, etc.). Using the information received, the PES platform may identify one or more virtual desktop instances for execution in one or more remote computing sessions. In one example, the PES platform may instantiate, or cause to have instantiated, a virtual machine instance on a data center computer, and the virtual machine instance may include an operating system. The client computing device may then establish a remote computing session with the virtual machine, and the user interface of the operating system (e.g., the output of the operating system, such as a graphical user interface, sound, etc.) may be sent to the client computing device via a particular network interface of the virtual machine instance or virtual desktop instance and presented to the user (e.g., the graphical user interface may be rendered on a display of the client computing device). The operating system may use a desktop profile associated with the user and stored on a desktop store accessible by the PES to configure the virtual desktop instance for the user by setting the desktop background, screen saver, desktop layout, pointer preferences, sound settings, and the like. User input such as mouse and keyboard activity may then be sent to the virtual machine (via a particular network interface of the virtual machine instance or virtual desktop instance) and injected into the operating system as if the activity was performed by a user directly at the virtual machine.

In some embodiments, the PES platform may receive or generate data associated with the interaction of the client computing device with the virtual desktop instance on the client computing device during the remote computing session. The data may include user data and preferences, files, and the like. Upon receiving the data, the PES platform may save the data to the desktop store associated with the virtual desktop instance. In some embodiments, the desktop store may be implemented on a volume, or on another logical block storage device. In some embodiments, the PES may create a backup copy of the data or also store the data to a central repository. The saved data may then be used to restore remote computing sessions that have been interrupted due to a failure, such as a failure of the virtual desktop instance, the server hosting the virtual desktop instance, the network, etc. By saving the user data, the PES platform may ensure that the re-establishment of a remote computing session occurs with minimal delay and disruption to a user of a client computing device.

In some embodiments, the virtual desktop instance provided may be configured according to a user profile stored at a user profile store of the PES. The configuration of the virtual desktop instance may also be adjusted according to monitored usage of the instance. In some embodiments, the user profile may be set by an administrator associated with an entity governing the user's use. The user profile may indicate various memory and processing requirements associated with the PES computers executing the one or more virtual desktop instances as well as requirements for the virtual desktop instances. For example, the user profile may indicate the programs to which the user is given while using the virtual desktop instance. In some embodiments, this may include one or more desktop applications that are packaged as virtualized application packages and that are provided on-demand through an application fulfillment platform implemented on resources of the service provider network. The user profile may also indicate a maximum time or cost associated with the remote computing session. The PES may take a user profile for the user into consideration when placing and configuring the virtual desktop instances. In addition, placement and configuration decisions may also be adjusted based on a user's interaction with the virtual desktop over time.

Figure 4:
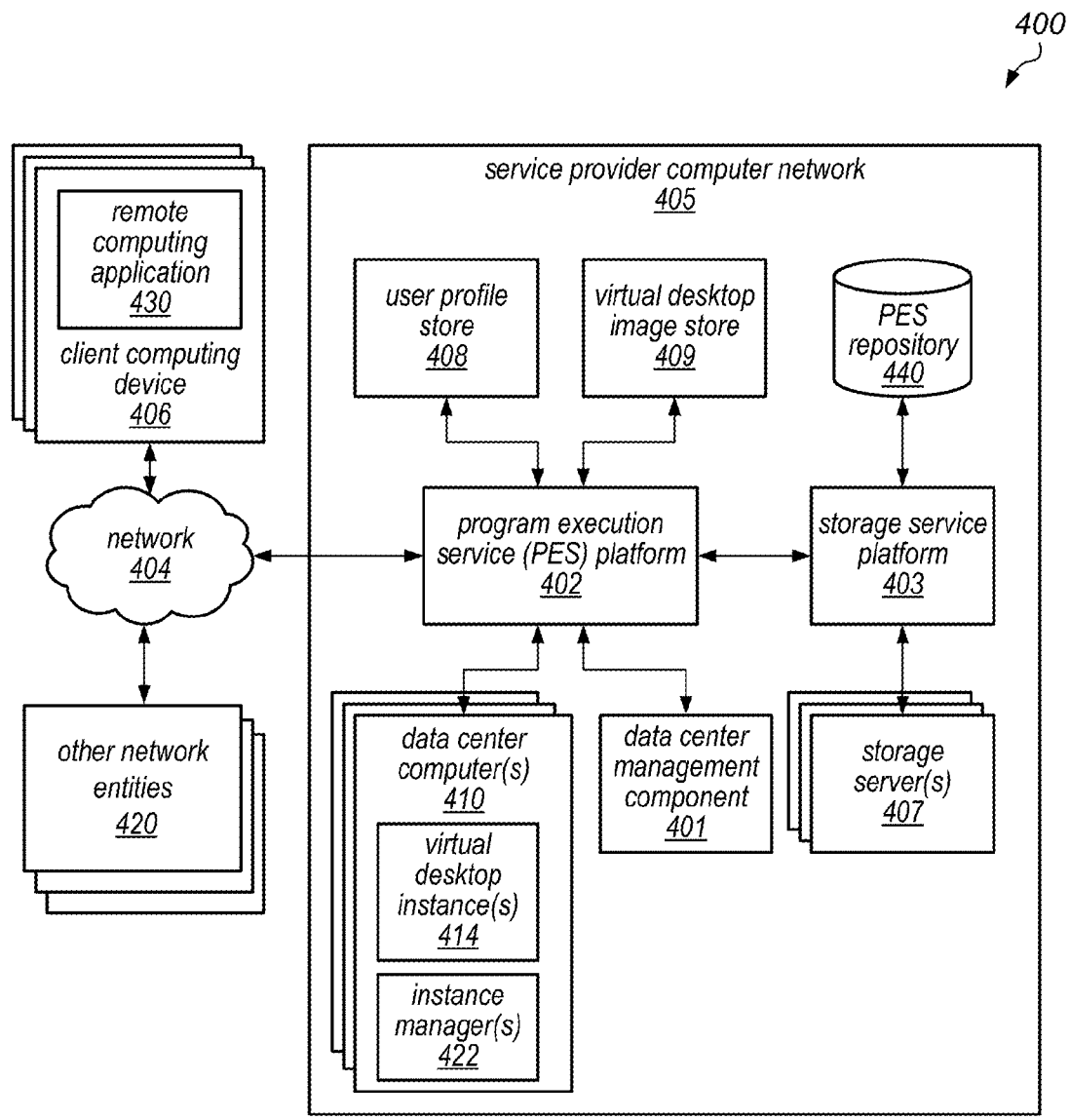
FIG. 4 is a block diagram illustrating a networked computing environment that includes a client computing device in communication with a service provider computer network, according to at least some embodiments.

FIG. 4 is a block diagram illustrating an example networked computing environment 400 that includes a client computing device 406 in communication with a service provider computer network 405 via the communication network 404. The client computing device 406 may be used for providing access to a remote operating system and applications to a user. In various embodiments, the client computing device 406 may correspond to a wide variety of computing devices including personal computing devices, laptop computing devices, hand-held computing devices, terminal computing devices, mobile devices (e.g., mobile phones, tablet computing devices, electronic book readers, etc.), wireless devices, various electronic devices and appliances, and the like. In some embodiments, the client computing device 406 includes necessary hardware and software components for establishing communications over a communication network 404, such as a wide area network or local area network. For example, the client computing device 406 may be equipped with networking equipment and browser software applications that facilitate communications via the Internet or an intranet. The client computing device 406 may have varied local computing resources such as central processing units and architectures, memory, mass storage, graphics processing units, communication network availability and bandwidth, etc.

In one embodiment, the client computing device 406 may run a remote computing application 430. The remote computing application 430 may request access to a virtual desktop instance hosted by the service provider computer network 405. The remote computing application 430 may also manage the remote computing session between the client computing device 406 and the service provider computer network 405. As illustrated in FIG. 4, the service provider computer network 405 may also include a PES platform 402. The PES platform 402 illustrated in FIG. 4 corresponds to a logical association of one or more data centers associated with a service provider. The PES platform 402 may be associated with a number of data center computers, such as, for example, data center computers 410. Each data center computer 410 may host one or more virtual desktop instances 414. For example, the data center computer 410 may host a virtual desktop instance by executing a virtual machine on a physical device. The virtual machine may execute an instance of an operating system and application software to create a virtual desktop instance. Each virtual desktop instance executed by the PES 402 may be accessed by one or more client computing devices, such as client computing device 406.

In some embodiments, data center computers 410 may be associated with private network addresses, such as IP addresses, within the service provider computer network 405 such that they may not be directly accessible by the client computing devices 406. The virtual desktop instances 414 may be associated with public network addresses that may be made available by a gateway at the edge of the service provider computer network 405. Accordingly, the virtual desktop instances 414 may be directly addressable by client computing devices 406 via the public network addresses. One skilled in the relevant art will appreciate that each data center computer 410 would include physical computing device resources and software to execute the multiple virtual desktop instances 414 or to dynamically instantiate virtual desktop instances 414. Such instantiations can be based on a specific request, such as from the client computing device 406.

As illustrated in FIG. 4, the data center computers 410 may include one or more instance managers 422. The instance managers 422 may be on the same computer as the respective instances 414, or on a separate computer. The instance managers 422 may track progress of the instances executed on the data center computers 410, monitor and coordinate the storage of data created by the user while interacting with the instances 414 via the client computing devices, and monitor the overall health and state of the data center computers 410 and of the remote computing applications running on the client computing devices 406. The instance managers 422 may communicate information collected through tracking and monitoring with the data center management component 401 of the PES platform 402 in order to efficiently manage the various remote computing sessions between the data center computers 410 and the client computing devices 406.

As illustrated in FIG. 4, the service provider network 405 may also include a storage service platform 403. The storage service platform 403 may include, or be connected to, one or more storage servers 407. The storage servers 407 may be used for storing data generated or utilized by the virtual desktop instances 414. The data generated or utilized by the virtual desktop instances 414 may be based on the interaction between the client computing devices 406 and the PES 402 via one or more remote computing sessions.

In some embodiments, the storage service platform 403 may logically organize and maintain information associated with a hosted virtual desktop instance 414 in a desktop store. The information associated with a virtual desktop instance 414 maintained in the desktop store may include, but is not limited to, user preferences, user or customer-specific policies, information associated with the execution of program data, user content, references to user content, and the like. For example, folders used by the user to store music, files, and the like on other storage devices, including through storage service providers, may also be mapped to the desktop store via references to those storage locations. That is to say, input/output operations, such as requests to open files in these folders, can be redirected to the desktop store. Thus, when a user attempts to open a file stored in his or her document folder, the request can be redirected by the operating system running in the virtual desktop instance to the desktop store. In addition to the data created by the user, the user's desktop profile, which may include, for example, configuration information for the desktop such as the background picture, fonts, arrangement of icons, and the like, may also be stored on the desktop store associated with the user's virtual desktop instance. In some embodiments, the service provider computer network 405 may be able to mitigate the effect of failures of the data center computer(s) 410 running the virtual desktop instances 414 or errors associated with the execution of virtual desktop instances 414 on the data center computer(s) 410 by storing data on storage servers independent from the data center computers 410. Additionally, the service provider network 405 may also facilitate client interaction with multiple virtual desktop instances 414 by maintaining the information in the desktop stores. In some embodiments, if one virtual desktop instance 414 fails, a new instance may be launched and attached to the same desktop store that was previously attached to the virtual desktop instance 414 that failed.

In various embodiments, the desktop stores may be distributed across multiple servers, they may be replicated for performance purposes on servers in different network areas, or they may be replicated across multiple servers with independent failure profiles for backup or fault performance purposes. For example, the servers may be attached to different power sources or cooling systems, the servers may be located in different rooms of a data center or in different data centers, and/or the servers may be attached to different routers or network switches. In some embodiments, a desktop store may be located on one storage server, and changes made to the desktop store may be replicated to another desktop store on a different storage server. Such replication may create a backup copy of the user's data. If the desktop store fails or the virtual desktop instance 414 loses its connection to the desktop store, the PES 402 may switch the connection of the virtual desktop instance 414 from the desktop store to the back-up desktop store.

As illustrated in FIG. 4, the PES platform 402 may also include a central storage device such as a PES repository 440 for storing data stored by the various desktop stores and backup stores on storage servers 407. The data center computers 410 and the storage servers 407 may further include additional software or hardware components that facilitate communications including, but not limited to, load balancing or load sharing software/hardware components for selecting instances of a virtual machine supporting a requested application and/or providing information to a DNS name server to facilitate request routing.

As illustrated in this example, the service provider computer network 405 may include a user profile store 408. The user profile store 408 may be used to store, for example, various programs a user is given access to while using a virtual desktop instance 414. In some embodiments, this may include one or more desktop applications that are packaged as virtualized application packages and that are provided on-demand through an application fulfillment platform implemented on resources of the service provider network 405. The user profiles stored may also indicate a maximum time or cost associated with the remote computing sessions of different users. The PES platform 402 may take user profiles into consideration when placing, configuring, and/or managing virtual desktop instances 414. The PES platform 402 may also include, or be connected to, a virtual desktop image store 409. The virtual desktop image store 409 may include template images of operating systems without customizations applied per user profiles.

In some embodiments, data center computers 410 and storage servers 407 may be considered to be logically grouped, regardless of whether the components, or portions of the components, are physically separate. For example, a service provider computer network 405 may maintain separate locations for providing the virtual desktop instances 414 and the storage components. Additionally, although the data center computers 410 are illustrated in FIG. 4 as logically associated with a PES platform 402, the data center computers 410 may be geographically distributed in a manner to best serve various demographics of its users. Additionally, one skilled in the relevant art will appreciate that the service provider computer network 405 may be associated with various additional computing resources, such additional computing devices for administration of content and resources, and the like. For example, the service provider computer network 405 (and/or various ones of the virtual desktop instances 414 implemented thereon) may be configured to communicate with other network entities 420 over communication network 404 or over another communication network (e.g., at least some of the virtual desktop instances 414 may include a network interface usable to access one or more other network entities 420 that is separate and distinct from to a network interface that is usable to communicate with client computing device 406). These other network entities 420 may include, for example, other client networks or computing devices thereof, computing systems that provide resources for servicing requests received from client computing device 406, and/or networks or computing devices thereof that access other services, applications, or data over the Internet.

In some embodiments, the processing requirements associated with a user or a client computing device may be determined based on a variety of scenarios. In some embodiments, the determination may be based on a user request at launching of the remote computing application 430. For example, the user may be presented with a graphical user interface (GUI) displaying a variety of options for resources and applications. The user may then select the applications they wish to have access to, or, alternatively, the version of those applications. For example, one user may wish to access a basic version of an application while another user may wish to access a professional version of the same application. The determination may also be based on preselected options for certain users as determined by administrators of entities associated with the users. For example, the pre-selected options may be presented to the user as a list of different packages of applications to which the user may wish to have access. In some cases, the determination may be made on historical usage data of a user, which the PES platform 402 may determine once the request is received from the user. In other cases, the determination of the processing requirements may be based on ongoing monitoring of use of processes by the user once the remote computing session is initiated. In such cases, the selection of adequate resource instances may be dynamically changed after the session is established, and the dynamic change over to new instance(s) may be performed as described with respect to FIG. 4 above. In some embodiments, the remote computing application 430 may request that a virtual desktop session be opened on behalf of the client, in response to which a virtual desktop instance 414 may be instantiated, configured for the use of the client, and/or connected to the client computing device 406 over network 404 (e.g., via a network interface of the virtual desktop instance 414).

In some embodiments, a service provider network that implements VMs and VMMs may use Internet Protocol (IP) tunneling technology to encapsulate and route client data packets over a network substrate between client resource instances on different hosts within the provider network. The provider network may include a physical network substrate that includes networking devices such as routers, switches, network address translators (NATs), and so on, as well as the physical connections among the devices. The provider network may employ IP tunneling technology to provide an overlay network via which encapsulated packets (that is, client packets that have been tagged with overlay network metadata including but not limited to overlay network address information for routing over the overlay network) may be passed through the network substrate via tunnels or overlay network routes. The IP tunneling technology may provide a mapping and encapsulating system for creating the overlay network on the network substrate, and may provide a separate namespace for the overlay network layer (public IP addresses) and the network substrate layer (private IP addresses). In at least some embodiments, encapsulated packets in the overlay network layer may be checked against a mapping directory to determine what their tunnel substrate target (private IP address) should be. The IP tunneling technology may provide a virtual network topology overlaid on the physical network substrate; the interfaces (e.g., service APIs) that are presented to clients are attached to the overlay network so that when a client resource instance provides an IP address to which packets are to be sent, the IP address is run in virtual space by communicating with a mapping service that can determine where the IP overlay addresses are. An example use of overlay network technology is illustrated in FIG. 5 and described in detail below.

In various embodiments, client resource instances on the hosts may communicate with other client resource instances on the same host or on different hosts according to stateful protocols such as Transmission Control Protocol (TCP) and/or according to stateless protocols such as User Datagram Protocol (UDP). However, the client packets are encapsulated according to an overlay network protocol by the sending VMM and unencapsulated by the receiving VMM. A VMM on a host, upon receiving a client packet (e.g., a TCP or UDP packet) from a client resource instance on the host and targeted at an IP address of another client resource instance, encapsulates or tags the client packet according to an overlay network (or IP tunneling) protocol and sends the encapsulated packet onto the overlay network for delivery. The encapsulated packet may then be routed to another VMM via the overlay network according to the IP tunneling technology. The other VMM strips the overlay network encapsulation from the packet and delivers the client packet (e.g., a TCP or UDP packet) to the appropriate VM on the host that implements the target client resource instance. In other words, in some embodiments, although there may be a single underlying physical network in the service provider computing environment (e.g., the service provider data center), the encapsulations described herein may allow it to appear as if each client application (or each client resource instance on which one or more client applications execute) is running on its own virtual network (e.g., data packets for multiple client applications may be traveling on the same physical network but it may appear as if the traffic directed to each of the client applications is traveling on a private network).

In some embodiments, the overlay network may be a stateless network implemented according to a connectionless (or stateless) IP protocol. In some such embodiments, the sending VMM sends the encapsulated packet onto the overlay network for routing and delivery, but does not receive an acknowledgement (ACK) or other response regarding delivery of the packet. In other embodiments, the VMM may receive an ACK or other response regarding delivery of an encapsulated packet.

FIG. 5 illustrates an example data center (e.g., one that implements an overlay network on a network substrate using IP tunneling technology), according to at least some embodiments. In some embodiments, such a data center may include an application fulfillment platform that is configured to provide on-demand delivery of desktop applications to desktops on physical computing devices and/or virtual desktops, as described herein. As illustrated in this example, a provider data center 500 may include a network substrate that includes networking devices 512 such as routers, switches, network address translators (NATs), and so on. At least some embodiments may employ an Internet Protocol (IP) tunneling technology to provide an overlay network via which encapsulated packets may be passed through network substrate 510 using tunnels. The IP tunneling technology may provide a mapping and encapsulating system for creating an overlay network on a network (e.g., a local network in data center 500 of FIG. 5) and may provide a separate namespace for the overlay layer (the public IP addresses) and the network substrate 510 layer (the private IP addresses). Packets in the overlay layer may be checked against a mapping directory (e.g., provided by mapping service 530) to determine what their tunnel substrate target (private IP address) should be. The IP tunneling technology provides a virtual network topology (the overlay network); the interfaces (e.g., service APIs) that are presented to clients are attached to the overlay network so that when a client provides an IP address to which the client wants to send packets, the IP address is run in virtual space by communicating with a mapping service (e.g., mapping service 530) that knows where the IP overlay addresses are.

In at least some embodiments, the IP tunneling technology may map IP overlay addresses (public IP addresses) to substrate IP addresses (private IP addresses), encapsulate the packets in a tunnel between the two namespaces, and deliver the packet to the correct endpoint via the tunnel, where the encapsulation is stripped from the packet. In FIG. 5, an example overlay network tunnel 534A from a virtual machine (VM) 524A on host 520A to a device on the intermediate network 540 (e.g., a computing system 570, a computing system 552 on local network 550, or a data center 560, and an example overlay network tunnel 534B between a VM 524B on host 520B and a VM 524A on host 520A are shown. In some embodiments, a packet may be encapsulated in an overlay network packet format before sending, and the overlay network packet may be stripped after receiving. In other embodiments, instead of encapsulating packets in overlay network packets, an overlay network address (public IP address) may be embedded in a substrate address (private IP address) of a packet before sending, and stripped from the packet address upon receiving. As an example, the overlay network may be implemented using 32-bit IPv4 (Internet Protocol version 4) addresses as the public IP addresses, and the IPv4 addresses may be embedded as part of 128-bit IPv6 (Internet Protocol version 6) addresses used on the substrate network as the private IP addresses.

At least some networks in which embodiments of the techniques described herein for providing on-demand delivery of desktop applications to virtual desktops in a cloud computing environment may include hardware virtualization technology that enables multiple operating systems to run concurrently on a host computer (e.g., hosts 520A and 520B of FIG. 5), i.e. as virtual machines (VMs) 524 on the hosts 520. The VMs 524 (some of which may be configured to implement a virtual desktop instance for the use of a client) may, for example, be rented or leased to clients of a network provider. A hypervisor, or virtual machine monitor (VMM) 522, on a host 520 may serve as an instance manager for the VMs 524 and/or other virtualized resource instances on the hosts 520, which may include presenting the VMs 524 on the host with a virtual platform and monitoring the execution of the VMs 524. Each VM 524 may be provided with one or more private IP addresses; the VMM 522 on a host 520 may be aware of the private IP addresses of the VMs 524 on the host. A mapping service 530 may be aware of all network IP prefixes and the IP addresses of routers or other devices serving IP addresses on the local network. This includes the IP addresses of the VMMs 522 serving multiple VMs 524. The mapping service 530 may be centralized, for example on a server system, or alternatively may be distributed among two or more server systems or other devices on the network. A network may, for example, use the mapping service technology and IP tunneling technology to, for example, route data packets between VMs 524 on different hosts 520 within the data center 500 network; note that an interior gateway protocol (IGP) may be used to exchange routing information within such a local network.

In addition, a network such as the provider data center 500 network (which is sometimes referred to as an autonomous system (AS)) may use the mapping service technology, IP tunneling technology, and routing service technology to route packets from the VMs 524 to Internet destinations, and from Internet sources to the VMs 524. Note that an external gateway protocol (EGP) or border gateway protocol (BGP) is typically used for Internet routing between sources and destinations on the Internet. FIG. 5 shows an example provider data center 500 implementing a network that provides resource virtualization technology and that provides full Internet access via edge router(s) 514 that connect to Internet transit providers, according to at least some embodiments. The provider data center 500 may, for example, provide clients the ability to implement virtual computing systems (VMs 524) via a hardware virtualization service (such as hardware virtualization service 320 in FIG. 3) and the ability to implement virtualized data stores 516 on storage resources 518 via a storage virtualization service (such as storage virtualization service 310 in FIG. 3).

In some embodiments, the data center 500 network may implement IP tunneling technology, mapping service technology, and a routing service technology to route traffic to and from virtualized resources, for example to route packets from the VMs 524 on hosts 520 in data center 500 to Internet destinations, and from Internet sources to the VMs 524. Internet sources and destinations may, for example, include computing systems 570 connected to the intermediate network 540 and computing systems 552 connected to local networks 550 that connect to the intermediate network 540 (e.g., via edge router(s) 514 that connect the network 550 to Internet transit providers). The provider data center 500 network may also route packets between resources in data center 500, for example from a VM 524 on a host 520 in data center 500 to other VMs 524 on the same host or on other hosts 520 in data center 500. In some embodiments, at least some of the VMs 524 may include two or more network interfaces. For example, they may include one network interface usable for communications between VMs 524 and the clients on whose behalf VMs 524 are hosted by the provider and a second (separate and distinct) network interface that is usable to access external resources, computing systems, data centers, or Internet destinations on networks other than the provider network and the client network, either or both of which may employ an IP tunneling technology, as described herein. In other embodiments, each of the VMs 524 may include only a single network interface.

A service provider that provides data center 500 may also provide additional data center(s) 560 that include hardware virtualization technology similar to data center 500 and that may also be connected to intermediate network 540. Packets may be forwarded from data center 500 to other data centers 560, for example from a VM 524 on a host 520 in data center 500 to another VM on another host in another, similar data center 560, and vice versa.

While the above describes hardware virtualization technology that enables multiple operating systems to run concurrently on host computers as virtual machines (VMs) on the hosts, where the VMs may be rented or leased to clients of the network provider, the hardware virtualization technology may also be used to provide other computing resources, for example storage resources 518, as virtualized resources to clients of a network provider in a similar manner.

Note that a public network may be broadly defined as a network that provides open access to and interconnectivity among a plurality of entities. The Internet, or World Wide Web (WWW) is an example of a public network. A shared network may be broadly defined as a network to which access is limited to two or more entities, in contrast to a public network to which access is not generally limited. A shared network may, for example, include one or more local area networks (LANs) and/or data center networks, or two or more LANs or data center networks that are interconnected to form a wide area network (WAN). Examples of shared networks may include, but are not limited to, corporate networks and other enterprise networks. A shared network may be anywhere in scope from a network that covers a local area to a global network. Note that a shared network may share at least some network infrastructure with a public network, and that a shared network may be coupled to one or more other networks, which may include a public network, with controlled access between the other network(s) and the shared network. A shared network may also be viewed as a private network, in contrast to a public network such as the Internet. In embodiments, either a shared network or a public network may serve as an intermediate network between a provider network and a client network, or between a provider network and other network entities (e.g., external resources, computing systems, data centers, or Internet destinations on networks other than the provider network and the client network on whose behalf VMs 524 are hosted by the provider).

In some embodiments, while there are physical computers executing client applications and other processes described herein, the client applications may be running as virtual machines on the physical computers. For example, internal processes of the cloud computing environment that are configured to manage the creation of these virtual machines, to provision resources for these virtual machines, and/or to perform other administrative tasks on behalf of clients and/or their applications (e.g., monitoring resource usage, customer accounting, billing for services, etc.) may execute in a control plane layer (or hypervisor) in the cloud computing environment. By contrast, client applications (e.g., each resource instance that implements an application component) may execute in a data plane layer of the cloud computing environment. Underneath these layers, there may be only one physical network card for each host node (or for multiple host nodes), in some embodiments, but each resource instance may execute as if it has its own network (e.g., a virtual network). In some embodiments, each resource instance may have its own data plane network connection(s), but may make local API calls (e.g., calls to a component on the same node) without needing to rely on these data plane network connections.

In some embodiments, a customer may have an application running on a local machine, but may provision resources instances in a cloud computing environment to be used in case of a failure on the local machine. In some embodiments, multiple resource instances may be executing in a cloud computing environment to implement a distributed application on behalf of a client. In different embodiments, the cloud computing environment may be a multi-tenant environment in which each application (and/or each virtual private network) may have its own namespace. In some embodiments, each client may have its own allocation of network connectivity and/or throughput capacity (bandwidth). For example, the network connectivity and/or throughput capacity in the data plane network may be provisioned (e.g., designated or reserved) for the use of various clients.

In various embodiments, a service provider may employ one of the example provider networks described above (or another suitable provider network environment) to implement a hosted desktop service in a cloud computing environment. In such embodiments, a customer may access the provider network in the cloud computing environment to request the instantiation and/or configuration of one or more virtual desktop instances in the cloud, and may then provide access to those virtual desktop instances to one or more end users (e.g., through a client application). For example, an administrator within an organization or enterprise may set up an account with a service provider, may contract with the service provider to set up some number of virtual desktop instances, and (once the virtual desktop instances are set up), may provide credentials for accessing these virtual desktop instances. In this example, once the virtual desktop instances have been set up and credentials have been provided, one or more end users may launch a client application on their a client device (e.g., a computer, tablet device, or other mobile device) and enter the credentials for the virtual desktop instance, after which they may be logged into a virtual desktop environment. Although the virtual desktop environment is implemented by virtualized resource instances in the cloud computing environment, it may appear to the end user as if it were a local desktop and it may operate as if it were an independent computer to which the user is connected. In some embodiments, the virtual desktop environment may provide access to productivity software and other software programs to which the user would typically have access if the user were logged onto a physical computer owned by the organization or enterprise. In at least some embodiments, an application fulfillment platform of the service provider may be configured to provide on-demand delivery of desktop applications (e.g., as virtualized application packages) to virtual desktop instances, as described herein.

In some embodiments, these virtual desktop instances may be intended to replace a desktop computer, e.g., they may be intended to run the same software programs that a member of the organization or enterprise on whose behalf they were instantiated and configured would access on a desktop computer in an office setting (e.g., applications that perform end-user productivity tasks). Note that these applications may or may not be stand-alone applications. For example, in some cases, each of the virtual desktop instances (and/or the applications running thereon) may be part of the active directory framework of the organization or enterprise and may be able to access shared files or other resources on the existing network of the organization or enterprise once the credentials presented by the user upon logging into the virtual desktop instance have been authenticated.

Figure 6:
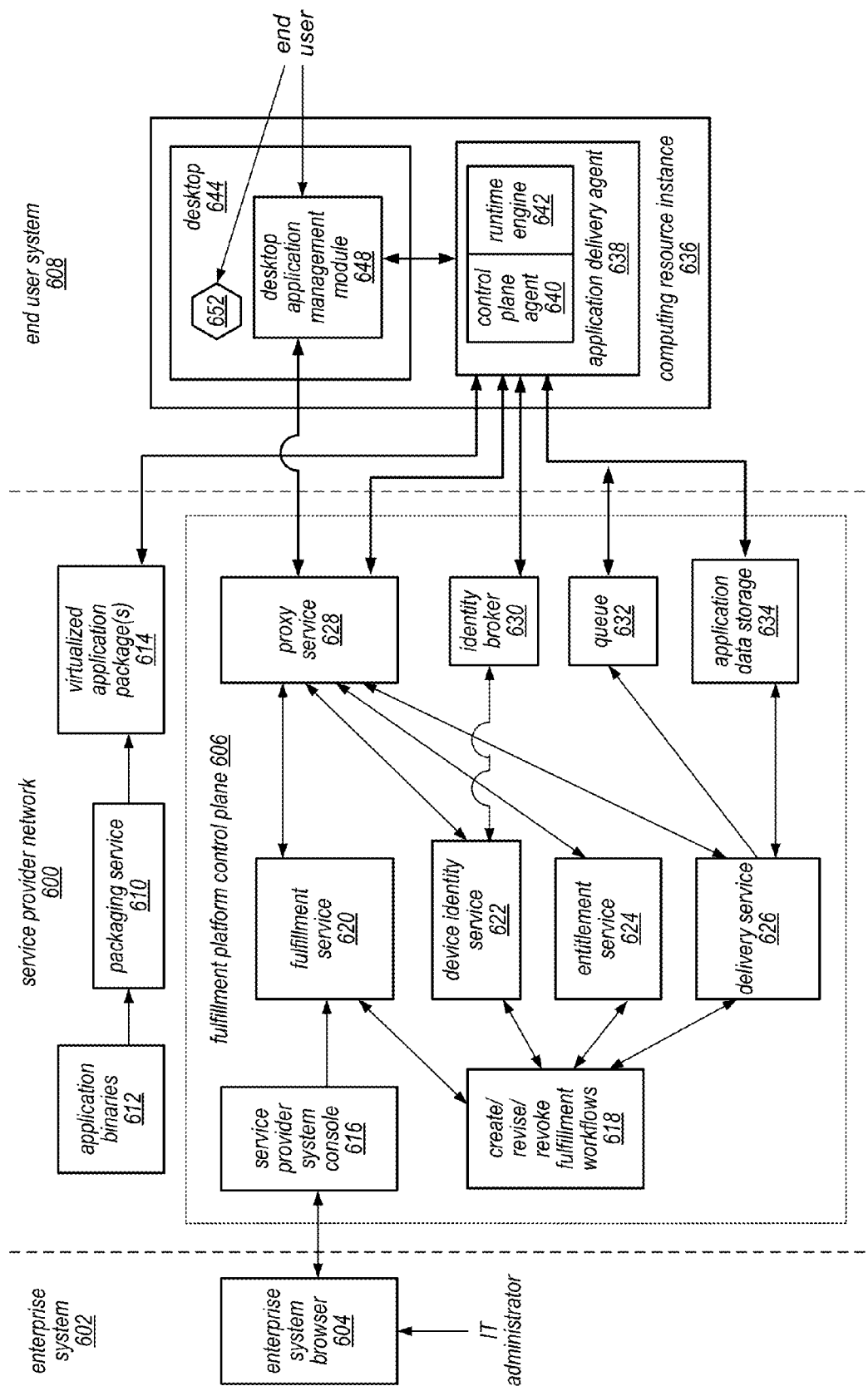
FIG. 6 is a block diagram illustrating components of an application fulfillment platform that provides on-demand delivery of applications to end users of service provider customers, according to one embodiment.

As noted above, in at least some embodiments, a service provider system may include an application fulfillment platform that is configured to provide on-demand delivery of applications (e.g., as virtualized application packages) to end users of service provider customers. FIG. 6 is a block diagram illustrating components of an application fulfillment platform, including components of the platform that execute on an enterprise system 602, a service provider network 600 (which includes a fulfillment platform control plane 606), and an end user system 608, that collectively provide on-demand delivery of desktop applications to various end users of service provider customers, according to at least some embodiments. The functionality of various ones of the components of the application fulfillment platform illustrated in FIG. 6 are described in more detail below. As illustrated in this example, an IT administrator may access a service provider system console 616 in the fulfillment platform control plane 606 through an interface mechanism of the enterprise system 602 (e.g., enterprise system browser 604). Note that, as described above in reference to FIG. 1, service provider network may also include physical and/or virtualized computing resource instances (e.g., computation resource instances and/or storage resource instance) and other storage resource (e.g., storage resources managed by a storage service) within or outside of the application fulfillment platform and its control plane 606 (not shown).

As illustrated in FIG. 6 and described in more detail below, fulfillment platform control plane 606 may include resources configured to implement a number of services used in providing on-demand delivery of applications to end users. For example, fulfillment platform control plane 606 may include a fulfillment service 620, which may be configured to initiate various workflows 618 (e.g., a create/revise fulfillment workflow and/or a revoke fulfillment workflow). These workflows may, in turn, invoke various operations of a device identity service 622, an entitlement service 624, and/or a delivery service 626. Fulfillment platform control plane 606 may also include a proxy service 628 (through which components of the end user system 608 may interact with at least some of the services implemented on fulfillment platform control plane 606) and an identity broker service 630.

As illustrated in this example, fulfillment platform control plane 606 may include a queue 632 (into which messages may be placed for subsequent retrieval by control plane agent 640 of end user system 608) and an application data storage component 634 (which may be configured to store application state data, application templates, or other application data, as opposed to any outputs or artifacts generated by the execution of an application). Fulfillment platform control plane 606 may also include a packaging service 610, which may be invoked by the service provider in order to transform executable files of a desktop application that are ingested into and/or stored on fulfillment platform control plane 606 (such as application binaries 612) into virtualized application packages (such virtualized application packages 614) for subsequent delivery to end user system 608 to fulfill a request for delivery of an application.

As previously noted, an end user's desktop (such as desktop 644 of end user system 608) may be implemented on a physical computing resource instance 636 (e.g., using physical hardware on the end user's local machine) or on a virtual desktop instance 636 (e.g., executing on one or more computing resource instances on machines at the service provider), either of which may run an operating system. As illustrated by the example in FIG. 6, in some embodiments of the application fulfillment platforms described herein, some components of the platform may be client-side components that are implemented (or that appear to an end user as if they were implemented) on end user system 608. For example, end user system 608 may include a computing resource instance 636, which may include a physical computer (e.g., a physical desktop or laptop computer or another type of physical computing device) and/or a virtualized computing resource instance (which may be implemented by physical resources of the application fulfillment platform or other physical resources of the service provider's system). In some embodiments, virtual desktop instances may be domain joined. For example, they may be joined to a service provider domain and/or to their own domains (e.g., their own company/enterprise domains). As illustrated in FIG. 6, an application delivery agent 638 and a desktop application management module 648 may be installed on (and may execute on) computing resource instance 636.

As illustrated in this example, a desktop application management module 648 may present on desktop 644 an interface through which the end user can interact with application fulfillment platform 606 to request and receive desktop applications on-demand. For example, an interface of this application may present a list of applications for selection by the end user (e.g., in order to subscribe to, install, and/or execute an application). In some embodiments, other user interface mechanisms, such as a shortcut or icon (shown as 652) through which the desktop application management module 648 or another selected application may be launched by an end user are presented on desktop 644. As illustrated in this example, an application delivery agent, which may include a control plane agent component 640 (e.g., one that is configured to interact with the fulfillment platform control plane 606) and a runtime engine component 642 (e.g., one that is configured to execute virtualized applications on behalf of the end user), may be implemented on the end user's computing resource instance 636. In some embodiments, the end user and/or control plane agent 640 may communicate with various ones of the services and resources provided by fulfillment platform control plane 606 through proxy service 628. The runtime engine component 642 may sometimes be referred to as a "player".

In some embodiments, various communication feeds (e.g., from service provider system console 616 and/or an intermediate service that processes some or all of the inputs received through service provider system console 616) may provide inputs to the fulfillment platform control plane 606, which is configured to provision the applications that are the subject of notifications to end users, according to the information about the application, the end users, and/or the constraints that is communicated by the communication feeds or that is otherwise discovered by the services of the fulfillment platform control plane 606. In some embodiments, the fulfillment platform control plane 606 may include multiple components that collectively provide services within the application fulfillment platform (e.g., internal services that perform functions on behalf of other ones of the services) and/or provide services to (or on behalf of) IT administrators or end users, including, but not limited to, a fulfillment service, a device identity service (which may be used in validating unique device identifiers), an entitlement service, a delivery service, and a proxy service.

Fulfillment Service:

In some embodiments, the fulfillment service (such as fulfillment service 620 illustrated in FIG. 6) may act as a central hub of the application fulfillment platform. For example, it may receive communication feeds (e.g., a listing feed and/or a principal feed) from the service provider system console 616, receive requests for subscribing to or unsubscribing from applications from end users (e.g., from control plane agents 640 executing on their computing resource instances 636 through proxy service 628) and/or may receive a notification when a new computing resource instance (e.g., a new virtualized computing resource instance and/or virtual desktop instance) is provisioned for an end user. In some embodiments, if (or when) a request is made (e.g., by an IT administrator) to provision or deprovision a computing resource instance (e.g., a virtualized computing resource instance or virtual desktop instance), an end user submits a request to subscribe to or unsubscribe from an application or to install, unstill, or launch an application, or an IT administrator submits a request or command that expresses some other intent, these requests/commands may be passed from the console to the fulfillment service 620 for handling.

In some embodiments, the fulfillment service 620 may maintain a record (e.g., a list) of the intended state of the application fulfillment platform for each user, which may detail the resources (including applications) that are intended to be assigned and/or provided to the end user. Inputs indicating the intended state may be received from the IT administrator (e.g., through service provider system console 616) or from an end user's machine (e.g., from control plane agent 640, through proxy service 628). For example, an IT administrator may, through a communication feed, provide input indicating that user1 belongs to a particular user group and has access to one or more specified applications according to specified constraints. In response to receiving one of such communication feeds, the fulfillment service may be configured to determine the appropriate action to take. For example, the fulfillment service may determine that it should provision a requested application (e.g., an application that specified in the received input as being part of the intended state for the end user), revoke access to an given application (if the application is not specified in the received input as being part of the intended state for the end user), or do nothing (e.g., if the current state for the end user matches the intended state for the user). Once the appropriate action is determined, the fulfillment service may initiate the execution of a corresponding workflow 618 for creating or revising an application fulfillment (e.g., a "create fulfillment" workflow, or a "revoke fulfillment" workflow). These workflows may then use one or more other services to actually provision or revoke the target applications. In some embodiments, rather than taking immediate action, application fulfillment platform control plane 606 may store the input indicating the intended state of the application fulfillment platform for a given end user for subsequent corrective action. In some such embodiments, the control plane agent 640 installed on an end user's computing resource instance 636 may be configured to poll the application fulfillment platform control plane 606 to determine the intended state (e.g., by reading the recorded intended state). In such embodiments, the control plane agent 640 may be configured to determine whether the current state matches the intended state, and if not, to initiate the taking of corrective action (e.g., initiating the performance of a "create fulfillment" workflow, or a "revoke fulfillment" workflow) through a communication with fulfillment service 620 (through proxy service 628).

In various embodiments, a "create fulfillment" workflow may include one or more of the following operations: delivering an executable application for installation in an end user's computing resource instance (such as an application binary 612) or a virtualized application package for the application to be executed on a virtualized computing resource instance or virtual desktop instance without installing the application itself on the virtualized computing resource instance or virtual desktop instance (such as one of the virtualized application packages 614 illustrated in FIG. 6), applying one or more constraints on use of the application by one or more end users (e.g., an environmental constraint, an input parameter constraint, a quota, or a billing constraint), assigning the application to one or more end users, adding a reference to an application to a list of applications presented by a desktop application management module 648 on desktop 644, modifying a reference to an application on a list of applications presented by desktop application management module 648 to indicate that the application is currently available for execution on the end user's computing resource instance, or creating a user interface element on desktop 644 (such as icon 652 or a start menu item) whose selection launches the application.

Similarly, a "revoke fulfillment" workflow may, in at least some embodiments, include one or more of the following operations: revoking an assignment of an application to one or more end users, delivering instructions to an agent (such as control plane agent 640) to remove or uninstall an executable application (such as an application binary 612) or a virtualized application package (such as virtualized application package 614) for the application from the computing resource instance 636, removing a reference to an application from a list of applications presented by desktop application management module 648, modifying a reference to an application on a list of applications presented by desktop application management module 648 to indicate that the application is not currently available for execution on the computing resource instance 636, or removing a user interface element from desktop 644 whose selection launches the application.

Entitlement Service:

In some embodiments, an entitlement service (such as entitlement service 624 illustrated in FIG. 6) may be configured to manage licenses and subscriptions for the applications provided by the application fulfillment platform. For example, in some embodiments, the assignment of an application to an end user (or user group) may represent an agreement to provide access to the application to the end user (or user group) for a specific period of time (e.g., for a specific number of months). In some such embodiments, the entitlement service may be configured to manage subscriptions on a monthly basis, to renew subscriptions periodically (e.g., at the end of each month) and/or at the end of their terms (if they are renewed) or to cancel them if they are not renewed. In some embodiments, the entitlement service may be configured to monitor the usage of the applications provided by the application fulfillment platform by end users or user groups, and/or to generate usage reports for end users or IT administrators periodically and/or on request, detailing license usage by the end users or user groups.

In some embodiments, when a "create fulfillment" workflow is invoked, the entitlement service may expose one or more APIs to the IT administrator (e.g., through a service provider system console 616). For example, these APIs may include a "register fulfillment" API, a "create monthly subscription" API, an API to request an end user license to be used for a particular application, or an API to request that a subscription be enrolled in a subscription renewal program (e.g., a monthly renewal program). Similarly, when a "revoke fulfillment" workflow is invoked, the entitlement service may expose one or more other APIs to the IT administrator. For example, these APIs may include a "deregister entitlement" API, a "cancel monthly subscription" API, a "cancel this license entitlement" API, or an API to revoke a particular user from a subscription renewal program (e.g., a monthly renewal program).

Delivery Service

In some embodiments, a delivery service (such as delivery service 626 illustrated in FIG. 6) may be responsible for application lifecycle management, the delivery of applications, and the fulfillment of applications on targeted machines. In some embodiments, after an entitlement service (such as entitlement service 624) has been invoked by a "create fulfillment" workflow to perform operations such as registering a fulfillment, or creating a subscription, license, or entitlement, the "create fulfillment" workflow may request that the delivery service deliver a particular application (e.g., application X) to a particular end user (e.g., user Y) on a particular computing resource instance (e.g., a virtual desktop instance Z), which is the target destination for the application.

In some embodiments, the delivery service 626 may include (e.g., for each end user machine and/or computing resource instance that is registered with fulfillment platform control plane 606) a respective outbound channel (which may be implemented as a queue, such as queue 632 illustrated in FIG. 6). Each of the outbound channels may be configured to receive and store messages for subsequent retrieval by the control plane agent 640 of the corresponding computing resource instance for the end user (e.g., a control plane agent 640 installed on an end user physical computing device, virtualized computing resource instance or virtual desktop instance) to which it is directed. In some embodiments, the control plane agent 640 may be configured to poll the outbound channel (e.g., periodically), to (at some point) extract any messages that are intended for delivery to the corresponding computing resource instance, and/or to perform and/or manage the work indicated in the messages. In some embodiments, when a message is put in a queue 632 that is intended for a particular end user device or computing resource instance, a notification may be sent to the end user device or computing resource instance indicating that there is a message to be retrieved from the queue. The message may include instructions to be performed by the control plane agent 640 installed on the computing resource instance, e.g., as part of a "create fulfillment" workflow to fulfill or install an application on behalf of the end user and/or as part of a "revoke fulfillment" workflow to revoke or uninstall an application from the end user device or computing resource instance.

Note that, in some embodiments, sending a message to enlist the delivery service in performing portions of a "create fulfillment" workflow may or may not imply that the corresponding resources (e.g., fulfilled applications) are assigned to the end user or the end user's computing resource instance 636 at that point. Instead, the instructions may include an indication of the resources that will be needed and instructions for the steps to take to fulfill/install an application or revoke/uninstall an application fulfillment at a later time. For example, the steps may include registering a session with the particular endpoint, going to a specified location (e.g., in an object or file storage system on the application fulfillment platform) to retrieve a particular file (or set of files) for the application, installing the file(s) in a specified order, and then activating the application (e.g., through another service call).

In some embodiments, an inbound channel may expose whatever the messages in the outbound channel indicate should be exposed. For example, the delivery service may expose an API "register session", after which an application delivery agent 638 (or control plane agent 640 thereof) that is installed and is executing on the computing resource instance may call the delivery service with its security credentials. In order to perform a step to fetch a specified binary file or virtualized application package from storage, the agent may ask the delivery service for the destination at which the application binary file or virtualized application packaged for a particular application can be found. The delivery service may return the location, after which the agent may report back to the delivery service that it has retrieved and/or installed the binary file or virtualized application package, and the delivery service may register its acknowledgement of fetching the binary or virtualized application package. In some embodiments, to install a virtualized application package, the agent may be responsible for virtualizing the virtualized application package for execution on the computing resource instance (which may include overlaying file system and/or register information for the virtualized application package on the operating system that is executing on the computing resource instance so that it appears that the application is installed on the operating system). Subsequently the agent may request that they delivery service provide it with an active license with which to activate the application. The agent may subsequently report to the delivery service that it has activated the application and/or that it has completed the act of virtualizing the application (as applicable).

In some embodiments, the delivery service may be configured to keep track of the state of applications and to perform various lifecycle management tasks for the applications. For example, the delivery service may keep track of which applications are executing on which computing resource instances, and the state of those applications on those computing resource instances (e.g., which versions of the applications are installed, whether as binary executables or as virtualized application packages). In some embodiments, this information may be used by the system (e.g., automatically) or by an IT administrator to determine when and if any of the applications should be updated.

Application Data Storage

In some embodiments, as an end user is using an application, executing the application may generate application data (e.g., application state data or application templates) in addition to (but not to be confused with) artifacts and/or results that are generated by executing the application. For example, in some embodiments, a company or enterprise that is a customer of the service provider may choose to create an application template (e.g., for a productivity application or a line-of-business application) and may request that all of its end users (e.g., employees or members of the same organization) use the same application template when using the application. These templates may be stored as application data on the fulfillment platform control plane 606 (such as in application data storage 634 illustrated in FIG. 6) by the delivery service (such as delivery service 626). Again note that artifacts/results generated by executing the application (e.g., documents, presentation materials or other outputs of the application) may not be stored on the fulfillment platform control plane 606 by the processes implemented on the application fulfillment platform, but may, in some embodiments, be stored elsewhere on the end user system 608 or service provider network 600 by other means. Note also that, in some embodiments, a user's application data (e.g., application state information or application templates stored in application data storage 634) may remain with an end user even if the end user subsequently executes the application on another physical computing device, virtualized computing resource instance, and/or virtual desktop instance. For example, if an end user installs an application to which the end user is entitled on a different virtualized computing resource instance or a different virtual desktop instance than the one on which the end user previously installed the application, any application data generated for, during, or by the previous installation may be brought along with the new installation and applied when executing the application on the new virtualized computing resource instance or on a different virtual desktop instance.

Identity Broker

In various embodiments, computing resource instances (including virtualized computing resource instances or virtual desktop instances) may be implemented on computing devices that are domain joined to an active directory. In such embodiments, a user may log into a computing resource instance using their active directory. In some embodiments, in order to access service provider services and/or resources, the end user may have to go through an identity access management (IAM) process or protocol implemented by the service provider before gaining access to at least some of the applications and/or services provided by the application fulfillment platforms described herein. For example, an end user may be logged into a particular computing resource instance using their active directory, but the fulfillment platform control plane 606 may only understand roles and/or tokens generated by the IAM process/protocol. Thus, after logging into the computing resource instance, the user may not have the proper credentials to access the applications and/or services provided by the application fulfillment platform.

As described in more detail below, in some embodiments, an identity broker service (such as identity broker 630 illustrated in FIG. 6) may be configured to federate an active directory user in order for the user to gain access to service provider resources. For example, an active directory identifier ticket (e.g., one provided by a domain controller) may be presented to the identity broker service specifying that a principal (user) X wants access to a particular application on machine Y that is connected to domain Z. The identity broker service may communicate with a service provider active directory service (e.g., a domain controller) and/or another device identity service (such as device identity service 622) requesting authentication of the user (X) and/or the user's machine (Y) and the return of a security token that is subsequently usable in accessing service provider resources. As illustrated in the example in FIG. 6, in some embodiments, the application delivery agent 638 installed on an end user's computing resource instance 636 (or a control plane agent 640 thereof) may communicate directly with the identity broker service rather than through proxy service 628.

Proxy Service:

In some embodiments, backend services of an application fulfillment platform (e.g., fulfillment platform control plane services) such as those described above (e.g., a fulfillment service, an entitlement service, a delivery service, and/or an identity broker service) may not be exposed to the public (e.g., to end users). For example, these services may not be exposed to end users in an attempt to avoid exposing them to potential malicious attacks (e.g., denial of service attacks or other types of attacks). Instead, a proxy service (such as proxy service 628 illustrated in FIG. 6) may be exposed to end users, and this proxy service may be configured to validate the identity of an end user who attempts to access the services of the application fulfillment platform and/or to enforce any applicable metering or throttling policies (e.g., limiting access in order avoid denial of service attacks or other types of malicious accesses) for requests received from end users. As illustrated in the example in FIG. 6, in some embodiments, the application delivery agent 638 installed on an end user's computing resource instance 636 (or a control plane agent 640 thereof) may, on behalf of an end user, communicate with the fulfillment service 620, device identity service 622, entitlement service 624, and/or delivery service 626 though proxy service 628. If (or once) an end user's identity has been validated, the proxy service may pass or dispatch requests received from the end user to the appropriate backend service (e.g., a fulfillment service, an entitlement service, or a delivery service) for processing.

In some embodiments, if an application delivery agent (or a control plane agent 640 thereof) installed on an end user's computing resource instance 636 wishes to subscribe to an application (on behalf of the end user), the agent may send a request to the proxy service, which may validate its security token, verify that the user is entitled to access the appropriate backend services (through the end user's computing resource instance), and route the request to the fulfillment service. In response, the fulfillment service may process the request and send a response back to the proxy service. In another example, if an agent installed on an end user's computing resource instances wishes to fetch a message from the outbound channel (e.g., queue 632) for its computing resource instance, the proxy service may present the security token to the queue and, once access to the message is verified, return the message to the agent.

Packaging Service

In some existing systems, to deliver desktop applications to an end user, executable versions of those desktop applications (e.g., application binaries) are physically installed on an end user's physical computing device (whether or not the physical computing device implements a remote computing application to manage a remote computing session (e.g., a virtual desktop session). In these systems, when an underlying virtual desktop instance is rebuilt, all of the applications and application data associated with that virtual desktop instance is lost and the end user has to reinstall all of the applications on the newly rebuilt virtual desktop instance. In some embodiments of the application fulfillment platforms described herein, rather than physically installing desktop applications on the machines of end users or installing application binaries on the computing resources that implement a virtual desktop instance, delivering at least some applications (e.g., desktop applications) may first include transforming them from one form to another. For example, an office productivity application or browser application may be transformed into a virtualized application package, pages of which may be delivered on demand.

In some embodiments, a virtualization packager (such as packaging service 610 illustrated in FIG. 6) may be configured to virtualize the program instructions of an executable application (such as an application binary 612) to create a virtualized application package (such a virtualized application package 614) that includes a sequence of blocks of virtualized program instructions (also referred to herein a pages of virtualized program instructions). These virtualized program instructions specify how the instructions would execute on the system. In some embodiments this application virtualization technology may include a runtime engine (such as runtime engine 642 in FIG. 6) that intercepts all function calls to the operating system of the end user's computing resource instance and executes the virtualized program instructions of the packaged application in an isolated virtual environment (e.g., an isolated container). In other words, the application may behave as if it is running alone in the operating system. In some embodiments, the runtime engine may begin fetching pages of virtualized program instructions (e.g., using demand paging) and may begin executing them before all of the pages have been fetched (e.g., after 5% of the pages, or fewer, have been fetched). In some embodiments, pages that have previously been fetched may be stored locally (e.g., on the end user's machine) in an encrypted cache and subsequently executed (e.g., one or more times). In such embodiments, the performance of the application may be similar to the performance of a native application (e.g., an application binary) that is installed locally on the end user's physical computing device.

In some embodiments, each application (or at least some of the applications) provided by the application fulfillment platforms described herein may be repackaged as a virtual application packaged using a process that is largely automated that does not require any changes to be made to the application or even access to the source code. In some embodiments, in addition to transforming an application into a sequence of blocks of virtualized program instructions, the packaging service may also encrypt the resulting virtualized application package. In some embodiments, the application virtualization described herein may enable applications to run on end users' computers without having to go through the usual install process. Eliminating that installation step and isolating applications from the underlying operating system may enable much more dynamic and flexible application delivery, when compared with classic application installations. For example, the application virtualization described herein may provide, for each application, an isolated container, which may provide flexibility to dynamically move applications and application data across computing resources (including virtualized computing resource instances and/or virtual desktop instances) and instant access to applications. In some embodiments, application updates and/or rollbacks may be applied using the application virtualization described herein with no impact to end users. Note that in some embodiments, the fulfillment platforms described herein may include a commercial virtualization packager and corresponding runtime engine, while in other embodiments, such platforms may include custom virtualization packagers and/or runtime engines.

Administrator Tasks

As previously noted and described in more detail below, in order to manage the delivery of applications to end users, an IT administrator of a business, enterprise, or other organization may be able to perform a variety of different actions through an administrator console of an application fulfillment platform (such as service provider system console 122 in FIG. 1 or service provider system console 616 in FIG. 6), many of which fall into one of the following three broad categories:

1) Building a catalog for the organization, where the catalog is a collection of applications that may include any of the following application types:
   the organization's own line-of-business (e.g., custom) applications
   applications for which the organization has purchased licenses, including enterprise-wide licenses (e.g., applications that may be included in the catalog under a "bring your own license" model)
   applications purchased or leased from the service provider (e.g., applications that were developed by the service provider or that were purchased or leased by the service provider for the benefit of its customers)
2) Assigning particular applications to specific end users and/or user groups in the same organization
3) Generating, obtaining, and/or viewing reports indicating the usage of the applications that are provided through the application fulfillment platform to end users in the same organization As noted above, the systems and methods described herein for implementing an application fulfillment platform may, in various embodiments, allow large enterprises to create and manage catalogs of software applications and computation services, including server applications that execute in a cloud computing environment and desktop applications that execute on physical computing devices, virtualized computing resource instances, and virtual desktop instances. These systems may allow service provider customers (e.g., enterprises) to ingest their own line-of-business applications (e.g., server applications and/or desktop applications) into the catalogs, through which they may be made available for use by their end users. In some embodiments, an IT administrator of a service provider customer may interact with the service provider system through an administrator console to assign and provision applications to various end users and/or to define constraints on the use of those applications.

In one example, a semiconductor manufacturer that is a service provider customer may include in their catalog proprietary applications used in designing and/or fabricating integrated circuit devices (e.g., applications that were designed by, or on behalf of, the company and that are exclusively used by employees of the company, and then only with permission), and delivery of these applications may be managed through an application fulfillment platform such as those described herein. In another example, a company that is a service provider customer may procure large enterprise-wide licenses for commonly used commercial products in order to provide unlimited access to those product to its employees. These applications may be included in a catalog for the company and delivery of these applications may be managed through an application fulfillment platform such as those described herein. In yet another example, a company may purchase or lease short-term licenses to a desktop application or another commonly used commercial application (e.g., licenses to a drawing application for 6 employees for 6 months) from the service provider, include that application in its catalog, and manage delivery of that application to its employees through an application fulfillment platform such as those described herein. In other words, a company that wishes to use one or more applications for software trials, short-term needs or low-volume needs may obtain access to those applications through an "applications on-demand" model that is managed through the application fulfillment platform (thus, taking advantage of the more favorable terms that may be received by the service provider as a higher volume customer of the application vendor).

As noted above, in some embodiments, applications (e.g., individual applications and/or collections of applications) may be assigned by an IT administrator to individual users and/or user groups in an active directory to allow access to those applications. For example, an active directory of an enterprise (e.g., a company that is a customer of a service provider) may sit at the center of its resource management processes. Resources (e.g., users, computers, printers, or other corporate resources, each of which may have its own identifier) may be connected to the active directory, and an IT administrator at the company may give users access to particular ones of the resources. In some embodiments, an IT administrator may create a cloud-based active directory for the enterprise. In other embodiments, connections may be made from a virtual desktop instance to an active directory (or domain controller) on an enterprise computer system.

In some embodiments, the IT administrator may, through an administrator console (e.g., a service provider system console) assign particular applications to specified users (and/or user groups) by selecting one or more users and/or user groups in its active directory from a display of the active directory (or through another interface into the active directory). For example, the IT admin may be able to assign applications (e.g., one or more desktop applications, such as an office productivity suite, a data analysis application and/or a browser application) to the selected users and/or user groups (e.g., groups of users that are defined in the active directory as the "development team" or "legal team"). In another example, an IT administrator may wish to provision a desktop application (e.g., a word processing application) to user1, user2, and group1 in an active directory. The actions taken in order to carry out that fulfillment may depend on the type of application. In this example, since the application is a desktop application that is available through an application fulfillment platform, the IT administrator may (e.g., through an administrator console) assign the desktop application to user1, user2, and group1, and fulfilling the intended state for user1, user2, and group1 may include invoking various ones of the services illustrated in FIG. 6 and described above.

In some embodiments, the IT administrator may, through an administrator console (e.g., a service provider system console) also be able to apply various constraints on the use of selected applications by the users or user groups to which the applications are assigned (either individually, or collectively). For example, in various embodiments, the constraints that may be applied by the IT administrator may be broadly categorized as being one of the following four types: environmental constraints (which may restrict the region in which an application can be provisioned), input parameter constraints (which may restrict the set of valid values for input parameters that can be entered when an application is provisioned or updated), quotas (which may allow the administrator to control the number of concurrent deployments of a given application) and billing constraints (which may allow the administrator to control spending limits on an application by application basis).

In one example, the collection of three applications described above may be assigned to three active directory users, one of which may represent a user group. In this example, constraints may be set indicating that user1 should use a particular version of application1 (e.g., an office productivity suite) and should not have access to any updated versions of application1; that user2 should use a particular version of application2 (e.g., a data analysis application) that is compatible with a particular operating system revision and should not have access to any updated versions of application2; and that user3 (which may represent a group of active directory users) may have access to application3 (e.g., a browser application) that should always be kept current (e.g., with updates applied automatically, when available).

As noted above, in some embodiments, the IT administrator may, through an administrator console (e.g., a service provider system console) be able to generate, obtain, and/or view reports indicating the usage of the applications that are provided through the service to their end users. For example, these reports may indicate how many (and/or which) users are using each application, how many (and/or which) users are using each version (e.g., the latest version or an outdated version) of a particular application, the duration for which each application is used by one or more users, and/or other usage information. The information in these reports may be used by the IT administrator to determine which of several available licensing models (e.g., on-demand subscriptions using licenses obtained by the service provider, enterprise licenses obtained directly from the software vendors but managed by the service provider, etc.) may be most suitable for the software being used by their organization.

In some embodiments, launching a virtual desktop instance may include making selected applications available to end users through a desktop application management module interface, according to the constraints and configuration parameter settings for the selected applications and users. In some cases, this may include installing any required applications and/or making certain applications (e.g., those applications that are assigned to a particular end user or those an end user is allowed to know about) visible and/or selectable through a desktop application management module interface or (once they are installed on an end user machine or in a virtual desktop instance) through an icon, shortcut, menu element, or other user interface mechanism or element thereof that was created on the desktop for the application and whose selection launches the application.

Again note that, in some embodiments and/or for some applications, "installing" a required or optional application may not include installing the application itself (i.e., an unpackaged application binary) on an end user's physical computing device, virtualized computing resource instance or virtual desktop instance, but may involve delivering some or all of the pages of program instructions of a virtualized application (e.g., using demand paging) to the end user's computing resource instance for execution by a runtime engine that is installed in the end user's computing resource instance.

As previously noted, it may be difficult for a large enterprise (e.g., one that includes a large number of end users who wish to have access to many applications on many different machines) to keep all of the applications its employees may wish to use (e.g., 50 or 60 applications per user) up to date using the traditional approach of physically installing applications on each machine. In various embodiments, the systems and methods described herein may allow enterprise customers to fulfill applications for the use of their end users through a different paradigm, i.e., one that is based on application virtualization. In such embodiments, each application (or version thereof) may be virtualized and packaged to create a virtualized application package (e.g., in an isolated container). These virtualized application packages may not be physically installed on an end user's machine, but instead may be executed on service provider resources (at runtime) by an agent that is installed on (and is executing on) a virtual desktop instance and that appears to be executing on the end user's machine.

As illustrated in FIG. 6 and described above, in some embodiments, the application delivery agent 638 may include a control plane agent (such as control plane agent 640) that interacts with the fulfillment platform control plane and the services implemented on the control plane, and another component (a runtime engine, such as runtime agent 642) that executes the virtualized program instructions of virtualized application packages on behalf of the end user. In some embodiments, the control plane agent 640 may communicate with various control plane components and services (e.g., an identity broker service and/or outbound channel queue) directly or through a proxy service of the fulfillment platform control plane. For example, in some embodiments, when an end user's machine boots up, its control plane agent may communicate with the identity broker in order to register the machine with the fulfillment platform control plane. In this example, the control plane agent may present a credential (e.g., a machine-level security token or ticket) for a machine Y and may request that the identity broker authenticate and register machine Y with the fulfillment platform control plane. The identity broker may validate the machine, which may include determining whether the owner of the machine has a valid account (e.g., determining whether the account ID associated with the machine is a valid account ID for an enterprise that is a customer of the service provider). If the machine is validated, the identity broker may register the machine with the fulfillment platform control plane.

In some embodiments, once an end user's machine has been registered with the fulfillment platform control plane, when the end user logs onto this machine, the control plane agent on the machine may present another type of ticket (e.g., a user-level ticket, such as a user sign-in ticket that was obtained from a domain controller) for validation. For example, the user sign-in ticket may indicate that a user X logged onto machine Y on domain Z, and if the identity broker validates the ticket, it may return a security token that the end user can use to access other fulfillment platform control plane services through the proxy service.

In some embodiments of the fulfillment platforms described herein, the runtime engine portion of the agent on which virtualized applications can execute (such as runtime engine 642 illustrated in FIG. 6) may be specific to the virtualization packager (such as packaging service 610) that is used to transform them into virtualized applications. For example, the runtime engine and virtualization packager may share common instruction formats, file formats, file structures, and/or other features that enable the interpretation of the virtualized applications by the runtime engine.

In some embodiments, each of the virtualized applications that are packaged by the packager may be isolated into a container, such that the contents of each container is executed in isolation by the runtime engine and the individual applications do not know anything about each other. This isolation may allow multiple generations and/or versions of an application to execute on the same physical machine. In various embodiments, and depending on various settings (e.g., off-line or on-line only), the page blocks that make up a virtualized application may or may not be stored locally on the end user's machine during (or following) their execution by the runtime engine.

As previously noted, in some embodiments, an application (which is sometimes referred to herein as a desktop application management module) may be installed on an end user's machine or on a virtual desktop instance that provides an interface to virtualized desktop applications delivered from an application fulfillment platform. In some embodiments, this application may also provide an interface through which applications that are (or can be) physically installed on the end user's machine may be installed or launched. For example, after launching the desktop application management module (e.g., by selecting an icon or shortcut on the desktop or on a virtual desktop), an end user may, through a graphical user interface of the desktop application management module, log into the desktop application management module using their identity, view a list of applications that are available for their use (e.g., applications that they have permission to purchase, lease or subscribe to, install, and/or execute) or that may be made available for their use (e.g., applications for which they may be able to request permission to purchase, lease or subscribe to, install, and/or execute) and select on option to purchase, lease or subscribe to, install, and/or execute one of the listed applications.

Figure 7A:
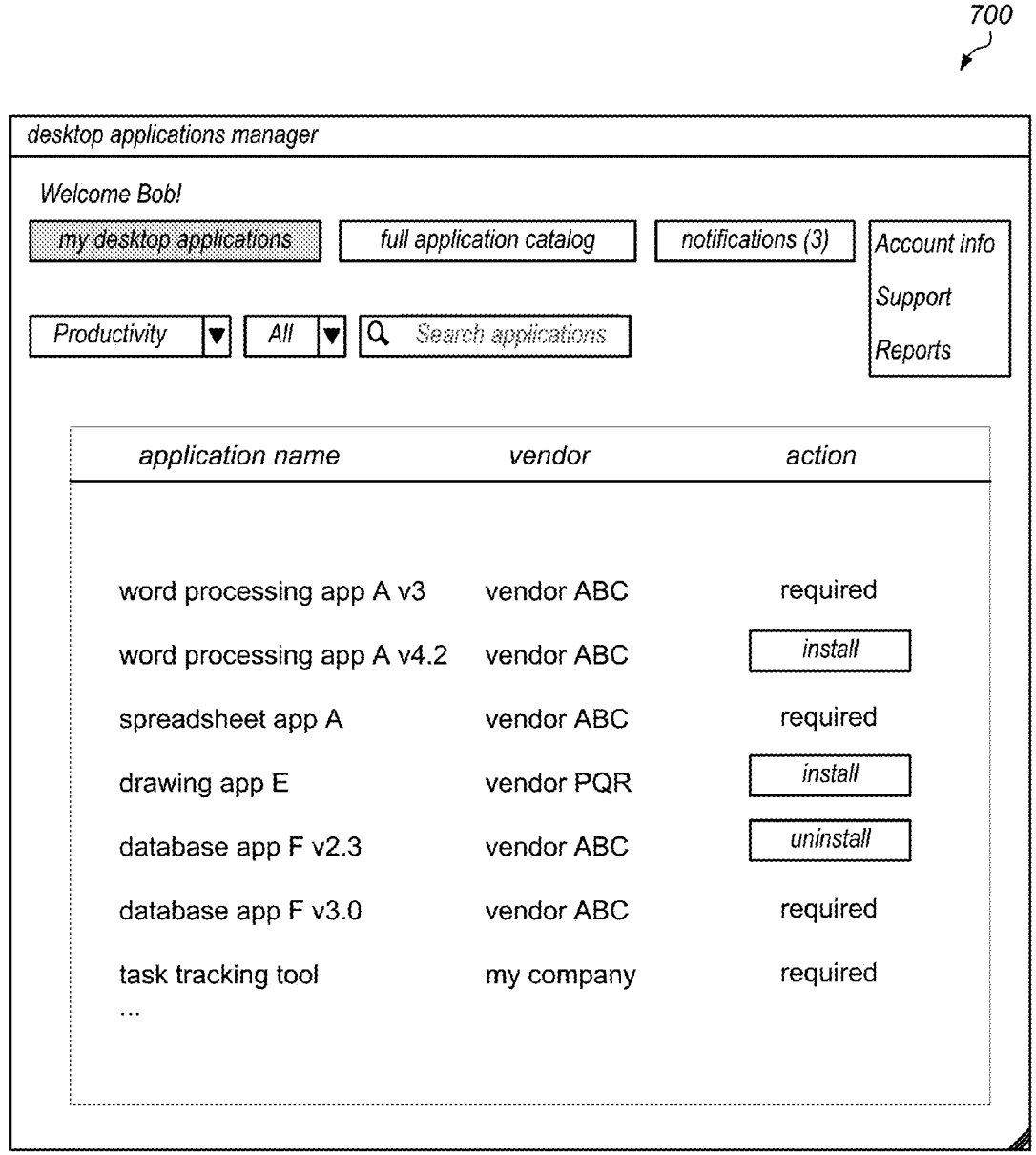
FIGS. 7A and 7B illustrate examples of the information presented through a graphical user interface for a desktop application management module, according to at least some embodiments.

One embodiment of a graphical user interface 700 for a desktop application management module that is installed on an end user's computing resource instance, such as desktop application management module 132 illustrated in FIG. 1 or desktop application management module 648 illustrated in FIG. 6, is illustrated by the block diagram in FIG. 7A. In this example, an end user has chosen to view applications that are assigned to the end user or are part of a catalog of applications made available to the end user and/or one or more other end users by an IT administrator in the same business, enterprise, or organization ("my desktop applications"). In response to this selection, a list of applications is presented to the end user. In this example, the list of applications indicates, for each application, an application name, the vendor from which the application is sourced, and an available action that can be taken for the application (e.g., "install", for an application that is not currently installed on the end user's computing resource instance, or "uninstall", for some of the applications that are currently installed on the end user's computing resource instance). Note that for several of the applications, the action is shown as "required." This may indicate that these applications must be installed on the end user's computing resource instance (e.g., they may have been installed automatically when the computing resource instance was configured or when the desktop application management module was launched) and cannot be uninstalled (until and unless this requirement changes). Note that one of the applications in the list (a task tracking tool) was developed by the end user's company and ingested by the service provider for management through the application fulfillment platform. Applications may be listed in any order, in different embodiments, e.g., in alphabetical order by name or vendor, by application type (e.g., productivity applications, data analysis applications, line-of-business applications, etc.), or by availability (e.g., required applications, optional applications that have been installed, optional applications that have not been installed, etc.). As illustrated in this example, the end user may have the option to search the list of applications in order to display specific ones of the applications in the user interface for the desktop application management module. Note that this catalog may include customer-specific line-of-business applications (such as the task tracking tool described above); applications that were developed and/or published by the service provider; applications that were developed, published, and/or otherwise sourced by an entity other than the end user's company or the service provider and that were purchased or licensed by the service provider for the benefit of service provider customer and their end users; and/or applications that were developed, published, and/or otherwise sourced by an entity other than the end user's company or the service provider and that were purchased or licensed by the end user's company for the benefit of their end users.

Figure 7B:
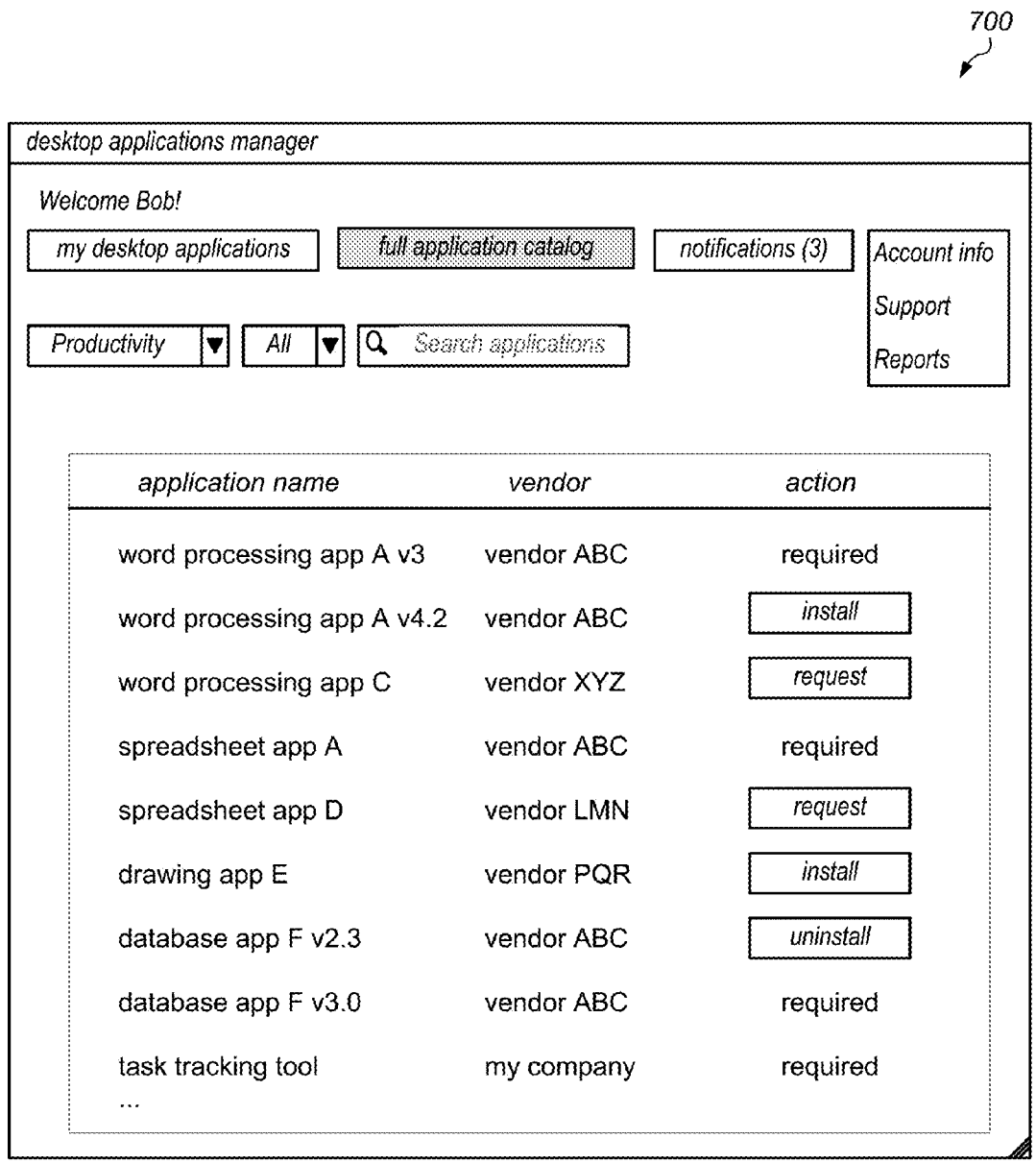

As illustrated in this example, in some embodiments the end user may (e.g., based on constraints or permissions applied by their IT administrator) have the option to view a "full application catalog." FIG. 7B illustrates the graphical user interface 700 of FIG. 7A when the end user has chosen to view information about the full application catalog. As in the previous example, this catalog may include customer-specific line-of-business applications (such as the task tracking tool described above), applications developed and/or published by the service provider, and/or applications developed and/or published by someone other than the end user's company or the service provider. However unlike in the example illustrated in FIG. 7A, the full application catalog displayed in FIG. 7B may include customer-specific line-of-business applications, applications developed and/or published by the service provider and/or third party applications that have not been assigned to the end user or that are included in a catalog that is made available to the end user by their IT administrator (including some for which the business, enterprise, or organization does not yet have a subscription or license) instead of, or in addition to, applications that are included in a catalog of applications made available to the end user and/or one or more other end users by an IT administrator (whether or not the applications are assigned to the end user). For example, the list of applications presented in the graphical user interface illustrated in FIG. 7B includes a word processing application (word processing app C) and a spreadsheet application (spreadsheet app D) that are not currently assigned to the end user or included in the catalog presented in FIG. 7A. In this case, the end user may select a "request" action in order to request access to (e.g., a subscription to) one of these applications. If the application has not yet been licensed by the service provider or the end user's company, selecting this action may, if the request is approved, initiate the acquisition and/or licensing of the application by the service provider or the end user's company and the ingestion of the application into the application fulfillment platform.

Note that, as illustrated both FIG. 7A and FIG. 7B, in some embodiments, the end user may also have the option to view "notifications" through the user interface of the desktop application management module. For example, the end user may receive a notification when a new application is made available to the end user individually, is added to a catalog of applications that are assigned or otherwise to the end user, or is added to the full application catalog, or when a new generation or version of an application to which the end user is currently subscribed is made available.

As illustrated in both FIG. 7A and FIG. 7B, the end user may request one or more reports (e.g., through selection of the "Reports" item in the user interface of the desktop application management module). As described above, these reports (which provide usage information for various applications, such as those applications that are assigned or available to the end user) may be generated on demand (e.g., in response to requests from an IT administrator or end user) or periodically, and may be presented to an IT administrator or end user when they are generated or upon request, according to various embodiments. Note that the graphical user interface 700 may, in other embodiments, display more, fewer, or different elements than those illustrated in the examples shown in FIG. 7A and FIG. 7B. For example, in some embodiments, an additional user interface element may display a list of top rated (or most heavily used) applications for this enterprise or for all customers, links to ratings or reviews of applications, or any other information about applications that are currently available to (or may be request by) the end user.

In some embodiments, once an end user logs into the desktop application management module, their applications (e.g., any application assigned to the end user) may be available and ready to use. In some embodiments, the end user may access their application just like they access any other desktop applications (e.g., through a start menu or a desktop icon or shortcut). Through the desktop application management module, the end user may be able to select one or more of the following options:

View information about applications that were made available to the end user by their IT administrator Subscribe to optional applications Remove optional applications Request access to additional applications that are listed in the full application catalog, which may include applications sourced by the service provider and/or by third parties (if enabled by the IT administrator)

Back up their applications and configurations (e.g., automatically)

Receive notification about applications and application updates

In some embodiments, if the IT administrator has designated an application as "required" for a given end user, it will be installed on an end user's virtual desktop instance by default, and cannot be removed. However, if the IT administrator has designated an application as "optional", it may only be installed on the end user's virtual desktop instance if the end users choose to subscribe to the application. As noted above, if the IT administrator has enabled the full application catalog as viewable for a given end user, user group, catalog, or portfolio, the end user may be able to discover additional applications that are sourced by the service provider and/or third parties, and select a "request application" option, which may automatically submit a request to the IT administrator for the selected application.

In some embodiments, when a software vendor provides an update to the application fulfillment platform (or to the service provider) the service provider may (e.g., through the application fulfillment platform) publish the update and make it available to end users (e.g., through the desktop application management module. In some embodiments, the IT administrator may be able to control the maintenance window in which application updates are applied to the computing resource instances of its end users. In such embodiments, if an end user is using an application that is targeted for an update during the maintenance window, the end user will not experience any interruption, because the update will occur in the background. However, the next time the end user launches the application, the update will be applied. In some embodiments, there may be a notification engine within the desktop application management module that is configured to inform end users of upcoming application updates and newly available features. The notification engine may be accessed through the desktop application management module graphical user interface (e.g., using the "notifications" tab shown in FIGS. 7A and 7B), or using other mechanisms, in different embodiments. For example, if the IT administrator has made new optional applications available for end users to subscribe to, they may be notified through the desktop application management module. In some embodiments, the application fulfillment platform may preserve application state by automatically backing up applications and application data for subsequent copy or restore operations. For example, if the virtual desktop instance is rebuilt, the applications and application data may be automatically restored on the virtual desktop instance. Similarly, upon rebooting an end user's machine after a failure, the virtual desktop instance may automatically be rebuilt, and the applications and application data may be automatically restored.

In one example, an end user may (through the desktop application management module) select an option to subscribe to a particular listed application. In response, a subscribe request may be sent (e.g., by a control plane agent, such as control plane agent 640 illustrated in FIG. 6) to a proxy service (such as proxy service 628) using the user's security credentials, and the proxy service may route the request to a fulfillment service (such as fulfillment service 620). In this example, the subscription request may indicate that user X on machine Y connected to domain Z requests access to the selected application. The fulfillment service may verify whether the end user is entitled to use the selected application and, if so, may initiate the execution of a "create fulfillment" workflow and send a message to that effect to the outbound channel for the target end user machine or virtual desktop instance (e.g., a queue such as queue 632 in FIG. 6).

On the end user's machine, the control plane agent may (e.g., after communicating the subscription request to the proxy service) poll the outbound channel (queue) looking for messages that are directed to the end user (or to the end user's machine). In this example, since the subscription request included an indication of the end user's machine, the fulfillment service, having a respective outbound channel (queue) for each end user machine and/or virtual desktop instance that is registered with the application fulfillment platform, knows into which of multiple outbound channels (queues) the message should be placed, and a corresponding control plane agent (such as control plane agent 640) may retrieve the message from that queue. Once the message has been retrieved, the control plane agent may be configured to carry out the steps that are indicated in the message for fulfilling the requested application subscription. For example, the control plane agent may be configured to work through a sequence of steps that include registering a session, virtualizing the selected application, generating an icon or shortcut for the virtualized application and placing it on the end user's machine (e.g., on the desktop or on the virtual desktop) and/or adding the virtualized application to a start menu or other interface mechanism, among other actions.

In some embodiments, once the selected application has been virtualized and an icon, shortcut, menu item, or other user interface mechanism has been provided on the end user's machine (e.g., on the desktop or on the virtual desktop), it may appear to the end user as if the selected application is physically installed on the end user's machine, even though the binary for the selected application is not, in fact, installed on the end user's machine. In this example, when the end user invokes the selected application (e.g., by selecting the icon, shortcut, menu element, or other user interface mechanism or element thereof for the selected application), a runtime engine component of the agent on the end user's machine (such as runtime engine 642) may be launched to execute the virtualized application. In some embodiments, the runtime engine component may be implemented as a driver-level engine. In some embodiments, the runtime engine component may observe that the user is launching a virtualized application and may intercept the launch. The runtime engine component may use its device-level (i.e., machine-level) security token to communicate to a delivery service of the fulfillment platform control plane (such as delivery service 626) that machine Y is starting to deliver the sequence of files or pages of virtualized program instructions that make up the selected virtualized application and to ask the delivery service for instructions. The delivery service may then (e.g., through messages placed in the outbound channel for machine Y) provide instructions to the control plane agent to start making the files or pages of virtualized program instructions available for execution. As the end user begins to use the selected application (i.e., at runtime), the files or pages of virtualized program instructions that make up the selected virtualized application may be made available for execution on the runtime engine component of the agent on the end user's machine. In some embodiments, once the end user is finished using the selected application, the files or pages of virtualized program instructions that make up the selected virtualized application may be cleaned up (e.g., remnants of the files or pages of virtualized program instructions may be removed from local memory), but any application data that was generated for, during, or by the execution of the virtualized application (other than artifacts/results of its execution) may be persisted (e.g., in an application data storage component of the fulfillment platform control plane) for use in a subsequent execution of the selected application by the end user. In other embodiments, the files or pages of virtualized program instructions may be stored locally (e.g., in an encrypted cache from which they may subsequently be executed (e.g., if the end user begins to use application again).

In some embodiments, a fulfillment service (such as fulfillment service 620) may provide APIs for service calls, including service calls (made through the administration console) to create or update an application deployment (i.e., a service call that includes an indication of an intended state for an application fulfillment). In response to one of these calls, the fulfillment service may be configured to insert deployment metadata into a deployments table with a "pending" status. If successful, the fulfillment service may insert the deployment request into a queue of such requests. Subsequently, the deployment request may be retrieved from the queue, and a deployment workflow may be launched to process the request. The deployment workflow may include determining the end users and user groups to which an application being deployed is currently assigned (if any), comparing it with the request, and editing a stored mapping between users and the application if necessary; creating a fulfillment request for deployment of the application; and adding the fulfillment request to a queue of pending fulfillment requests (e.g., a queue of pending requests to fulfill an intended state for a given user, such as queue 632). In some embodiments, a control plane agent 640 of a virtual desktop instance that is provisioned for the use of the given user (or a long polling thread thereof) may be configured to poll a queue 632 of pending fulfillment requests for the given user and to perform the requested tasks in those requests.

As previously noted, in some embodiments, the systems described herein for providing on-demand delivery of desktop applications to virtual desktop instances may implement multiple authentication mechanisms. For example, in some embodiments, end users may be registered and their identities authenticated separately from their computing resource instances (e.g., their physical devices, or virtualized computing resource instances or virtual desktop instances that are provisioned on their behalf), after which the platform may register the association between the end users and their computing resources instances. Note that in some embodiments, an application delivery agent such as those described herein may be installed on a virtual desktop instance. In such embodiments, the agent is not executing on the end user's client device (e.g., their physical computing device, such as a desktop computer, laptop computer, smart phone, or tablet computing device) but is executing on a virtual desktop instance that is implement on a virtualized computing resource instance running (e.g., in a data center) on a service provider network. In some embodiments, an application delivery agent (which is a client-side component of the application delivery platforms described herein) and/or a client-side component of the virtual desktop instance described herein may be downloaded through a product discovery portal implemented by the service provider, or may be available through a portal that provides access to products specifically configured for use on a particular physical computing device or for use with a particular operating system running on a physical or virtual a computing resource instance. After downloading these clients, an end user may gain access to the virtual desktop instance and/or the application fulfillment platform services described herein by first entering their domain credential to get connected to their specific virtual desktop instance that runs on service provider resources in the cloud (e.g., a virtualized computing resource instance that has modified to mimic the features of the desktop or over which a virtual desktop instance is built).

In some embodiments, there may be multiple authentication processes that must take place before an end user can access the control plane services or virtualized applications provided by the fulfillment platform. For example, as described in more detail below, one authentication process (e.g., a device-level authentication) may result in the identity broker service described above providing a device-level security token that allows the control plane agent executing on an end user device (e.g., the end user's physical computing device or virtualized computing resource instance) to access to the outbound channel (queue) and proxy service of the fulfillment platform control plane. A second authentication process (e.g., a user-level authentication) may result in the identity broker service providing a user-level security token that allows the end user to access the proxy service of the fulfillment platform control plane only. In some embodiments, separating these two authentication processes may allow some end users to have dedicated devices (e.g., physical computing devices or virtual desktop instances that are allocated from a pool of such devices and on which they are the sole user) and/or may allow multiple end users (or terminals) to use the same device (e.g., to share a single physical computing device or a single virtual desktop instance). For example, a device-level authentication may be valid when the control plane agent needs to communicate with the fulfillment platform control plane on behalf of any and all end users who are logged into the device. However, the end users themselves may only be able to access the resources for which they have permissions through their own user-level authentications.

In some embodiments, the application fulfillment platform control plane may be primarily responsible for identity validation, accessing messages in the outbound channel (queue), accessing and persisting application data (in an application data storage component), and communicating with a proxy service to provide access to backend services of the fulfillment platform control plane.

Figure 8:
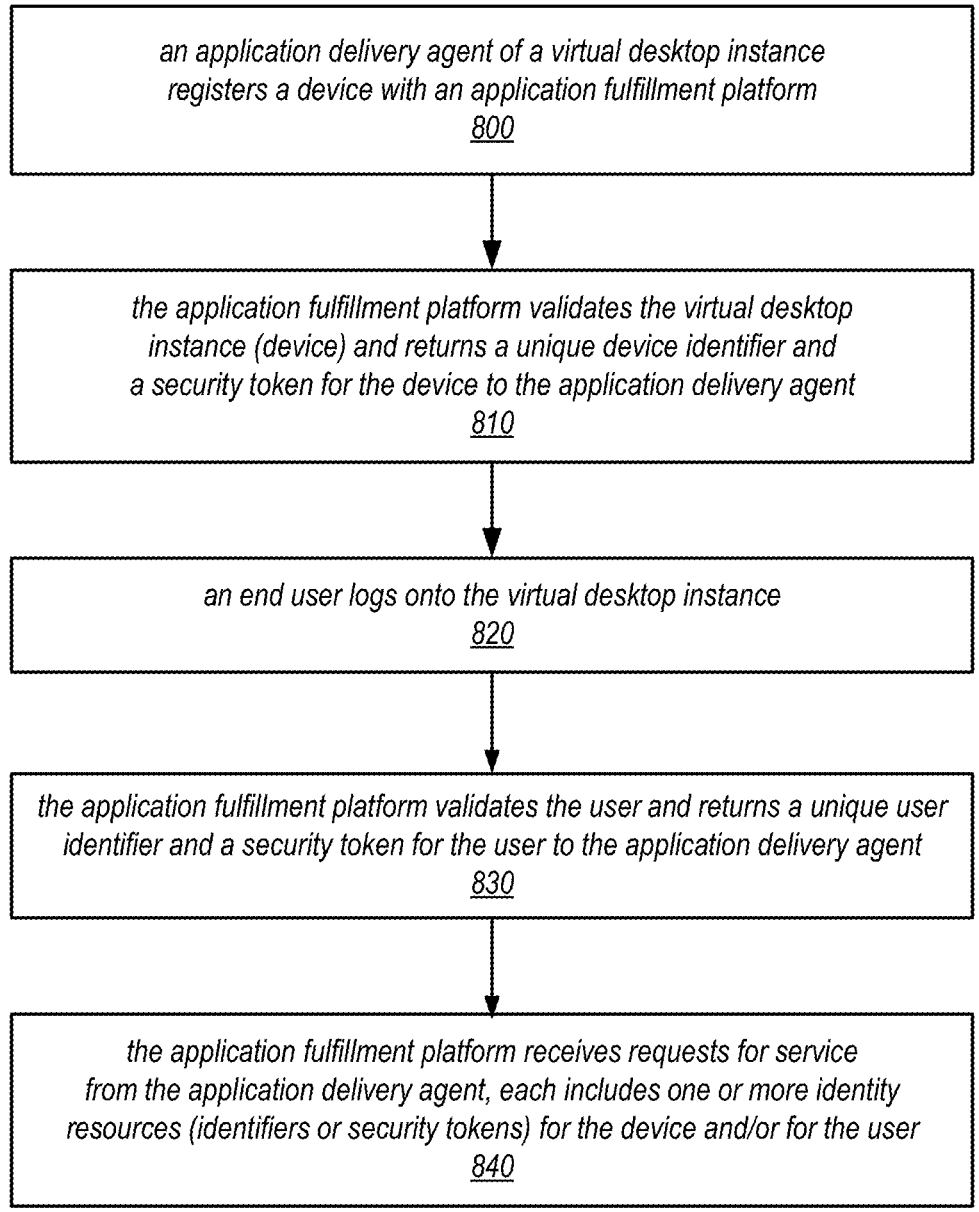
FIG. 8 is a flow diagram illustrating one embodiment of a method for implementing multiple authentication mechanisms in an application fulfillment platform.

One embodiment of a method for implementing multiple authentication mechanisms in an application fulfillment platform is illustrated by the flow diagram in FIG. 8. As illustrated at 800, in this example, the method may include an application delivery agent (such as application delivery agent 136 in FIG. 1) or a control plane agent component of an application delivery agent (such control plane agent 640 in FIG. 6) of a virtual desktop instance (e.g., a virtual desktop instance implemented on an end user's computing resource instance) registering a device with an application fulfillment platform. The method may also include the application fulfillment platform validating the virtual desktop instance (as a device) and returning a unique device identifier and a security token for the device to the application delivery agent (or to a control plane agent portion thereof), as in 810. Note that the unique device identifier and security token generated for the device by the application fulfillment platform may sometimes referred to (individually or collectively) as a device identity resource.

As illustrated in this example, the method may include an end user logging onto the virtual desktop instance (as in 820), and in response to the end user logging onto the virtual desktop instance, the application fulfillment platform validating the user and returning a unique user identifier and a security token for the user to the application delivery agent (as in 830). Note that the unique user identifier and security token generated for the user by the application fulfillment platform may sometimes referred to (individually or collectively) as a user identity resource.

As illustrated in FIG. 8, the method may include the application fulfillment platform receiving requests for service from the application delivery agent, each of which includes one or more identity resources (e.g., unique identifiers and/or security tokens) for the device and/or for the user, as in 840. For example, the particular identity resources that are required to be validated may be dependent on the requests themselves (e.g., the type of request) and on whose behalf the request is submitted to the application delivery platform. For example, some requests may be made by the application delivery agent on behalf of the system, and these requests may be validated using one or more device identity resource(s). Other requests may be made by the application delivery agent on behalf of the end user, and one or more user identity resource(s) may be needed to validate these requests.

Security Model

As described in more detail below, in some embodiments, the mechanisms used for authentication and identification of users and devices may be implemented by a combination of various control plane services, the application delivery agent, and/or one or more external services (e.g., other services implemented on the service provider network but outside of the application fulfillment platform or its control plane). These mechanisms may be used to keep track of end users on the control plane and to allow end users (and/or application delivery agents acting on their behalf) to access control plane services to order to subscribe or unsubscribe to various desktop applications, or to receive notifications (e.g., notifications to install or uninstall an application or to reinstall an application). For example, these mechanisms may provide access control plane services through a proxy service that is a gateway or entry point to the secure APIs for the application fulfillment platform control plane and also to the APIs for a variety of other services offered by the service provider, such as file storage services, object storage services, database services, resource stack management services, etc.

The proxy service may be one of the public facing endpoints for the application fulfillment platform and/or other service provider services. The client applications (the desktop application management module and application delivery agent) may interact with the proxy service to satisfy any API requests. The proxy service does this by invoking APIs on services running in the control plane. The proxy service's main responsibilities include:

Satisfying API requests from the client applications by invoking APIs on relevant control plane services.

Authenticating and authorizing each API request.

Serving as an endpoint to receive client side metrics.

Note that the proxy service may be configured to scale well, since it will be one of the services that is hit frequently. Note also that, in at least some embodiments, all communication between the client applications and the proxy service may be over an HTTPS connection.

In some embodiments, two services (the identity broker service and the device identity service described briefly above) may be responsible for accepting an end user's domain credentials (e.g., active directory credentials obtained from a domain controller), validating them, and passing them to a security token service, which returns a temporary security token to be used to access control plane services. In some embodiments, the proxy service described herein may be a secure outbound gateway that only accepts the security tokens generated by these two control plane services, and upon validation, the proxy service may allow the application delivery agent access to communicate with (e.g., to send services requests or inquiries) to various control plane services (e.g., the fulfillment service, entitlement service, delivery service described herein, as well as any storage services that store information related to (or used in) providing on-demand delivery of desktop applications to virtual desktop instances. In some embodiments, the domain credentials may include an identity ticket that conforms to the Kerberos® protocol developed by the Massachusetts Institute of Technology (MIT). Such a ticket may be referred to herein as a Kerberos ticket.

In some embodiments, the device identity service described above may communicate with the active directory (e.g., through a domain controller), while the proxy service may access the control plane services. In various embodiments, there may be multiple ways to authenticate an end user. For example, the end user may enter their user name and password, or may log in to a physical computing device that is domain joined such that the control plane services (or a domain controller) can read the end user's Kerberos ticket and authenticate the end user. In other words, in some embodiments, the systems described herein may support a single sign-on model.

The security model used employed between the desktop application management module and application delivery agent running on a virtual desktop instance and various services running on the application fulfillment platform control plane may leverage a multi-step authentication mechanism, which will include end-user authentication (e.g., using a domain controller), a separate device identity validation and separate security tokens for end users and their computing resources instances (e.g., their physical computing devices and/or virtual desktop instance) to access service provider resources and services. In some embodiments, the desktop application management module and application delivery agent running on a virtual desktop instance may first authenticate (via https) with an identity service (e.g., an identity broker service) to obtain a security token. All subsequent requests from the desktop application management module and/or application delivery agent running on the virtual desktop instance to the application fulfillment platform control plane (or other service provider resources or service) will be made via the proxy service, which may require the security tokens to be passed along with all requests. The proxy service may validate the security tokens when calls/requests are received from the desktop application management module and application delivery agent and may dispatch the calls/requests to other backend services running on the control plane, based on the access control afforded through by their security tokens.

In some embodiments, in the basic authentication sequence, the end user may be prompted to enter domain credentials to authenticate (e.g., through an interface of a domain controller). This may occur when the end user logs into a virtual desktop instance for the first time, when an end user's password gets reset or updated per a policy of their organization, or when an end user's virtual desktop instance gets rebuilt. In these basic scenarios, the following components may be involved in an operation to register an end user and their virtual desktop instance within the application fulfillment platform control plane:

1. the desktop application management module—which is running on the virtual desktop instance in user-mode.
2. the application delivery agent—which is a service running on the virtual desktop instance as a local system.
3. an identity service—which is running on the application fulfillment platform control plane.
4. a login page for an external identity service (e.g., a domain controller)—which is running on a control plane for that service.

In one example, an end-user may launch the desktop application management module, which may display the login page hosted by an external identity service (e.g., a domain controller). The end user may provide their domain credentials to login there. As a result, the desktop application management module may receive an authorization code (e.g., one that conforms to the OAuth open source standard). The desktop application management module may then call the application delivery agent, providing the authorization code, in order to get a security token. The agent may then call the identity broker service of the application fulfillment platform, passing the authorization code, along with user and device information, and may get back the security token and, in some embodiments, multiple refresh tokens. In some embodiments, the security token may be a temporary token that expires after a pre-determined time-to-live of between 1 hour and 36 hours) and the refresh tokens may be valid for a pre-determined period of between 30 days and 365 days). The application delivery agent may store the security token (and the refresh tokens) in protected local storage (e.g., encrypted storage) for further reference, e.g., so that the desktop application management module will be able to get it later without requiring the end user to login each time. All subsequent calls to retrieve the security token may simply return the security token stored by the application delivery agent. After this point the desktop application management module may use the security token to communicate with the proxy service, and the local service (e.g., a thread of the application delivery agent) may be responsible for storing and refreshing the security token.

In some embodiments, the purpose of the identity service of the application fulfillment control plane (such as identity broker service 630 illustrated in FIG. 6) may be to provide authentication mechanism between the desktop application management module, the local application delivery agent running on the end user's device and the rest of the services running on the application fulfillment platform control plane, according to the defined security model. The service may expose two endpoints, each of which will allow authentication of an end user and their device using the end user's credentials and device identification and will allow renewal of the security token, which will be used to access services running on the control plane. This service may also be responsible for storing user/device identity information and serving that data to various internal services. Since authentication endpoints and identity store/serving endpoints will require two different types of authentication (e.g., an OAuth token and Signature Version 4 authentication) authentication may be split into two services that are hosted by the same executable. One, the identity broker service, may be accessible from outside of the application fulfillment platform control plane, may expose endpoints for user authentication and token renewal, and may be responsible primarily for authentication process orchestration. A second one, a user device identity service (such as device identity service 622 illustrated in FIG. 6), may be accessible only to other services within the application fulfillment platform control plane and may be responsible primarily for managing user/device identity information. For example, the identity broker service may be responsible for taking a Kerberos ticket and exchanging it for security token with which the application delivery agent can access the control plane services. In other words, the identity broker service may be responsible for federating a Kerberos token. In some embodiments, another service on the service provider network (e.g., a domain controller) may be used to validate the principal (e.g., to validate a Kerberos ticket that is presented for a user or a device). Once it has been validated, it may be exchanged for the security token to be used by agent to access control plane services (when validated by the proxy service). In one specific example, the identity broker service may call a method to get a federation token and may include identity and access management user credentials that are specifically reserved for use by the identity broker service and the proxy service. This call may return a security token that includes is a combination of an access key identifier, an expiration time, a secret access key and/or a session token.

As previously noted, the application fulfillment platform control plane can register an end user and/or an end user's virtual desktop instance. In other words, in some embodiments, the systems described herein may support a separate authentication for end users and application delivery agents that are executing on virtual desktop instances on behalf of one or more end users, and may support registering the association between the end users and the virtual desktop instances. For example, in some embodiments, when an IT administrator of a customer organization submits a request to assign a particular set of applications to a principal (e.g., an end user in a specific directory), it may not specify the machine to use. Therefore, when the end user logs into a machine, the application delivery agent on the machine (or a control plane agent thereof) may register with the identify service and may present the Kerberos ticket for this principal. In response, the control plane may give the agent a security token that the agent can use to request the list of applications to which the end user is entitled. If the end user's device is associated with the Kerberos ticket (and, thus, with the security token) the agent may be able to determine which of these applications are installed on the machine, which are missing, which are currently running, etc. In the case that the machine is a brand new device (e.g., a new physical computing device or virtual desktop instance), the agent may begin fulfilling the intended state for the virtual desktop instance even before the end user logs onto the virtual desktop instance.

In various embodiments, the identity broker service describe above may be configured to support any or all of the following APIs:
    Authenticate—This API may be called to authenticate the end user and the end user's device. It may establish an association between them and issue security tokens for them for accessing other control plane services.
    RenewUser—This API may be called by an agent to refresh an access token and renew an end user's security token.
    RenewDevice—This API may be called by an agent to renew the security token for the agent (e.g., the security token for the device on which the agent is installed).

In addition to supporting these APIs, the identity broker service describe above may be configured to receive any or all of the following APIs and forward them (or the requests indicated by them) to a device identity service, such as those described herein:
    RegisterUserDevice
    RenewUser
    RenewDevice
    SignIn In some embodiments, the primary responsibility for the device identity service may be to store and service user identity information. This service may not be accessible outside of the application fulfillment platform control plane and may only serve requests coming from services running on the control plane. It may expose basic create/update operations with corresponding data validity and integrity checks. These create/update requests may come only from the identity broker service, since it will be the main authority source for user authentication. The rest of control plane services (and/or other service provider services) may issue only read requests to this service. In some embodiments, this service may store user and device identity information and any metadata associated with it in one or more database tables on service provider resources (e.g., through a database service implemented on the service provider network). To keep user/device information up to date, this service may subscribe to notifications from virtual desktop instances, e.g., to keep track of deleted virtual desktop instances (in this case, marking the corresponding user/device bundle as inactive). In some embodiments, it may also be configured to receive notifications about user accounts, and may update user tables in the database accordingly. Note that in other embodiments, different storage service (e.g., a file storage service or an object storage service) may be used to keep track of this information, or the information may be stored directly on service provider storage resources by the device identity service without going through an internal or external storage service.

In various embodiments, the device identity service may be configured to support any or all of the following APIs:
    RegisterUserDevice—This API may be invoked by the identity broker service in order to perform all the heavy lifting corresponding to the RegisterUserDevice API and may create the association between an end user and the end user's device. This may include validating the user, returning access and refresh tokens, calling a process to describe a virtual desktop instance or to describe a virtualized computing resource instance, generating the security token for the end user, generating the security token for the device (if registering a new device), persisting data in user, device and association tables, and notify the fulfillment service and delivery service that the end user's device has been registered.
    DeregisterUserDevice—This API may be invoked by the proxy service in order to perform all the heavy lifting corresponding to the DeregisterUserDevice API, which may include cleaning up the security token of the corresponding association record in the association table and marking the status of this record as "inactive", notifying the fulfillment service that the device has been deregistered, and updating a device table and/or user table to mark the status of the device or user as "inactive", if appropriate.
    RenewUser—This API may be invoked by the identity broker service to perform all the heavy lifting corresponding to the RenewUser API, including validating the association for the specified userID and deviceID, validating the user identity, retrieving a new access token, creating a new security token for the user, and updating the security token in the association table.

RenewDevice—This API may be invoked by the identity broker service to perform all the heavy lifting corresponding to the RenewDevice API, including validating the device, validating the device identity, creating a new security token for the device, and updating the security token in the device table.

SignIn—This API may be invoked by the identity broker service to perform all the heavy lifting corresponding to the SignIn API, including validating the association between the given userID and deviceID, validating the user identity with the user authority, creating a new security token for the user, and updating the security token in the association table.

SignOut—This API may be invoked by the proxy service to perform all the heavy lifting corresponding to the SignOut API, including validating the association for the given userID and deviceID, setting keys and tokens in corresponding records in the association table to null, setting an indication of the last renewal time of the record to the current time, and updating the record in the association table.

DesribeSync—Given a userId, this API may return the information about the user that is stored by the control plane (e.g., by a database service).

DescribeDevice—Given a deviceId, this API may returns the information about the device that is stored by the control plane (e.g., by a database service).

DescribeUserDeviceAssociation—Given a userId and deviceId, this API may return the information about the association of the <userId, deviceId> tuple that is stored by the control plane (e.g., by a database service).

DescribeAssociationsForUser—Given a userId, this API may return the Ids of all the devices which are associated with the user.

Since the proxy service is responsible for authenticating and authorizing each API call which gets called by a client application, it may need to validate the user and device from which (or on whose behalf) the API call is received are who they claim to be. In some embodiments, the security model may require that each API request be signed using Signature Version 4 authentication and that the proxy validate this signature. On each API request, the client may use the credentials from the security token to sign the request. The proxy service may then use another service to authenticate and authorize the request. The proxy may authenticate not only that the security credentials were generated by a service provider account corresponding to the end user, but also that the security credentials belong to the user.

In some embodiments, if the proxy service is heavily loaded, the service provider may throttle the incoming requests. For example, if the proxy service is under a heavy uniform load that is distributed across devices (for example if an application is no longer supported by the application fulfillment platform or is otherwise revoked for all users and devices), all of the devices that had installed this application may issue a notification call regarding the revocation of the application. In another example, the proxy service may be a under a heavy load from a few sets of devices when an IT administrator provisions a set of virtual desktop instances and the users of that organization may open their desktop application fulfillment modules for the very first time.

As previously noted, in some embodiments, the identity resources described herein may be stored on service provider storage resources by the control plane. For example, they may be stored in database tables such as those described below.

A user identity table, with hash key "user_id", which may store attributes such as an authority, a directory_id, a provider_user_id, a provider_user_name, an account_id, and status A device identity table, with hash key "device_id", which may store attributes such as a type, a fingerprint, a provider_device_id, status, an account_id, a directory_id, a security token access key, a security token secret key, and a session_token An identity association table, with hash keys "association_id", "registered_time", "user_id", and "device_id", which may store attributes such as a registered_time, a device_id, a user_id, status, a last_renewal_time, a security token access key, a security token secret key, and a session_token Note that in these tables, the following assumptions may be made:

an association_id attribute may represent a concatenation of a user_id and a device_id a registered_time attribute may represent a time at which (or an epoch during which) a user/device association was first registered (e.g., by calling the RegisterUserDevice API)

a last_renewal_time attribute may represent a time which (or an epoch during which) a user's security token was renewed (e.g., by calling the RenewUser API).

a provider_device_id attribute may represent an identifier of a virtual desktop instance a status attribute may have values of "Active" or "Inactive"

Note that, in other embodiments, other tables may store more, less, or different information, e.g., audit information for operational and/or debugging purposes. As noted above, identity resources may also be stored by an application delivery agent on local storage resources (e.g., on the physical computing device or virtual desktop instance on which the agent is installed). In such embodiments, the data in local storage may be encrypted such that the following guarantees are supported:

1. The data stored in the file cannot be retrieved by any user, other than a local system account holder on that particular machine
2. A data file that is transferred to another machine cannot be decrypted on the other machine In some embodiments, the virtual desktop instance may always be in an active directory environment (i.e., always domain joined). Therefore, the application fulfillment platform may use a Kerberos authentication mechanism to authenticate the device and the user. In such embodiments, when a device (e.g., a virtual desktop instance) is started, the application delivery agent installed on the device may be configured to start when the operating system is booted up. In this case, when the operating system boots up, the agent may start up as a service running under the local system account. Not that this may be before any end user has logged in. When the service starts, it may try to read a device-level identity ticket (e.g., a Kerberos ticket) for the machine itself. However, the platform cannot guarantee that by the time the service starts, the virtual desktop instance has been domain joined. Therefore, the agent might have to retry or wait a while before being able to obtain a Kerberos ticket for the device.

Once the agent obtains this ticket (which may be in a format compatible with the operating system but not with the control plane service of the application fulfillment platform), the service may be configured to transform it into another format (e.g., a Java™ programming language format), or any other format that one or more of the identity/security services implemented on the service provider network are configured to recognize and accept. For example, the service may pass the reformatted device Kerberos ticket to one of these services (e.g., a domain controller) for authentication. Once the service authenticates this ticket, it may notify the control plane that it has authenticated the device (i.e., that this device is now in the active directory). At this point, the control plane may generate a unique device identifier (an identifier that can identify this device, which is a virtual desktop instance, in this case) and may generate a security token (e.g., temporary security token) for the device. In other words, the control plane may generate two identity resources (a unique device identifier and a security token for the device), and may pass them back to the agent. As noted above, the agent may store these identity resources securely on the virtual desktop instance itself. From that point forward, the agent may use the device identifier to identify itself and may use the security token to communicate with the control plane (e.g., to access various control plane services).

Note that in embodiments in which the security token is a temporary token (e.g., in embodiments in which it expires after a few hours or after a life span of up to 36 hours), when it expires (or is about to expire) the agent may be configured to make the same call as it did initially in order to renew the security token. In other embodiments, an API call for renewing the security token may have a different format that the API used to obtain the security token initially. Either way, in response to a request to renew an expired (or expiring) security token, the control plane may generate a new security token and pass it back to the agent.

Figure 9:
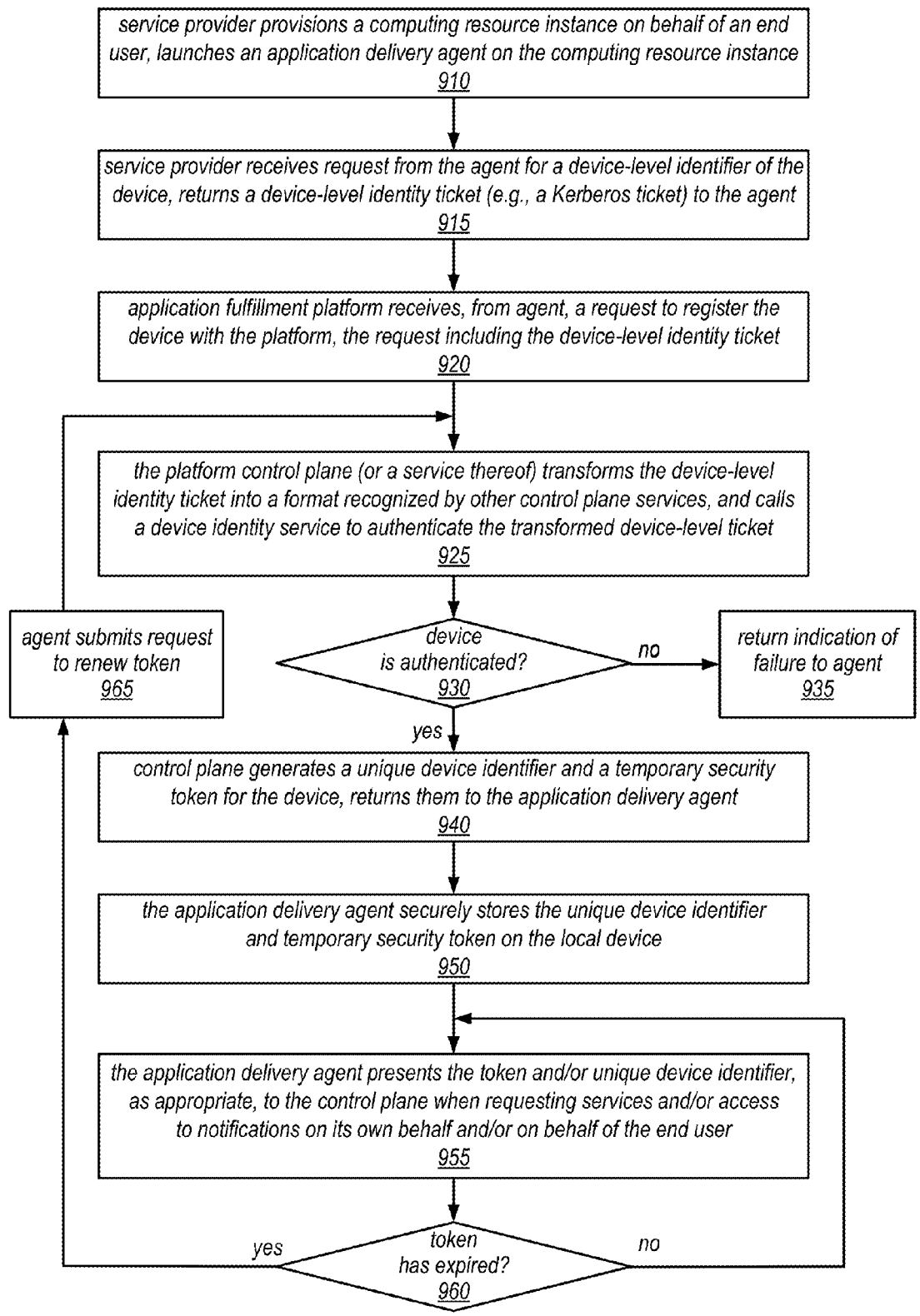
FIG. 9 is a flow diagram illustrating one embodiment of a method for generating device identity resources.

One embodiment of a method for generating device identity resources is illustrated by the flow diagram in FIG. 9. As illustrated at 910, in this example, the method may include a service provider provisioning a computing resource instance on behalf of an end user, and launching an application delivery agent on the computing resource instance. In some embodiments, an application delivery agent may be launched on the computing resource instance automatically when the computing resource instance is booted up, while in other embodiments, it may be explicitly launched by an end user in order to access application fulfillment services provided by an application fulfillment platform, such as those described herein. The method may also include a service provider receiving a request from the application delivery agent (or from a control plane agent thereof) for a device-level identifier of the device, and the service provider (or a domain controller implemented by the service provider) returning a device-level identity ticket (e.g., a Kerberos ticket or another type of identity credential that may or may not be based on the active directory identifier for the device) to the application delivery agent (or a control plane agent thereof), as in 915. Note that in this example, the device (i.e., the computing resource instance) may be a physical computing device or may be a virtual desktop instance that is implemented on a virtualized computing resource instance.

As illustrated in this example, the method may include the application fulfillment platform receiving, from the agent, a request to register the device with the application fulfillment platform, and the request may include the device-level identity ticket, as in 920. Note that it might take a while for the agent to obtain the device-level identity ticket from the platform (e.g., if the computing resource instance is not yet domain joined when the agent first attempts to obtain the device-level identity ticket). However, once the agent obtains the ticket, it may send to the application fulfillment platform the request to register the device. In other words, the agent may first make a call to the service provider's application fulfillment platform control plane to obtain the device-level identity ticket, and then may call another service of the control plane to register the device. The method may also include the control plane transforming the device-level identity ticket from a format used by the service from which it was obtained into a format that is recognized by other control plane services, and calling a device identity service (e.g., a domain controller) to authenticate the transformed device-level ticket, as in 925. For example, the transformation may include changing the programming language (or programming language construct) used to represent the device-level ticket, extracting information from the device-level ticket, and/or creating an additional identity resource from the information included in the device-level ticket along with any other relevant information. If the device is not (or cannot be) authenticated, shown as the negative exit from 930, the method may include returning an indication of the failure to register the device to the application delivery agent (or control plane agent thereof), as in 935.

If the device is authenticated, shown as the positive exit from 930, the method may include the control plane generating a unique device identifier and a temporary security token for the device, and returning them to the application delivery agent (or control plane agent thereof), as in 940. The method may also include the application delivery agent securely storing the unique device identifier and temporary security token for the device on the local device (e.g., on the virtual desktop instance), as in 950.

After the agent receives the unique device identifier and temporary security token for the device, the method may include the application delivery agent presenting the security token and/or unique device identifier, as appropriate, to the control plane when requesting services and/or when requesting access to notifications on its own behalf and/or on behalf of the end user, as in 955. As illustrated in this example, until or unless the security token for the device expires, the method may include the application delivery agent continuing to present the security token and/or unique device identifier, as appropriate, to the control plane when requesting services and/or access to notifications on its own behalf and/or on behalf of the end user. This is illustrated in FIG. 9 by the feedback from the negative exit of 960 to 955.

If the token does expire (or if the agent determines that the token is about to expire), and assuming that the computing resource instance is still active, shown as the positive exit from 960, the method may include the application delivery agent (or control plane agent thereof) submitting a request to renew the security token for the device, as in 965, after which some or all of the operations illustrated in 925-960 may be repeated to generate (and then use) a new security token for the device. In various embodiments, the request to renew the token may include the device-level identity ticket that was previously received from the application fulfillment platform, or the unique device identifier and/or expired (or expiring) security token that were previously generated for the device by the control plane. In some embodiments, the method may include the control plane generating both a new unique device identifier and a new temporary security token for the device. However, in other embodiments, the method may include the control plane generating only a new temporary security token for the device.

Note that while the security token in this example is a temporary token that expires after a pre-determined time period, in other embodiments, the security tokens generated by the control plane for end user devices (e.g., physical computing devices, virtualized computing resource instances, or virtual desktop instances) may not be temporary tokens. For example, in some embodiments, these security tokens may not expire on their own at all (e.g., they may have to be explicitly deleted or revoked by the agent or by a control plane service) or they may have configurable expiration periods (e.g., expiration periods that can be selected by the IT admin for their organization).

In some embodiments, when an end user logs onto and end user device (e.g., when the end user logs into a virtual desktop instance), this may start (or the user may launch) the desktop application management module. In some embodiments, when this module is launched, it may be configured is ask the application delivery agent installed on the device to "give me my identification" and the agent may determine whether it already has an identity for this user (e.g., stored locally). If not, the agent may impersonate this user and may try to read this user's Kerberos ticket. If it reads this user's Kerberos ticket successfully, the control plane may be configured to generate a security token for the end user in a manner that is similar to that described above for generating a security token for the device. For example, the control plane may transform the ticket from an operating-specific format into a format that is recognized by various control plane services, and may call a similar (or the same) API of an internal or external identity service (e.g., a domain controller) to ask it to authenticate this ticket. If the ticket is successfully authenticated, the control plane may generate a unique resource name within the service provider network that will serve as an identifier for the user, and which is similar to the device identifier. The control plane may also generate a security token for the end user, and may pass the token back to the active directory identifier for this user (the security identifier for this user in the active directory). In some embodiments, the security identifier may be passed back to the agent in order to check, on the agent side, to see if it still matches what the agent thinks the user identity is. If not, then the control plane may reject the requests received from the virtual desktop instance or the virtual desktop instance may reject commands that are received from the control plane that include with this non-matching security identifier. As in the example above, if the security token for the user expires, the agent may be configured to re-authenticate this user and to obtain a new security token on behalf of the user).

Figure 10:
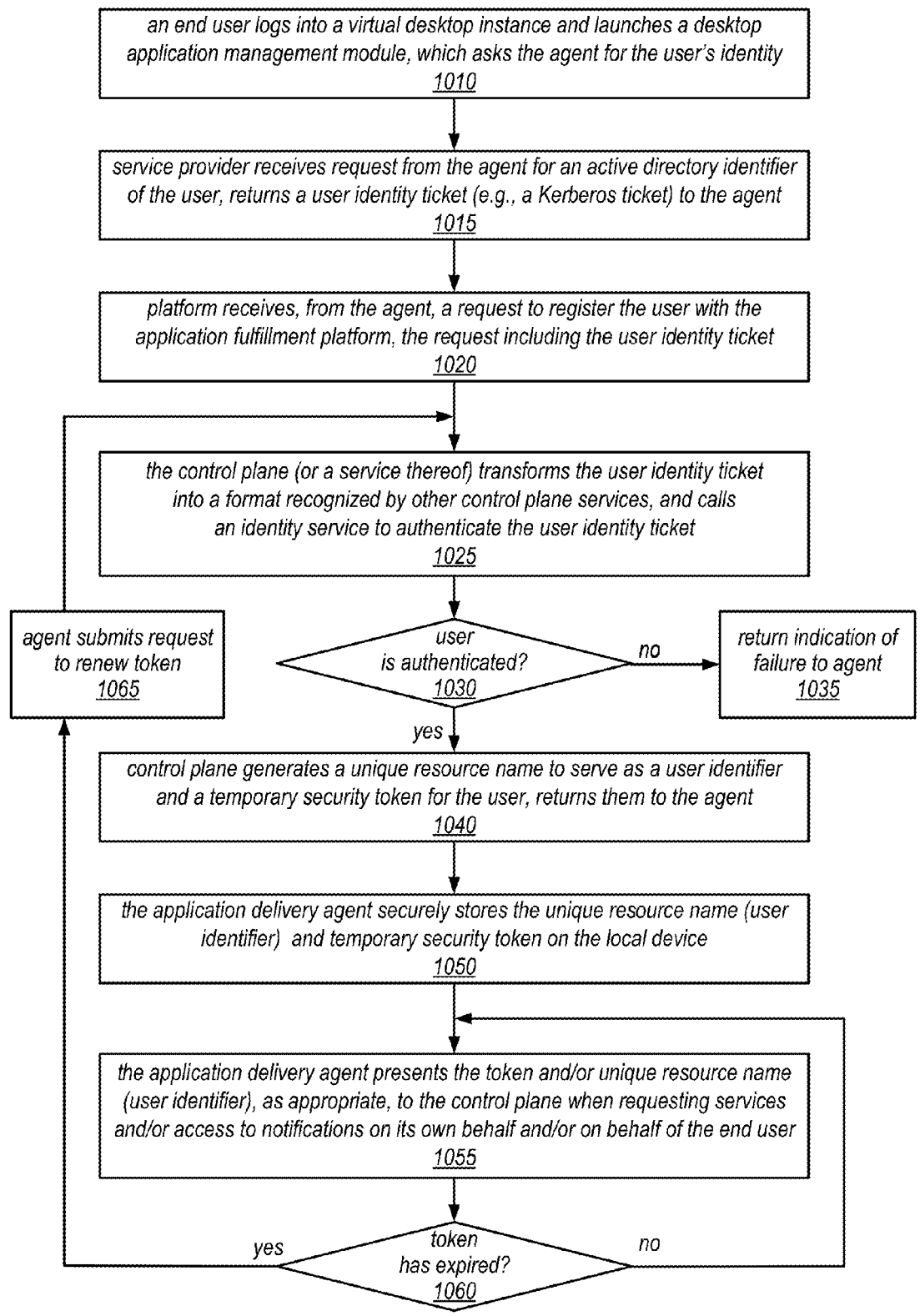
FIG. 10 is a flow diagram illustrating one embodiment of a method for generating identity resources for an end user of an application fulfillment platform.

One embodiment of a method for generating identity resources for an end user of an application fulfillment platform (e.g., an employee or member of an organization that is a customer of the service provider) is illustrated by the flow diagram in FIG. 10. As illustrated at 1010, in this example, the method may include an end user logging into a virtual desktop instance and launching a desktop application management module, which may then ask an application delivery agent executing on the virtual desktop instance (or a control plane agent thereof) for the end user's identity. Assuming the agent does not yet have user identifier for the end user, the method may also include the agent sending, and the service provider receiving, a request from the application delivery agent (or control plane agent thereof) for an active directory identifier of the end user, and the service provider (or a domain controller implemented by the service provider) returning a user identity ticket (e.g., a Kerberos ticket or another type of identity credential that may, or may not, be based on the active directory identifier for the end user) to the application delivery agent (or control plane agent thereof), as in 1015. Again note also that, in some embodiments, it might take a while for the application delivery agent to obtain the user identity ticket. However, once the application delivery agent (or control plane agent thereof) obtains the ticket, it can send a request to the platform to register the end user).

As illustrated in FIG. 10, the method may include an application fulfillment platform receiving, from the agent, a request to register the end user with the application fulfillment platform, and the request may include the user identity ticket, as in 1020. In other words, the agent may first make a call to the service provider's application fulfillment platform control plane to obtain the user identity ticket for the end user, and then may call another service of the control plane to register the end user. The method may also include the control plane transforming the user identity ticket from a format used by the service from which it was obtained into a format that is recognized by other control plane services, and calling an identity service (e.g., a domain controller) to authenticate the transformed user identity ticket, as in 1025. For example, the transformation may include changing the programming language (or programming language construct) used to represent the user identity ticket, extracting information from the user identity ticket, and/or creating an additional identity resource from the information included in the user identity ticket along with any other relevant information. Note that, in some embodiments, the identity service used to authenticate the transformed user identity ticket may be the same identity service that was used to authenticate the transformed device identity ticket, while in other embodiments, these tickets may be authenticated by different services. As illustrated in FIG. 10, if the end user is not (or cannot be) authenticated, shown as the negative exit from 1030, the method may include the platform returning an indication of the failure to register the end user to the application delivery agent (or control plane agent thereof), as in 1035.

If the end user is authenticated, shown as the positive exit from 1030, the method may include the control plane generating a unique resource name to serve as a user identifier and a temporary security token for the end user, and returning them to the application delivery agent (or control plane agent thereof), as in 1040. The method may also include the application delivery agent securely storing the unique resource name (user identifier) and temporary security token on the local device (e.g., on the virtual workspace instance), as in 1050.

After the application delivery agent receives the unique resource name (user identifier) and the security token for the user, the method may include the application delivery agent presenting the token and/or unique resource name (user identifier), as appropriate, to the control plane when requesting services and/or when requesting access to notifications on its own behalf and/or on behalf of the end user, as in 1055. As illustrated in this example, until or unless the security token for the end user expires, the method may include the application delivery agent continuing to present the security token for the end user and/or unique resource name (user identifier), as appropriate, to the control plane when requesting services and/or when requesting access to notifications on its own behalf and/or on behalf of the end user. This is illustrated in FIG. 10 by the feedback from the negative exit of 1060 to 1055.

If the security token for the end user does expire (or if the agent determines that the security token is about to expire), and assuming that the computing resource instance is still active, shown as the positive exit from 1060, the method may include the application delivery agent (or control plane agent thereof) submitting a request to renew the security token for the end user, as in 1065, after which some or all of the operations illustrated in 1025-1060 may be repeated to generate (and then use) a new security token for the user. In various embodiments, the request to renew the token may include the user identity ticket that was previously received from the application fulfillment platform, the unique resource name (user identifier) that was previously generated by the control plane, and/or the expired (or expiring) security token. In some embodiments, the method may include the control plane generating both a new unique resource name (user identifier) and a new temporary security token for the user. However, in other embodiments, the method may include the control plane generating only a new temporary security token for the user.

Note that while the security token in this example is a temporary token that expires after a pre-determined time period, in other embodiments, the security tokens generated by the control plane for end users may not be temporary tokens. For example, in some embodiments, these security tokens may not expire on their own at all (e.g., they may have to be explicitly deleted or revoked by the agent or by a control plane service) or they may have configurable expiration periods (e.g., expiration periods that can be selected by the IT admin for their organization).

Token Auto Renewal

As noted above, the security tokens generated by the control plane for the end user and/or the computing resource instance (e.g., virtual desktop instance) may eventually expire. In some embodiments, the system may employ an automatic token renew process, in which the following steps may be used to obtain a new security token without requiring the end user to re-enter their credentials:

1. The desktop application management module or the application delivery agent may detect that the security token has expired (or is expiring)
2. The agent may initiate the renewal of the security token with the identity service, passing it the expired (or expiring) security token, a refresh token and an access token that were retrieved from a local protected data store.
3. The identity service may validate the user and the device and determine whether the tokens match the ones stored on the service provider resources.
4. The identity service may call a method to generate or obtain a new security token and return it to the agent.

In some embodiments, at the end of the lifecycle for a virtual desktop instance (e.g., when the end user is disassociated from the virtual desktop instance), this may trigger one or more actions, which may include one or more of the following:

The agent may purge the security token that is associated with this user (e.g., it may erase it from the secure storage on the virtual desktop instance so that it is no longer available or visible on the virtual desktop instance. Note that in this case, it may still be usable in the directory until it expires.

The control plane may mark this end user as not being on this device any more.

As previously noted, an application delivery agent installed on an end user's computing resource instances may submit service requests to the application fulfillment platform on its own behalf, in some cases. For example, if the agent wishes to fetch a message from the outbound channel (e.g., queue) for its computing resource instance, the proxy service may present the security token to the queue and, once access to the message is verified, return the message to the agent. In another example, the runtime engine portion of the application delivery agent may communicate with the delivery service when installing a virtualized application package on the virtual desktop instance. In this case, the runtime engine component may communicate with the proxy service or with the outbound channel component (queue) on the control plane (e.g., one that is specific to the device) to receive instructions for retrieving and/or installing the virtualized application package. In some embodiments, a machine-level authentication may be valid when the machine control plane agent needs to communicate with the fulfillment platform control plane on behalf of any and all end users who are logged into the machine.

Figure 11:
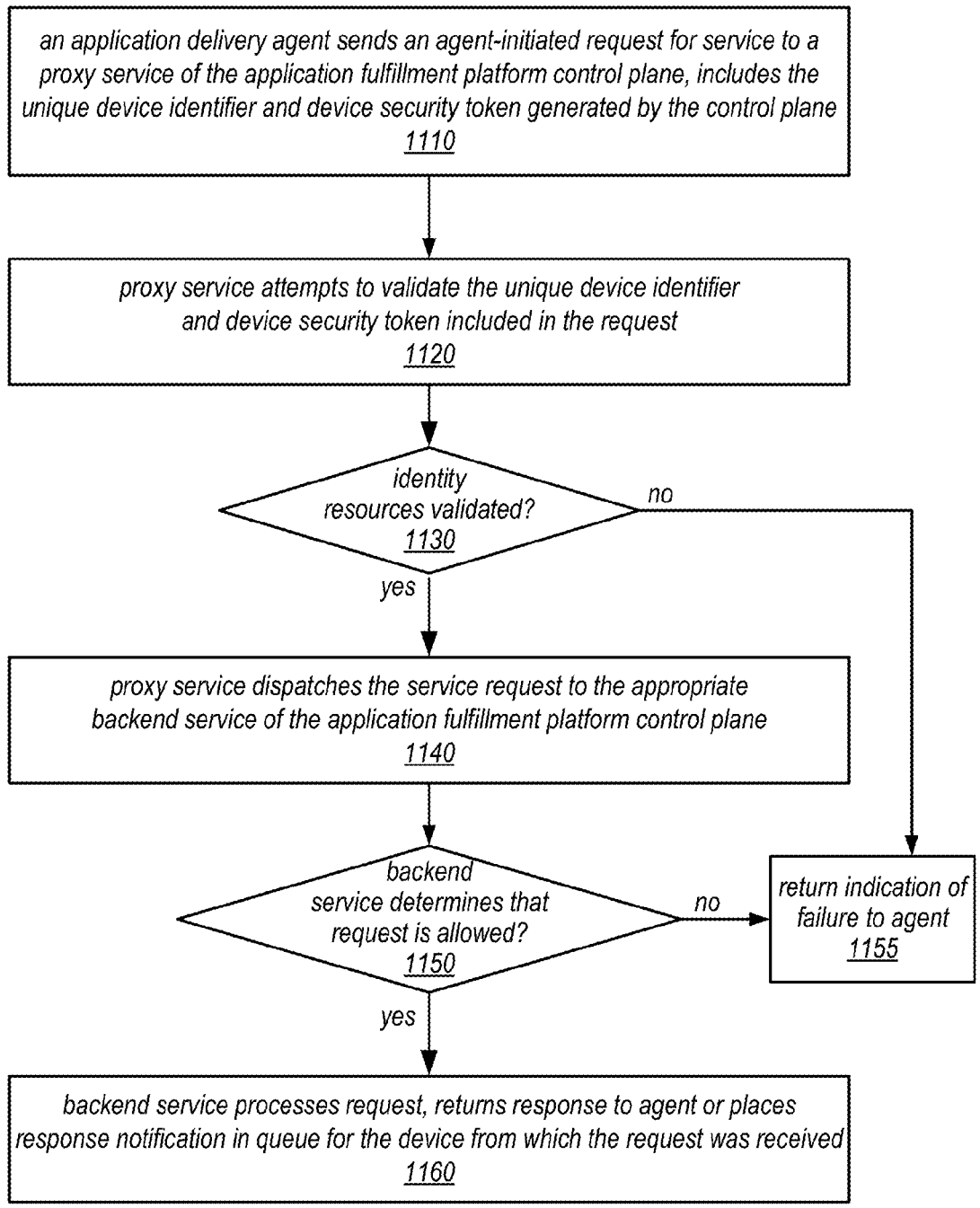
FIG. 11 is a flow diagram illustrating one embodiment of a method for using device identity resources when interacting with an application fulfillment platform.

One embodiment of a method for using device identity resources when interacting with an application fulfillment platform is illustrated by the flow diagram in FIG. 11. As illustrated at 1110, in this example, the method may include an application delivery agent sending an agent-initiated request for service to a proxy service of the application fulfillment platform control plane, and the request may include the unique device identifier and/or device security token generated by the control plane. For example, the request may include a request for delivery instructions (e.g., instructions for a runtime engine component of the application delivery agent to follow in retrieving and installing a virtualized application package), a request to access an outbound channel (queue) to retrieve notifications directed to the computing resource instance on which the application delivery agent is installed, or a request to initiate a workflow in order to fulfill an intended state (e.g., to install required apps) on the virtual desktop instance. The method may include a proxy service attempting to validate the unique device identifier and/or device security token that are included in the request, as in 1120. If the identity resources are not (or cannot be) validated, shown as the negative exit from 1130, the method may include returning an indication of failure to the application delivery agent (or control plane agent thereof), as in 1155.

If the identity resources are validated, shown as the positive exit from 1130, the method may include the proxy service dispatching the service request to the appropriate backend service of the application fulfillment platform control plane, as in 1140. As illustrated at 1150, in this example, the method may include the backend service to which the request is directed determining whether the request should be granted, e.g., based on any constraints imposed on the agent/device, any entitlements associated with the agent/device, or any permissions associated with the agent/device. If the backend service to which the request is directed determines that the request is not allowed (i.e., that it should not be granted), shown as the negative exit from 1150, the method may include returning an indication of failure to the application delivery agent (or control plane agent thereof), as in 1155. However, if the backend service to which the request is directed determines that the request is allowed (i.e. that it should be granted), shown as the positive exit from 1150, the method may include the backend service processing the request, and returning a response to the application delivery agent (or control plane agent thereof) or placing a response notification in a queue for the device from which the request was received, as in 1160. For example, if the request was a request from the runtime engine component of the application delivery agent for virtualized application package delivery instructions, these instructions would be put in the queue for the application delivery agent (or the runtime engine component thereof) to retrieve. In another example, if the request was a request for access to the queue, the queue may return a notification message (e.g., a command) to the application delivery agent.

In some embodiments, the application delivery agent installed on a computing resource instance (e.g., a virtual desktop instance) may submit service requests to the control plane on behalf of an end user or on its own behalf (e.g., requests to subscribe to a particular desktop application, unsubscribe from a particular desktop application, or reinstall a particular desktop application). For example, if an application delivery agent (or a control plane agent thereof) installed on an end user's computing resource instance wishes to subscribe to an application (on behalf of the end user), the agent may send a request to the proxy service, which may validate its security token, verify that the user is entitled to access the appropriate backend services (through the end user's computing resource instance), and route the request to the fulfillment service. In response, the fulfillment service may process the request and send a response back to the proxy service. Note that the end users themselves may only be able to access the resources for which they have permissions through their own user-level authentications.

Figure 12:
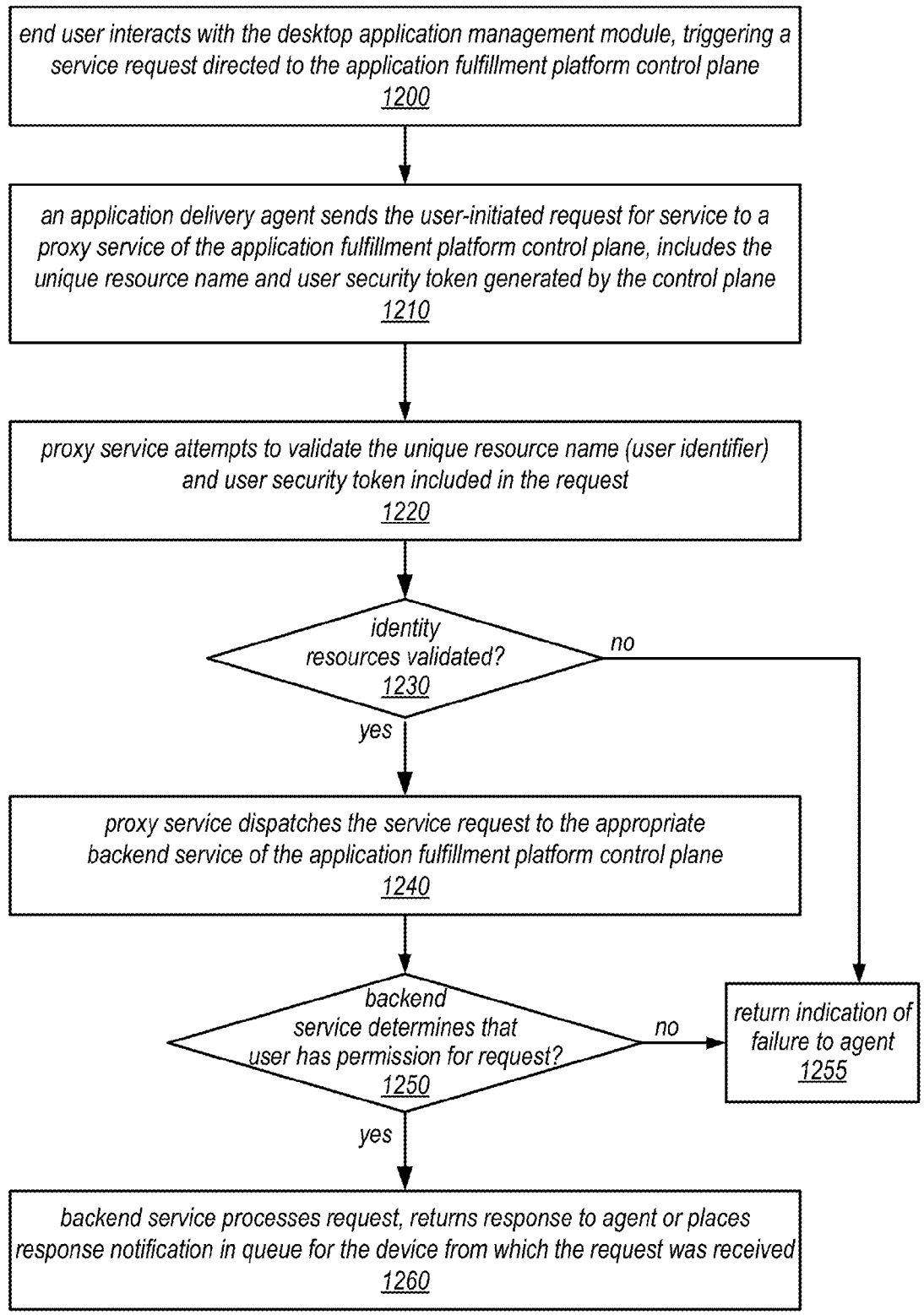
FIG. 12 is a flow diagram illustrating one embodiment of a method for using user identity resources when interacting with an application fulfillment platform.

One embodiment of a method for using user identity resources when interacting with an application fulfillment platform is illustrated by the flow diagram in FIG. 12. As illustrated at 1200, in this example, the method may include an end user interacting with a desktop application management module that is installed on a virtual desktop instance (e.g., selecting options for subscribing to, unsubscribing from, or reinstalling an application), thus triggering a service request directed to the control plane of an application fulfillment platform. The method may also include an application delivery agent that is installed on the virtual desktop instance (or control plane agent thereof) sending the user-initiated request for service to a proxy service of the application fulfillment platform control plane, as in 1210, and the request may include the unique resource name (user identity) and the user security token that were generated by the control plane. The method may also include the proxy service attempting to validate the unique resource name (user identifier) and user security token that were included in the request, as in 1220. If the identity resources are not (or cannot be) validated, shown as the negative exit from 1230, the method may include returning an indication of the failure to the application delivery agent (or control plane agent thereof), as in 1255.

If the identity resources are validated, shown as the positive exit from 1230, the method may include the proxy service dispatching the service request to the appropriate backend service of the application fulfillment platform control plane, as in 1240. As illustrated at 1250, in this example, the method may include the backend service to which the request is directed determining whether the request should be granted, e.g., based on any constraints imposed on the user/application, any entitlements associated with the user/application, or any permissions associated with the user/application. If the backend service determines that the end user does not have permission to receive the requested service (e.g., if the end user is not entitled to a requested application, if a subscription request is not approved by the appropriate IT administrator or manager, or if constraints defined by the IT administrator indicate that the end user cannot receive the requested service), shown as the negative exit from 1250, the method may include returning an indication of the failure to the application delivery agent (or control plane agent thereof), as in 1255. If the backend service determines that the end user does have permission to receive the requested service (i.e., that the request should be granted), shown as the positive exit from 1250, the method may include the backend service processing the request, and returning a response to the application delivery agent (or control plane agent thereof) or placing a response notification in an outbound channel (queue) for the device from which the request was received, as in 1260 (e.g., notifying the agent to install, uninstall, or reinstall a specified application on behalf of the end user). Note that, in some embodiments, if the backend service to which the request is directed determines that the end user does not have permission to receive the requested service, shown as the negative exit from 1250, the method may include the backend service initiating an approval workflow (e.g., it may generate a request for the IT administrator or manager to approve the end user's service request). In such embodiments, if this workflow results in an approval of the request, the method may continue as in 1260. In other embodiments, if the backend service determines that the end user does not have permission to receive the requested service, and returns an indication to that effect to the agent, the method may include the agent initiating an approval workflow in an attempt to receive access to the requested service (e.g., a workflow for approving the agent's request to subscribe to, unsubscribe from, or reinstall an application) on behalf of the end user.

Figure 13:
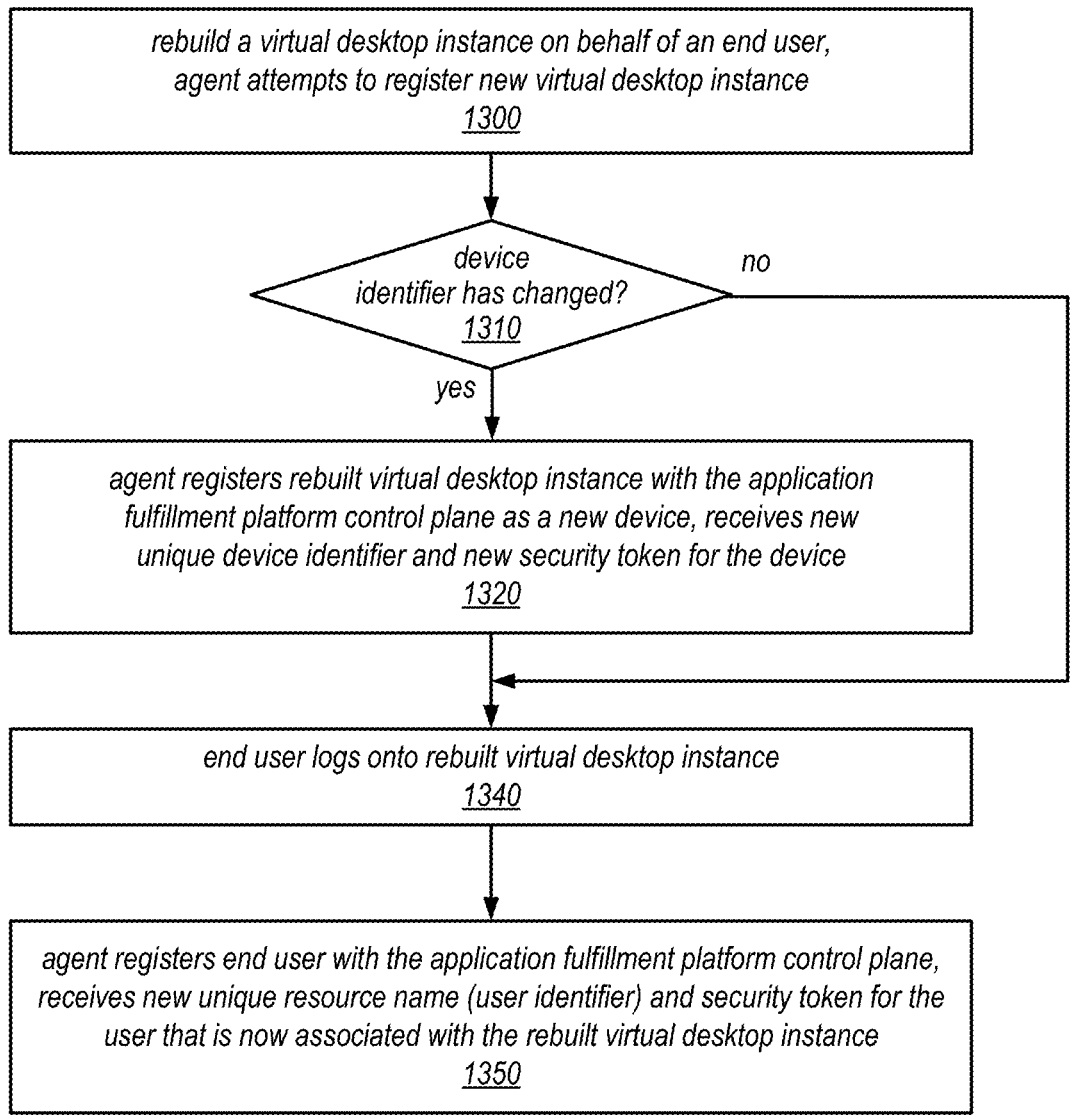
FIG. 13 is a flow diagram illustrating one embodiment of a method for renewing identity resources following the rebuilding of a virtual desktop instance.

In some embodiments, when a virtual desktop instance of an end user is rebuilt, there may be no guarantee that it will be rebuilt on the same physical computing device or on the same virtualized computing resource instance. Note also that the security tokens were previously generated by the control plane may be bound to the end user. Therefore, in some cases, it may be necessary to associate the new virtual desktop instance with the end user after it is rebuilt. One embodiment of a method for renewing identity resources following the rebuilding of a virtual desktop instance is illustrated by the flow diagram in FIG. 13. As illustrated at 1300, in this example, the method may include rebuilding a virtual desktop instance on behalf of an end user, and an application delivery agent installed on the virtual desktop instance (or a control plane agent thereof) attempting to register new virtual desktop instance. A virtual desktop instance may be rebuilt for any of a variety of reasons, including, but not limited to a machine failure, a change of machine for the end user, the end user logging off of a machine and then logging back onto the same machine, or the rebuilding of a virtualized computing resource instance (on the same or a different physical machine) on behalf of the end user. If, after the virtual desktop instance has been rebuilt, the device identifier for the virtual desktop instance has changed, shown as the positive exit from 1310, the method may include the application delivery agent (or control lane agent thereof) registering the rebuilt virtual desktop instance with the application fulfillment platform control plane as a new device, and receiving a new unique device identifier and new security token for the device (both generated by the control plane), as in 1320. For example, if the rebuilt virtual desktop instance is rebuilt on a different virtualized computing resource instance or on the same physical machine, when the application delivery agent attempts to register the rebuilt virtual desktop instance and obtains a device-level identity from a domain controller, it may be a different device-level identity than before. In this case, the previously generated unique device identifier will not be valid.

If, however, the device identifier for the virtual desktop instance has not changed, shown as the negative exit from 1310, the operation illustrated at 1320 for receiving new identity resources for the virtual desktop instance (device) may be elided. For example, if the rebuilt virtual desktop instance is rebuilt on the same virtualized computing resource instance or on the same physical machine, when the application delivery agent attempts to register the rebuilt virtual desktop instance and obtains a device-level identity from a domain controller, it may be the same device-level identity as before. In this case, the previously generated unique device identifier may still be valid. In either case, however, in response to the end user logging onto the rebuilt virtual desktop instance, as in 1340, the method may include the application delivery agent (or control lane agent thereof) registering the end user with the application fulfillment platform control plane, and receiving a new unique resource name (user identifier) and security token for the user, where these identity resources are now associated with the rebuilt virtual desktop instance, as in 1350.

In some embodiments, the application fulfillment platforms described herein may provide streamlined application distribution to the end users of a service provider customer. They may provide a fully managed service that improves efficiency and simplify administration with no infrastructure required at the customer. Through these platforms, applications may be deployed on-demand and at scale while maintaining centralized control, security and compliance from an easy-to use management console. The platforms may implement a simple process for subscription set-up that enables quick deployment of applications without on-premise infrastructure, and may allow administrators to control access to applications with granular access policy enforcement on a per user basis. In some embodiments, the application fulfillment platforms described herein may enable a service provider to handle application lifecycle management (specifically around installation, upgrades and patch management) on behalf of its customers.

The application fulfillment platforms described herein may deploy virtualized applications as isolated containers and provide user access to their applications on any authorized device without performing application installs. The application virtualization techniques employed by the application fulfillment platforms may allow applications and application data to be moved from one virtual desktop instance to another, and may allow multiple generations and/or versions of the same application to run concurrently on a single virtual desktop instance as long as there is operating system support. They may also allow legacy applications to be executed in a virtualized environment.

In some embodiments, the application fulfillment platforms described herein may support a pay-as-you-go model in which, for example, customers are billed on a per user per month basis only for the applications they use, and in which an unlimited number of a customer's own line-of-business applications may be deployed to its end users, along with any applications for which the customer has procured licenses from the service provider or an application vendor. The platforms may also allow customers to track and manage application spending with detailed application and license usage reporting on a per application basis. In addition they may allow customers to minimize up-front capital investment by using on-demand subscriptions. In some embodiments, application fulfillment platforms described herein may improve end user productivity by providing self-service access to curated applications on-demand.

Illustrative System

In at least some embodiments, a service that implements some or all of the techniques for providing on-demand delivery of desktop applications to desktops on physical computing devices and/or virtual desktops in a cloud computing environment as described herein may include a computer system that includes or is configured to access a non-transitory computer-accessible (e.g., computer-readable) media, such as computer system 1400 illustrated in FIG. 14. For example, in various embodiments, any or all of the computer system components described herein (including, e.g., data center computers and/or other components on a service provider network that collectively provide virtual computing services and/or virtual storage services, virtualized computing resource instances, virtual machines, virtual machine monitors or hypervisors, and/or virtual desktop instances; or client computing devices or other components on a client network) may be implemented using a computer system similar to computer system 1400 that has been configured to provide the functionality of those components. In the illustrated embodiment, computer system 1400 includes one or more processors 1410 coupled to a system memory 1420 via an input/output (I/O) interface 1430. Computer system 1400 further includes one or more network interfaces 1440 coupled to I/O interface 1430. In some embodiments, network interfaces 1440 may include two or more network interfaces (including, e.g., one configured for communication between a virtualized computing resource hosted on the computer system 1400 and its clients, and one configured for communication between a virtualized computing resource and external resources, computing systems, data centers, or Internet destinations on networks other than the provider network and a client network on whose behalf the virtualized computing resources are hosted. In other embodiments, network interface(s) 1440 may be a single network interface.

In various embodiments, computer system 1400 may be a uniprocessor system including one processor 1410, or a multiprocessor system including several processors 1410 (e.g., two, four, eight, or another suitable number). Processors 1410 may be any suitable processors capable of executing instructions. For example, in various embodiments, processors 1410 may be multi-purpose or embedded processors implementing any of a variety of instruction set architectures (ISAs), such as the x86, PowerPC, SPARC, or MIPS ISAs, or any other suitable ISA. In multiprocessor systems, each of processors 1410 may commonly, but not necessarily, implement the same ISA.

System memory 1420 may be configured to store instructions and data accessible by processor(s) 1410. In various embodiments, system memory 1420 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above for providing on-demand delivery of desktop applications to desktops on physical computing devices or virtual desktops in a cloud computing environment, are shown stored within system memory 1420 as code 1427 and data 1426. For example, data 1426 may include information representing the assignment of selected applications to particular end users and/or user groups, constraints and/or configuration parameter settings for the selected applications, users, and catalogs, and may be stored in any of a variety of data structures or database tables within memory 1420 on one or more computing nodes of a service provider system and/or client computing device used in providing on-demand delivery of desktop applications, as described herein. In some embodiments, data 1426 may also include security tokens and/or unique identifiers of users and/or devices (physical computing devices, virtualized computing resource instances and/or virtual desktop instances), as described herein. In some embodiments, at least some of the data 1426 may be stored on a user volume within system memory 1420. In some embodiments, code 1427 may include application binaries or virtualized application packages (or portions thereof), a desktop application management module and/or an application delivery agent, at least some of which may be stored on a boot volume within system memory 1420.

In one embodiment, I/O interface 1430 may be configured to coordinate I/O traffic between processor 1410, system memory 1420, and any peripheral devices in the device, including any of network interface(s) 1440 or other peripheral interfaces. In some embodiments, I/O interface 1430 may perform any necessary protocol, timing or other data transformations to convert data signals from one component (e.g., system memory 1420) into a format suitable for use by another component (e.g., processor 1410). In some embodiments, I/O interface 1430 may include support for devices attached through various types of peripheral buses, such as a variant of the Peripheral Component Interconnect (PCI) bus standard or the Universal Serial Bus (USB) standard, for example. In some embodiments, the function of I/O interface 1430 may be split into two or more separate components, such as a north bridge and a south bridge, for example. Also, in some embodiments some or all of the functionality of I/O interface 1430, such as an interface to system memory 1420, may be incorporated directly into processor 1410.

Network interface(s) 1440 may be configured to allow data to be exchanged between computer system 1400 and other devices 1460 attached to a network or networks 1450, such as other computer systems or devices as illustrated in the figures, for example. In various embodiments, network interface(s) 1440 may support communication via any suitable wired or wireless general data networks, such as types of Ethernet network, for example. Additionally, network interface(s) 1440 may support communication via telecommunications/telephony networks such as analog voice networks or digital fiber communications networks, via storage area networks such as Fibre Channel SANs, or via any other suitable type of network and/or protocol.

In some embodiments, system memory 1420 may be one embodiment of a computer-accessible medium configured to store program instructions and data as described above for implementing various embodiments of the techniques for providing on-demand delivery of desktop applications to desktops on physical computing devices and/or virtual desktops in a cloud computing environment described herein. However, in other embodiments, program instructions and/or data may be received, sent or stored upon different types of computer-accessible media. Generally speaking, a computer-accessible (e.g., computer-readable) medium may include non-transitory storage media or memory media such as magnetic or optical media, e.g., disk or DVD/CD coupled to computer system 1400 via I/O interface 1430. A non-transitory computer-accessible (e.g., computer-readable) storage medium may also include any volatile or non-volatile media such as RAM (e.g. SDRAM, DDR SDRAM, RDRAM, SRAM, etc.), ROM, etc, that may be included in some embodiments of computer system 1400 as system memory 1420 or another type of memory. Further, a computer-accessible medium may include transmission media or signals such as electrical, electromagnetic, or digital signals, conveyed via a communication medium such as a network and/or a wireless link, such as may be implemented via network interface(s) 1440.

The various methods as illustrated in the figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
   a plurality of computing nodes that collectively provide virtual computing services to one or more clients of a service provider, each of the computing nodes comprising at least one processor and a memory; and
   a virtualized computing resource instance executing on one of the computing nodes;
   wherein the virtualized computing resource instance implements a virtual desktop instance on behalf of a given end user that receives services from the service provider, and wherein an application delivery agent is installed on the virtual desktop instance;
   wherein one or more of the plurality of computing nodes implement an application fulfillment platform;
   wherein the application fulfillment platform is configured to:
      receive, from the application delivery agent, a request to register the virtual desktop instance with the application fulfillment platform as a device, wherein the request includes a device identity ticket;
      in response to the request to register the virtual desktop instance:
         validate the device identity ticket;
         generate a security token for the device; and
         return the security token for the device to the application delivery agent;
      receive, from the application delivery agent, a request to register the given end user with the application fulfillment platform, wherein the request includes a user identity ticket received from an active directory service;
      in response to the request to register the given end user:
         validate the user identity ticket;
         generate a security token for the given end user; and
         return the security token for the given end user to the application delivery agent; and
      receive, from the application delivery agent, a request for service, wherein the request for service includes the security token for the device or the security token for the given end user, and wherein the security token included in the request for service is dependent on the type of the service request or the entity on whose behalf the service request was submitted by the application delivery agent.

2. The system of claim 1,
   wherein the request was submitted by the application delivery agent on behalf of the application delivery agent; and
   wherein the request for service comprises an identifier of the device and the security token for the device.

3. The system of claim 1,
wherein the request was submitted by the application delivery agent on behalf of the given end user; and
wherein the request for service comprises an identifier of the given end user and the security token for the given end user.

4. The system of claim 1,
wherein the application fulfillment platform comprises a plurality of control plane services, including a proxy service;
wherein one or more of the request to register the virtual desktop instance, the request to register the end user, or the request for service is received by a proxy service; and
wherein in response to receiving the request to register the virtual desktop instance, the request to register the end user, or the request for service, the proxy service is configured to:
validate a security token included in the request; and
dispatch the request to another one of the control plane services.

5. The system of claim 4,
wherein the application fulfillment platform comprises an outbound queue from which the application delivery agent can retrieve notifications;
wherein the other one of the control plane services is configured to:
receive the dispatched request for service;
process the dispatched request for service; and
return a response for the dispatched request for service to the application delivery agent, wherein to return the response, the other one of the control plane services places a notification in the outbound queue for retrieval by the application delivery agent.

6. A method, comprising:
performing, by one or more computers that implement an application fulfillment platform on resources of a service provider:
receiving a service request from an application delivery agent that is installed on a computing resource instance of a given user in an organization that receives services from the service provider, wherein the service request comprises a security credential for the computing resource instance or a security credential for the given user; and
in response to receiving the service request, validating a particular identity resource of a plurality of different identity resources using two or more authentication mechanisms, wherein the particular identity resource being validated is based on whether the service request was submitted by the application delivery agent on behalf of the computing resource instance or was submitted by the application delivery agent on behalf of the given user, and wherein individual ones of the different identity resources comprise:
an identity of the computing resource instance and a security credential for the computing resource instance, or
an identity of the given user and a security credential for the given user; and
in response to validating the identity and the security credential for the computing resource instance of the given user or for the given user, processing the service request.

7. The method of claim 6, further comprising, prior to said receiving:
generating the security credential for the computing resource instance of the given user; or
generating the security credential for the given user.

8. The method of claim 7,
wherein the method further comprises, prior to receiving the service request, receiving a request to register the computing resource instance with the application fulfillment service platform; and
wherein said generating the security credential for the computing resource instance of the given user is performed in response to receiving the request to register the computing resource instance with the application fulfillment service platform.

9. The method of claim 7,
wherein the method further comprises, prior to receiving the service request, receiving a request to register the given user with the application fulfillment service platform or an indication that the given user has logged into the computing resource instance; and
wherein said generating the security credential for the given user is performed in response to receiving the request to register the given user with the application fulfillment service platform or the indication that the given user has logged into the computing resource instance.

10. The method of claim 7,
wherein at least one of said generating the security credential for the computing resource instance of the given user or said generating the security credential for the given user comprises generating a temporary security token that expires after a pre-determined period of time; and
wherein the method further comprises renewing the temporary security token in response to the temporary security token expiring.

11. The method of claim 7,
wherein at least one of said generating the security credential for the computing resource instance of the given user or said generating the security credential for the given user comprises:
receiving a security credential or unique resource identifier for the computing resource instance of the given user or for the given user that is of a different type than that of the security credential and that is not recognized by one or more control plane services implemented by the application fulfillment platform;
reformatting the security credential or unique resource identifier for the computing resource instance of the given user or for the given user that is of the different type; and
exchanging the reformatted security credential or unique resource identifier for the computing resource instance of the given user or for the given user for the security credential, wherein the security credential is recognized by the one or more control plane services implemented by the application fulfillment platform.

12. The method of claim 6,
wherein the method further comprises, prior to said receiving, generating a unique identifier for the computing resource instance of the given user or generating a unique identifier for the given user.

13. The method of claim 12,
wherein said validating the particular identity resource comprises validating the unique identifier that was generated for the computing resource instance of the given user or validating the unique identifier that was generated for the given user.

14. The method of claim 6, wherein the service request comprises a request to install a desktop application on the computing resource instance of the given user, uninstall a desktop application on the computing resource instance of the given user, subscribe to a desktop application, unsubscribe from a desktop application, or reinstall a desktop application on the computing resource instance.

15. The method of claim 6,
wherein the service request was submitted by the application delivery agent on behalf of the given user; and
wherein the service request comprises the identity of the given user and the security credential for the given user.

16. The method of claim 6,
wherein the service request was submitted by the application delivery agent on behalf of the application delivery agent; and
wherein the service request comprises the identity of the computing resource instance and the security credential for the computing resource instance.

17. The method of claim 6, wherein the application delivery agent stores the identity and the security credential for the computing resource instance of the given user or the identity and the security credential for the given user in secure storage on the computing resource instance.

18. The method of claim 6, wherein the computing resource instance comprises a virtualized computing resource instance or a virtual desktop instance that is implemented on resources of the service provider.

19. A non-transitory computer-readable storage medium storing program instructions that when executed on one or more computers cause the one or more computers to implement an application fulfillment platform, wherein the application fulfillment platform is configured to perform:
configuring a computing resource instance on behalf of a given user, wherein said configuring comprises:
building a virtual desktop instance on the computing resource instance; and
installing an application delivery agent on the virtual desktop instance;
generating a unique identifier and a security token for the virtual desktop instance;
generating a unique identifier and a security token for the given user;
receiving requests for service from the application delivery agent on behalf of the application delivery agent or the given user, wherein the requests for service comprise a security token for the virtual desktop instance or a security token for the given user; and
validating a particular identity resource of a plurality of different identity resources for different ones of the requests for service based on whether a given request for service was submitted by the application delivery agent on behalf of the application delivery agent or was submitted by the application delivery agent on behalf of the given user, wherein individual ones of the different identity resources comprise:
the unique identifier for the virtual desktop instance and the security token for the virtual desktop instance, or
the unique identifier for the given user and the security token for the given user.

20. The non-transitory computer-readable storage medium of claim 19, wherein the application fulfillment platform is further configured to perform:
storing the unique identifier for the virtual desktop instance, the security token for the virtual desktop instance, the unique identifier for the given user, and the security token for the given user on resources of a service provider that provides services to end users of a service provider customer organization, including the given user, through the application fulfillment platform; and
maintaining a record of an association between the given end user and the virtual desktop instance.

* * * * *